(12) United States Patent
Meek et al.

(10) Patent No.: US 7,295,993 B1
(45) Date of Patent: Nov. 13, 2007

(54) ATM CUSTOMER MARKETING SYSTEM

(75) Inventors: James Meek, Canton, OH (US);
Donald McCoy, Uniontown, OH (US);
Gregory Shimek, Akron, OH (US);
Ron DiFrango, Richmond, VA (US);
Anthony Lee, Markham (CA); Ken Koran, Hartville, OH (US); William Hemlick, Uniontown, OH (US);
Changning Jiang, Copley, OH (US);
Robert D. Symonds, Novelty, OH (US); Irek Singer, Mississauga (CA);
Peter St.George, Mississauga (CA);
Robert Bradley Gill, Hamilton (CA)

(73) Assignee: Diebold, Incorporated, North Canton, OH (US)

( * ) Notice: Subject to any disclaimer, the term of this patent is extended or adjusted under 35 U.S.C. 154(b) by 684 days.

(21) Appl. No.: 10/330,796

(22) Filed: Dec. 27, 2002

Related U.S. Application Data

(62) Division of application No. 09/449,426, filed on Nov. 24, 1999, now Pat. No. 7,039,600.

(60) Provisional application No. 60/110,125, filed on Nov. 27, 1998.

(51) Int. Cl.
*G06Q 20/00* (2006.01)
*G07G 1/00* (2006.01)
*G07G 1/14* (2006.01)

(52) U.S. Cl. .............................. 705/16; 705/14; 705/43

(58) Field of Classification Search .................. 705/16, 705/26, 14, 43

See application file for complete search history.

(56) References Cited

U.S. PATENT DOCUMENTS 5,050,207 A * 9/1991 Hitchcock ................ 379/93.19

(Continued)

FOREIGN PATENT DOCUMENTS

JP 09-231443 * 9/1997

OTHER PUBLICATIONS

Amundsen, WO 99/08214, Published Feb. 18, 1999, System for displaying information on distributed automated transaction machines.*

(Continued)

*Primary Examiner*—Michael Cuff
(74) *Attorney, Agent, or Firm*—Daniel D. Wasil; Ralph E. Jocke; Walker & Jocke

(57) ABSTRACT

A marketing system includes a plurality of automated transaction machines (74, 76, 78, 80, 82, 84, 86). The automated transaction machines operate to carry out financial transactions with associated host computers (90, 94, 100, 104). Marketing presentations are stored on and output from the transaction machines responsive to messages exchanged with a market message server (110) which is connected to the automated transaction machines through a network (108). The connection to the automated transaction machines which provides delivery of the market presentation materials and which causes the output of presentations, is generally independent of the messages associated with authorizing financial transactions. Some described embodiments of the invention enable presenting marketing campaigns to users of the transaction machines. The marketing campaigns may include sequences of presentations that are output on a targeted basis to particular users. Other marketing campaigns may be selectively distributed to groups of machines in the system and output without regard to the identity of the user of the machine. The system also enables analysis of marketing activity and communications with other systems for exporting and importing data and marketing presentations.

23 Claims, 81 Drawing Sheets

U.S. PATENT DOCUMENTS

| | | | |
|---|---|---|---|
| 5,159,560 A | * | 10/1992 | Newell et al. ............... 700/215 |
| 5,305,195 A | * | 4/1994 | Murphy ......................... 705/1 |
| 5,619,558 A | * | 4/1997 | Jheeta ..................... 379/92.01 |
| 5,671,279 A | * | 9/1997 | Elgamal ....................... 705/79 |
| 5,764,789 A | * | 6/1998 | Pare et al. ................... 382/115 |
| 6,456,981 B1 | * | 9/2002 | Dejaeger et al. .............. 705/14 |
| 6,694,300 B1 | * | 2/2004 | Walker et al. ................ 705/14 |

OTHER PUBLICATIONS

Bitter, Carole; Electronic Funds Transfer Systems in Retail Industries: Past Present and Future: Dissertation of Abstracts International; 1981.*

* cited by examiner

Checking Account Campaign — 194

| Visit #1 | Visit #2 | Visit #3 | |
|---|---|---|---|
| Thank you for selecting Fourth Financial for your ATM transactions | Welcome back to Fourth Financial We appreciate your ATM business | | |
| | We notice you using Fourth Financial ATMs frequently<br><br>Would you like information on how you can reduce ATM fees? | YES Open a Fourth Financial checking account. We will refund all the ATM fees you paid to us in the last 30 days. Please enter your phone number and press the * key when done | Thank you - we will call you in the next few days to open your account |
| | | NO Thank you for your business. Please call us at the number on the coupon. If you change your mind. | Print coupon (may include information on potential savings) |

FIG. 9

Checking Overdraft Campaign ← 196

| Visit #1 | Visit #2 | | Visit #3 |
|---|---|---|---|
| (6) Thanks (name) for selecting 4th Financial for your checking business! | (8) (Name) You've been pre-approved for checking overdraft protection!<br><br>We will protect your account in the event of an overdrawn check. Would you like this protection activated? | Y: (9) Great! We'll mail your enrollment and information pack immediately. Thanks for your interest. <u>Print coupon #3</u> | (17) (name). We have enrolled you in our overdraft protection program!<br><br>Thank you! |
| | | N: (10) You are a valued customer so if you reconsider simply call | (7) (name) Overdraft protection is still available. Call us if you change your mind at the number on the <u>printed coupon #3</u> |

Skip Payment Campaign

— 198

| Visit #1 | Visit #2 | | | Visit #3 |
|---|---|---|---|---|
| (11) Seasons Greetings from 4th Financial! (Name) Thank you for your recent credit card payment. We appreciate your excellent payment history! | (13) Seasons Greetings! We have a great holiday program just for you! We want to help you with those post holiday bills! (Name) Would you like to know more? | Y | (14) We appreciate your excellent payment history and would like to waive all late fees and minimum payments for January 1999. <u>Print coupon #1</u> | (18) (Name) You are now enrolled for the Holiday payment program. Enjoy your Holidays. |
| | | N | (15) Thank you for your excellent payment history. If there's anything we can do for you in the future, please call the 800-number listed on your receipt. <u>Print coupon #11</u> | (15) same |

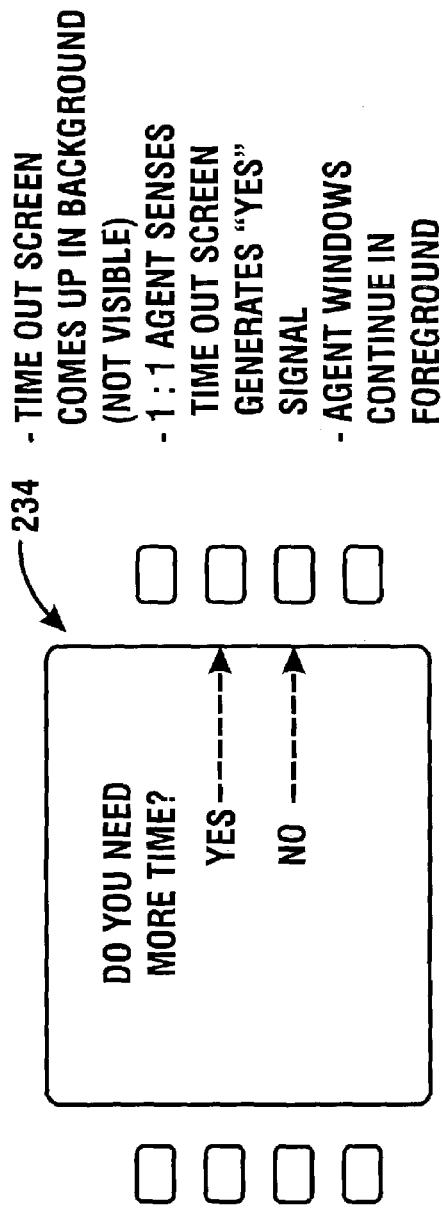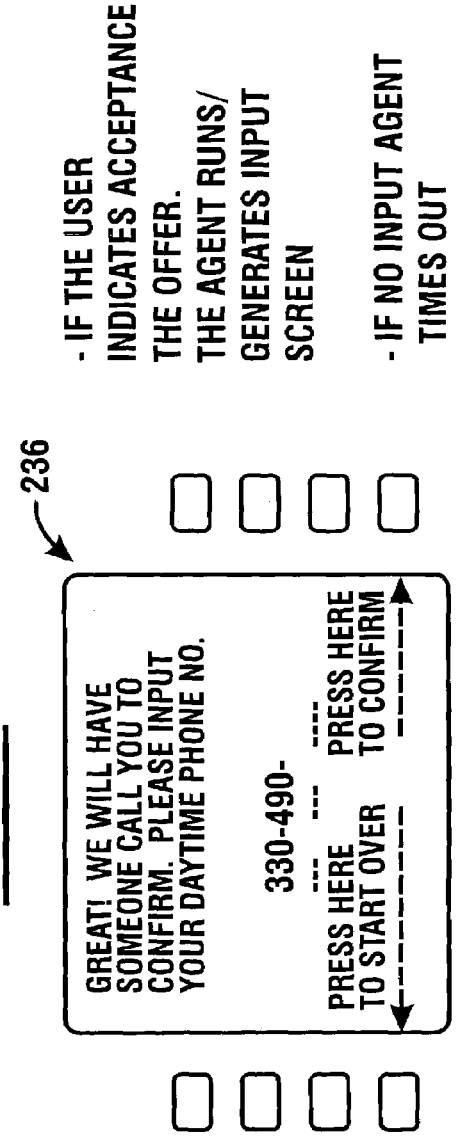

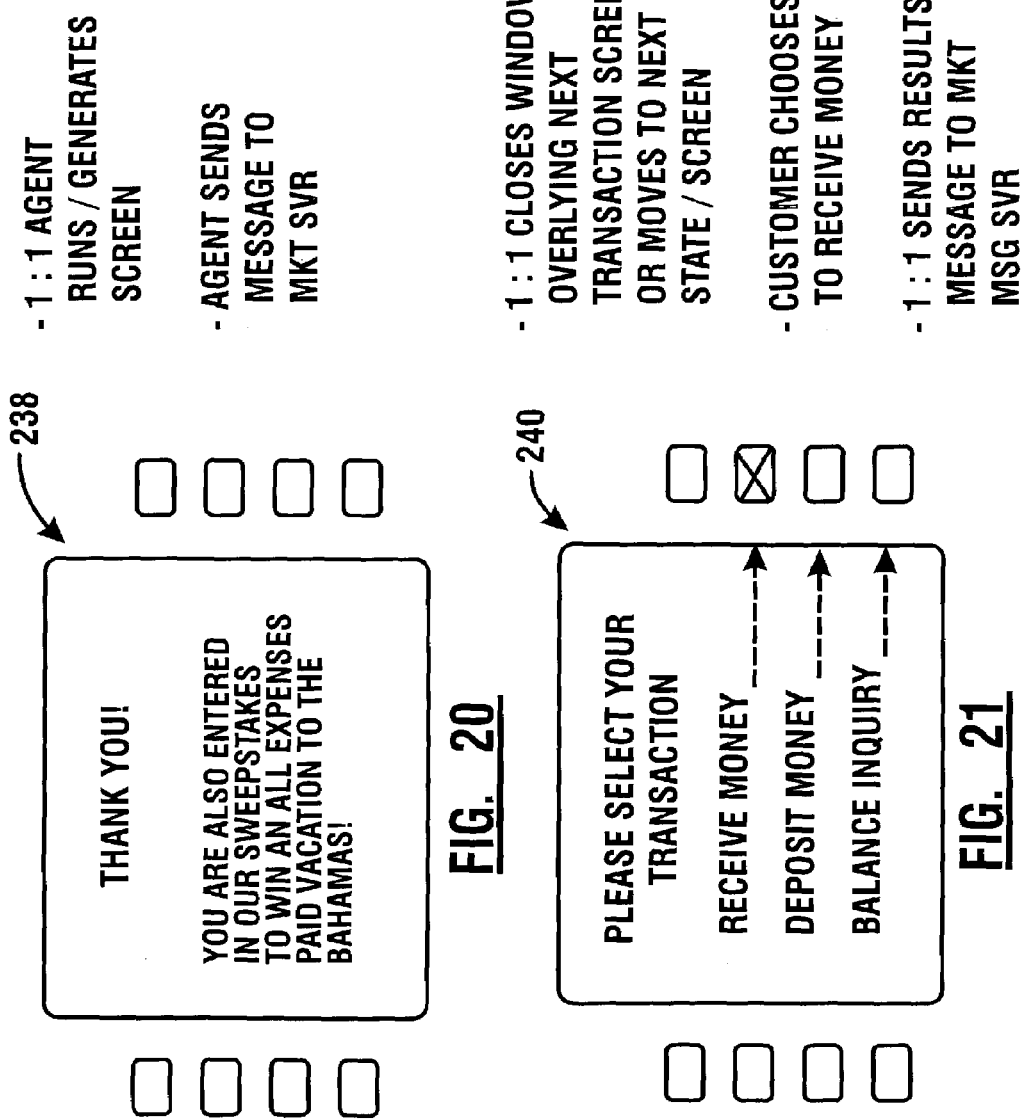

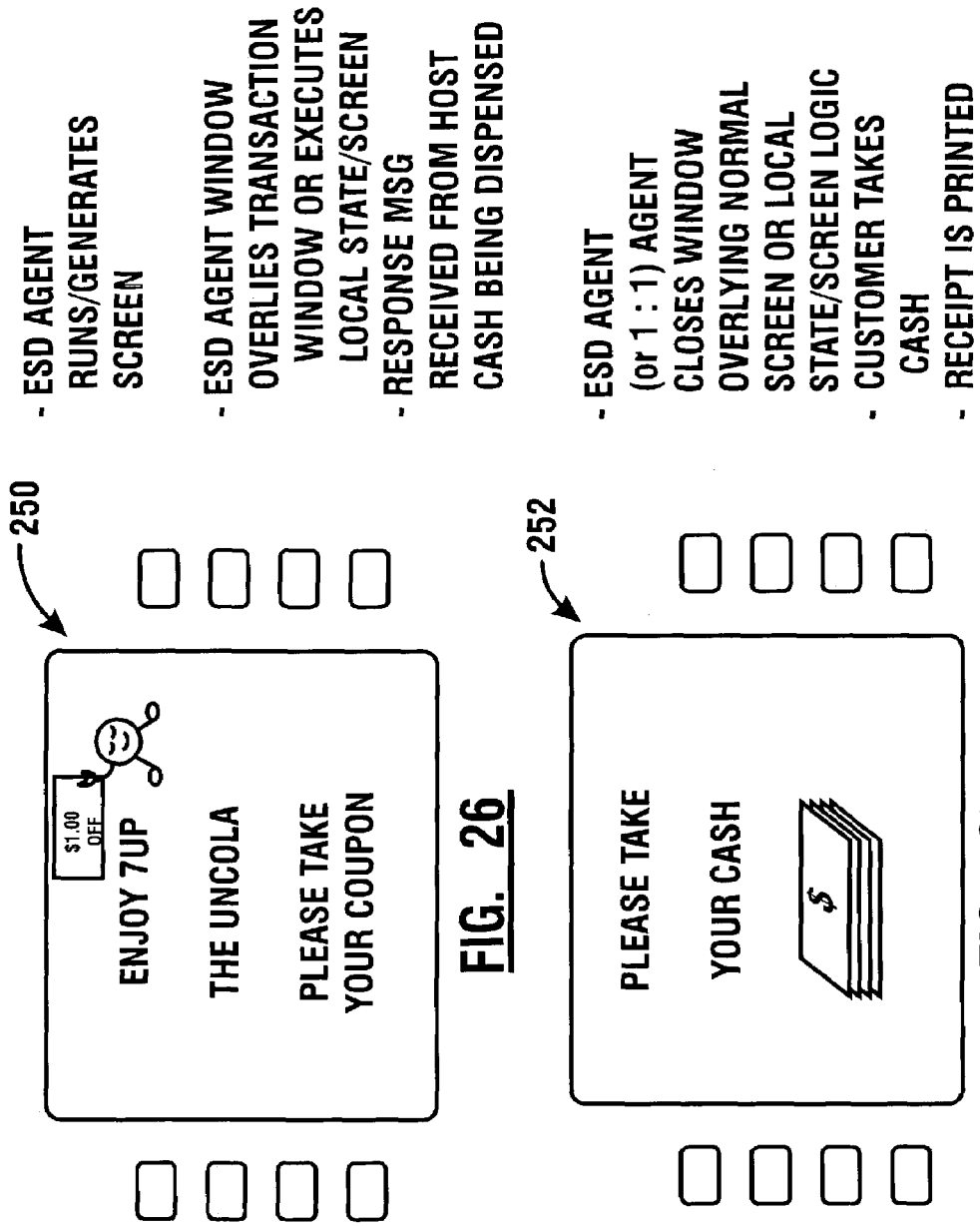

- ATM SCREEN PROMPTS CUSTOMER TO TAKE RECEIPT
- COMPLETION MSG SENT BY ATM TO HOST

- ATM SCREEN PROMPTS CUSTOMER CONCERNING ANOTHER TRANSACTION
- CUSTOMER DECLINES
- ESD AGENT SENSES END TXN INPUT

Main Screen

Campaign Creation

Current Campaigns:

| Name | Description | Marketing Group | Current | Owner |
|---|---|---|---|---|
| Campaign a | | McDonald (53) | Delivery not Scheduled | ABBRUZT |
| Campaign B | | McDonald (53) | Delivery not Scheduled | ABBRUZT |
| Coke | | BP(4) | Delivery Canceled | KiddingRU |
| Coke | | BP(4) | Deliver Canceled | KiddingRU |
| JBM Campaign | Movie for BP stations | JBM terminals (0) | Delivery not Scheduled | meekj |
| JBM11 | This is my second... | JBM terminals (0) | Delivery not Scheduled | meekj |
| jbmsample2 | | BP(4) | Delivery not Scheduled | meekj |
| Judo | Judo | Ipon (1) | Delivery not Scheduled | hearde |
| name | | BP (4) | Delivery not Scheduled | hearde |
| name | | BP (4) | Delivery not Delivered | hearde |
| name | | BP (4) | Delivery not Scheduled | hearde |
| name11 | | BP (4) | Delivery not Scheduled | meekj |
| open | | Mall (3) | Delivery not Scheduled | ABBRUZT |
| sample package | | dog1 | Delivery not Scheduled | KiddingRU |
| TCA1 | | The new dog (1) | Delivery not Scheduled | hearde |
| The Dog's Cam... | The Dog's Campaign | BP (4) | Delivery not Scheduled | hearde |
| the dog's camp... | the dog's campaign | BP (4) | Delivery not Scheduled | hearde |
| The new dog | the new dog | BP (4) | Delivery not Scheduled | hearde |
| The new dog's... | The new dog's ca... | | | |
| this is the name | This is the descrip... | | Delivery not Scheduled | KiddingRU |

[Add...] [Edit...] [Send to Wastebasket]

[Help] [Edit Wastebasket]

[Close]

Campaign Creation Selection

1. Enter the name of this package in the following fields. This name should be descriptive as it will be used to identify the package.

Campaign Name to Create:

Description:

2. Select a Distribution List. This is the group of SSTs that will receive the package that is named above.

Currently Defined Distribution Lists

| Name | Description | Number of SSTs in List |
|---|---|---|
| BP | SST in BP Gas Station | 4 |
| McDonald | SST in McDonald's | 53 |
| Mall | SST in Mall | 3 |
| SST in Lab | Lab Testing | 1 |
| SST in Lab 2 | Lab Testing | 0 |
| sample | sample 1 | 0 |
| JBM terminals | These are my terminals | 1 |
| dog1 | just a dog | 87 |
| sdfgsdfg | | |
| new group | | |
| The dog | the dog | 1 |
| The new dog | the new dog | 1 |
| lpon | lpon | 1 |

[ Create New Distribution List... ]

[ OK ]  [ Cancel ]  [ Help ]

| Wastebasket | | | |
|---|---|---|---|
| Name | Type | Description | User Name |
| JBM sample package | Campaign | zzzmy sample p... | meekj |
| name | Campaign | | hearde |
| Trish's Campaign | Campaign | sample | ABBRUZT |
| Training Campaign | Campaign | | ABBRUZT |
| JBM2 sample package 2 | Campaign | This is my 2nds... | meekj |
| Coke | Campaign | | KiddingRU |
| Coke | Campaign | | KiddingRU |
| Snapshot 1998/10/13 14:48 | Snapshot | My Snapshot JBM | meekj |
| Rollback 1998/10/13 15:02: | Retrieval | file Retrieval- m... | meekj |

Return Package to list    Export    Import

Close    Help

Campaign Confirmation

What Package is being delivered

Package Name: campaign a-

394

Where the package is going

Number of SSTs in list: 53

SST Group Name: McDonald - SST in McDonald's

View SST List

Current Time and Date: 11/11/98 3:31:33 PM

When the package is going to be delivered

Delivery Date and Time: As Soon As Possible

Delivery will occur in: Based upon server activities

Activation data and Time: As Soon As Possible

Activation will occur in: Based upon server activities

Confirmation OK    Cancel    Help

FIG. 58

Selected SSTs — 396

Group Name: McDonald - SST in McDonald's

| Name | Terminal ID | Location | Merchant |
|------|-------------|----------|----------|
| | 229 | McDonald's | MCDONALD'S |
| | 230 | McDonald's | MCDONALD'S |
| | 231 | McDonald's | MCDONALD'S |
| | 232 | McDonald's | MCDONALD'S |
| | 233 | McDonald's | MCDONALD'S |
| | 234 | McDonald's | MCDONALD'S |
| | 235 | McDonald's | MCDONALD'S |
| | 236 | McDonald's | MCDONALD'S |
| | 237 | McDonald's | MCDONALD'S |
| | 238 | McDonald's | MCDONALD'S |
| | 239 | McDonald's | MCDONALD'S |
| | 240 | McDonald's | MCDONALD'S |
| | 241 | McDonald's | MCDONALD'S |
| | 242 | McDonald's | MCDONALD'S |
| | 243 | McDonald's | MCDONALD'S |
| | 244 | McDonald's | MCDONALD'S |
| | 245 | McDonald's | MCDONALD'S |
| | 246 | McDonald's | MCDONALD'S |
| | 247 | McDonald's | MCDONALD'S |
| | 248 | McDonald's | MCDONALD'S |
| | 249 | McDonald's | MCDONALD'S |
| | 250 | McDonald's | MCDONALD'S |
| | 251 | McDonald's | MCDONALD'S |
| | 121 | McDonald's | MCDONALD'S |

[Close] [Help]

| Name | Status | Scheduled Delivery | Last Delivery | Scheduled Activity | UserNa... |
|---|---|---|---|---|---|
| asd | Delivery Sch... | As Soon As Possible | Not Delivered | As Soon As Possible | Meekj |
| Campaign a | Delivery not S... | As Soon As Possible | Not Delivered | As Soon As Possible | ABBRUZ |
| Campaign B | Delivery not S... | As Soon As Possible | Not Delivered | As Soon As Possible | KiddingRU |
| Coke | Delivery Sch... | 10/25/98 01:56PM | Not Delivered | 10/23/98 01:56PM | KiddingRU |
| Coke | Delivery Cane... | 09/17/98 4:28PM | Not Delivered | 09/27/98 04:28PM | KiddingRU |
| Coupon Select... | Delivery Succ... | 09/18/98 12:04PM | 09/21/98 03:04PM | 09/30/98 12:16PM | meekj |
| Fred | Delivery Cane... | 10/31/98 09:18AM | Not Delivered | 10/31/98 09:18AM | meekj |
| jbm | Delivery Sch... | 10/30/98 03:00AM | 09/21/98 06:04PM | 10/30/30 12:15AM | meekj |
| jbm | Delivery not S... | 09/18/98 12:04PM | Not Delivered | 09/30/98 12:16PM | meekj |
| JBM Campaign | Delivery Not S... | 10/17/98 12:00AM | Not Delivered | 10/24/98 12:00AM | meekj |
| JBMJ | Delivery not S... | 10/30/98 02:00AM | Not delivered | 11/01/98 12:00AM | meekj |
| jbmsample 2 | Delivery not S... | As Soon As Possible | Not Delivered | As Soon As Possible | hearde |
| Judo | Delivery not S... | Not Scheduled | Not Delivered | Not Scheduled | hearde |
| name | Delivery not S... | Not Scheduled | Not delivered | Not Scheduled | hearde |
| name | Delivery not S... | Not Scheduled | Not Delivered | Not Scheduled | hearde |
| name | Delivery not S... | Not Scheduled | Not Delivered | 10/06/98 12:00 Am | hearde |
| name11 | Delivery Cane... | As Soon As Possible | Not Delivered | As Soon As Possible | hearde |
| open | Delivery Cane... | 11/01/98/ 06:24AM | Not Delivered | As Soon As Possible | KiddingRU |
| Retrieval 1998/... | Delivery Cane... | 11/01/98 08:30PM | Not Delivered | As Soon As Possible | KiddingRU |
| Retrieval 1998/... | Delivery Sch... | As Soon As Possible | Not Delivered | As Soon As Possible | ABBRUZ |

398

Cancel Campaign Delivery | View... | Send to Wastebasket
Resend Failed... | Refresh List | Edit Wastebasket
Close | Help

| SST History | | | | | | |
|---|---|---|---|---|---|---|
| Terminal ID | Name | Address | City | State | ZIP Code | Merchant |
| 249 | | 5454 MARKET ST | San Franci... | CA | 95116 | MCDONALD'S |
| 250 | | 5454 MARKET ST | San Franci... | CA | 95116 | MCDONALD'S |
| 251 | | 5454 MARKET SY | San Franci... | CA | 95116 | MCDONALD'S |
| 107 | | Location5a1 | Location 5c | OH | 5 | Merchant Example |
| 110 | | 4840 SINCLAIR RD | Columbus | OH | 43229 | BP GAS STATION |
| 113 | | Location5a1 | Location 5c | OH | 5 | Merchant Example |
| 121 | | 14615 PEARL RD | Cleveland | OH | 44126 | MCDONALD'S |
| 123 | | 2800 BRITTAIN Rd | Akron | OH | 44310 | Engineering System De... |
| 252 | | 14615 PEARL RD | Cleveland | OH | 44126 | MCDONALD'S |
| lpon | lpon | 0000 Location Street | Locationville | ZZ | 99999 | DeBartolo Group |
| ABC123 | JBM terminal | 1126 E TALLMADGE... | Akron | OH | 44310 | WENDY'S |
| 4321 | JBMSST | 0000 Location Street | Locationville | ZZ | 99999 | DeBartolo Group |
| Rack 22 | SQA Test Ra... | 5995 Mayfair rd. | North Canton | OH | 44720 | Engineering System De... |
| 104 | Terminal 104 | 1126 E TALLMADGE... | Akron | OH | 44310 | WENDY'S |
| 320 | test | 516 W PERKINS AVE | Sandusky | OH | 44870 | SHELL GAS STATION |
| 324 | test2 | 1126 E TALLMADGE... | Akron | OH | 44310 | WENDY'S |
| 323 | test3 | 516 W PERKINS AVE | Sandusky | OH | 44870 | SHELL GAS STATION |
| Tony1 | Tony1 | Location5a1 | Location5c | OH | 5 | Merchant Exchange |
| 54223 | ztdfdhdfh | 0000 Location Street | Locationville | ZZ | 99999 | DeBartolo Group |
| 101 | zgfhgfh | Location5a1 | Location5a1 | OH | 5 | Merchant Example |

☑ Update SST Details

Last Snapshot: 8/18/98 4:28:37 PM    Unsuccessful

Last Rollback: 8/19/98 4:28:37PM    Unsuccessful

Last File Retrieval:    Not retrieved

View Distribution History...

View Retrieved Files...

Close....    Help

| Name | Address | City | State | ZIP Code |
|---|---|---|---|---|
| BP Gas | 4840 SINCLA | Columbus | OH | 43229 |
| BP Gas | 681 US HIGH... | Aberdeen | OH | 45101 |
| BP Gas | 1 MAIN ST | Greenwich | OH | 44837 |
| BP Gas | 807 HARTFO... | Canton | OH | 44707 |
| Chapel Hill Mall | 2000BRITA | Akron | OH | 44310 |
| Location Example | 0000Location | Locatio... | ZZ | 99999 |
| Location3n | Location3a1 | Locatio... | OH | 3 |
| Location5n | Location5a1 | Locatio... | OH | 5 |
| McDonald's | 14615 PEAR... | Cleveland | OH | 44126 |
| McDonald"s | 4621 MISIO... | San Fra... | CA | 95115 |
| McDonald's | 5454 MARKE... | San Fra... | CA | 95116 |
| McDonald's | 112 DUEBER... | Canton | OH | 44720 |
| McDonald's | 3109 CLEVEL... | Canton | OH | 44707 |
| Shell Gas | 515 W PERKI... | Sandusky | OH | 44870 |
| Shell Gas | 123 HOW AVE | Akron | OH | 44305 |
| SQA Test Floor | 5995 Mayfair... | North C... | OH | 44333 |
| Summit Mall | 3265 W MAR... | Akron | OH | 99999 |
| Test Example | 1234 Test Str... | Testville | ZZ | 99999 |
| testbla | 54545 | Akron | CA | 44112 |
| Wendy's | 1126 TALL... | Akron | OH | 44310 |
| Wendy's | 13246 CEDA | Cleveland | OH | 44112 |

330

[Add...] [Edit...] [Delete]

[Close] [Help]

328

Location Add/Edit

Name and Address
- Location Name:
- Address:
- City:
- State:
- Zip Code:
- Country:

Contact
- Name:
- Phone:
- Name:
- Phone:

Merchant Selection

Merchant Example

Merchant Description

0000 Merchant Street
,
Merchantville OH 99999

Edit...

Define New Merchant...

Timezone Selection

EST (Eastern Standard Time)

OK  Cancel  Help

FIG. 71

| Merchant Selection | | | | |
|---|---|---|---|---|
| Name | Address | City | State | ZIP Code |
| BP GAS STATION | BP gas station addr | Cleveland | OH | 44240 |
| DeBartolo Group | 123 anystreet | Youngstown | OH | 12345 |
| Engineering Syste... | Here and Now | Cleveland | OH | 44214 |
| first Bank | 100 Franklin St | Chicago | IL | 12345 |
| MCDONALD'S | 5353 ATLANTIC AVE | Long Beach | CA | 90808 |
| Merchant Example | 0000 Merchant Street | Merchantvi... | ZZ | 99999 |
| Merchant1n | Merchant1a1 | Merchant1c | OH | 1 |
| Merchant2n | Merchant2a1 | Merchant2c | OH | 2 |
| Merchant4n | Merchant4a1 | Merchant4c | OH | 4 |
| SHELL GAS STAT... | 5991 GLENWAY AVE | Cincinnati | OH | 45238 |
| WENDY'S | 623 MARKET ST | Akron | OH | 44312 |

Add...  Edit...  Delete

Close  Help

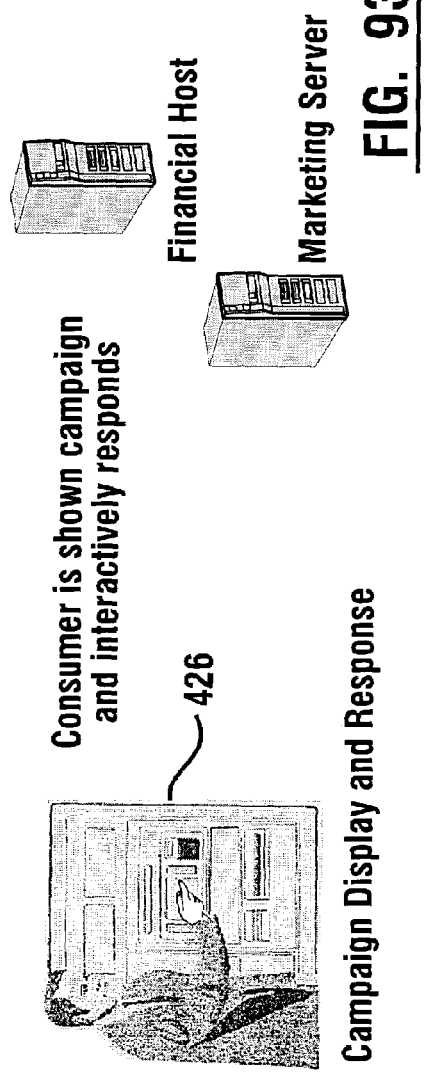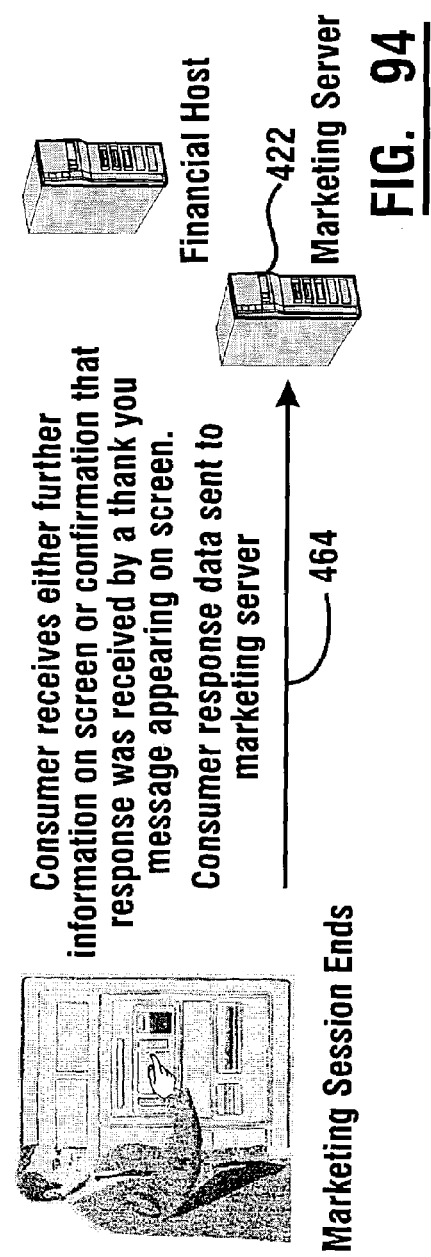

Transaction Complete

End of ATM Transaction

ATM CUSTOMER MARKETING SYSTEM

CROSS-REFERENCE TO RELATED APPLICATIONS

This application is a Divisional of application Ser. No. 09/449,426 filed Nov. 24, 1999 now U.S. Pat. No. 7,039,600, which claims benefit pursuant to 35 U.S.C. § 119 (e) of Provisional Application No. 60/110,125 filed Nov. 27, 1998.

TECHNICAL FIELD

This invention relates to automated transaction machines. Specifically this invention relates to an automated transaction machine, system and methods of operation that are capable of making marketing presentations to users.

BACKGROUND ART

Automated transaction machines are known in the prior art. A common type of automated transaction machine is an automated teller machine (ATM). ATMs are commonly used by consumers to conduct financial transactions. Transactions commonly conducted at ATMs include dispensing cash, making deposits, transferring funds between accounts, check cashing, bill payment and account balance inquiries. Other types of transactions may be carried out on an automated basis at ATMs depending on the particular transaction function devices included in the machine.

Other types of automated transaction machines may also be used for carrying out financial transactions of other types. For example, automated transaction machines may be used for dispensing tickets, dispensing and receiving gaming materials, issuing scrip, issuing or redeeming vouchers or other items, as well as other types of transactions. For purposes of this disclosure, an automated transaction machine will be considered as any machine that is used to conduct transactions that involve transfers of value. For purposes of this disclosure a financial transaction will include any transaction that involves a transfer of value. Although the description of the invention herein will be made with reference to an ATM, it should be understood that the principles of the invention are equally applicable to many types of automated transaction machines.

Automated teller machines which are conventionally deployed today are programmed to execute a series of steps. The steps generally include communication with a remote host computer to carry out banking transactions. ATMs generally include a display screen or other user interface for instructing users in the operation of the machine. The programming of the machine is such that each user of a particular automated teller machine is presented with the same displays or "screens" in the course of conducting their transactions. While some screens may include the customer's name, which is often read from their card, and information such as amounts input by a customer through a keyboard, the screens are otherwise the same for all users. It is common for the operator of the ATM such as a financial institution to include presentations in the screens promoting the operator's institution. However, promotional messages are provided to every user of the ATM.

FIG. 1 shows an exemplary system 10 including an ATM 12 and a remote host computer 14. The ATM and host computer are enabled to communicate through a network 16. It should be understood that the network in most existing systems may include a telephone line, data line or lease line connection as well as several intermediate computers, which assist in transferring the messages between the ATM and the host which can authorize the transaction.

The steps which occur in conducting a typical cash dispense transaction are shown. Typically when an ATM is waiting for a transaction, an idle screen is presented which prompts an approaching user to insert their card. This is represented by step 18 in FIG. 1. Once the user inserts their card, the card reader in the ATM operates to read the information from the card. This information typically includes the user's name and primary account number (PAN). Additional information may also be included. The reading of the card is schematically represented by step 20.

After the card is read the ATM operates to present another screen which prompts the customer to input their personal identification number (PIN). This is represented by a step 22. As represented by step 24, the ATM receives the customer's PIN through the keypad, touch screen or other input device on the ATM. After receiving the PIN, the ATM generates another screen which prompts the customer to select a transaction. This is represented by step 26. The customer then makes a selection of a transaction by actuating an input device. This is represented by a step 28. In various types of ATMs the input of the transaction selection may be made by touching a function key adjacent to the screen display. In other ATMs, which include touch screen type devices, the customer may select a transaction by bringing a finger adjacent to the touch screen. Other types of ATMs may have different types of input devices through which a transaction selection may be made.

After the customer has provided a transaction request input corresponding to a transaction type, the ATM typically presents another screen which prompts the user to select an account to which the transaction will be related. This is represented by a step 30. Usually the customer has the option of selecting either a checking or a savings account for a cash dispense or deposit transaction. In addition, if the customer has selected a dispense transaction, as will be the case in this example, the customer may be presented with the option of receiving the funds as a cash advance on a credit card. The user responds to the account selection screen by providing inputs to one of the input devices to indicate the particular account. This is represented by a step 32.

After the customer has selected the transaction and the account to be used, another screen is presented by the ATM to prompt the customer to enter an amount. This is represented by a step 34. In this exemplary transaction the customer is going to receive a dispense of cash, and in response to the prompt screen the customer inputs a numeric value corresponding to an amount of cash they wish to receive through the keypad or other input device. This is represented by a step 36. It should be understood that different or other steps may be involved in other transaction types.

In the exemplary withdrawal transaction being discussed in connection with FIG. 1, a customer has now input to the ATM all the information necessary to formulate a request message to a remote host computer. This request message is schematically indicated 38. In the exemplary embodiment the request message may be a Diebold® 91X type transaction message, which is a known format for use by ATM networks. The request message 38 includes information representative of the customer's account number 10, transaction selection and amount requested.

The host 14 receives the request message 38 through the network 16. The request message is enabled to be routed through the network based on information which identifies the institution where the user has their account. This information is typically included in the account number on the customer's card. This institution identifying portion is commonly known as a bank identification number (BIN). When the host 14 receives the request message, the host computer operates to verify that the PIN input by the customer corresponds to the PIN for their account number. The host also checks to verify that the amount they wish to withdraw is available from the selected account. This is done at a step 40. While step 40 is occurring at the host computer, ATM 12 presents a "wait" screen to the user. This is represented by a step 42. Typical wait screens commonly advise the customer that "your transaction is being processed" or may include statements such as "please wait" or the like.

When the host 14 determines that the customer's PIN was input correctly and that the money is available in their account, the host generates a response message 44. Response message 44 is returned to the ATM through the network 16. It is assumed for purposes of this example that the response message includes data representative of the fact that the transaction requested has been authorized. Commonly such messages include an indication of the next "state" that the machine should execute, and this information is used by the ATM to either perform the requested transaction or to display a screen advising the customer that their transaction cannot be processed.

In this example it is presumed that the transaction is authorized and the response message causes the ATM to run its cash dispenser and other transaction function devices that must operate to achieve a dispense of cash. This is represented by a step 46. When the cash is dispensed the ATM will also print a receipt for the customer as represented by a step 48 and will generally make a hard copy record concerning the transaction in a journal which is represented by a step 50.

The execution of the cash dispensing and printing steps also causes screens to be displayed in response to the then current states, which states are part of the programming in the ATM and which control the logic flow of the machine in the course of performing transactions. The programming of the ATM would generally cause a screen prompting the user to take their cash to be displayed once the cash is dispensed. This is represented by a step 52. Once the receipt is printed, a screen is generally displayed which prompts the user to take their receipt. This is represented by a step 54. It should be understood that these Various steps and the screens may vary depending on the transaction involved and the programming of the ATM machine.

The ATM having performed the transactions successfully will generate a message back to the host advising the host computer that the customer's account balance should be modified in accordance with the transaction conducted. This is done through a completion message schematically indicated 56. For purposes of this example it will be presumed that the completion message includes data representative of the transaction being carried out successfully. If the transaction could not be carried out successfully the completion message may include information representative of that fact. Upon receipt of the completion message the host 14 operates in accordance with its programming to assess the appropriate charge to the customer for the cash received as represented at a step 58 and to make a record of the transaction as represented by a step 60.

The ATM will then generally operate in accordance with its programming to present a screen prompting the user to indicate if they would like another transaction. This is represented by a step 62. If the user wishes to have another transaction conducted, they may do so by providing an input to that effect. The machine then returns to the point in the logic flow indicated by arrow B. This is represented by a step 64. If the customer does not wish to conduct another transaction they so indicate by providing a different input. This is represented by a step 66. The ATM then operates in accordance with its programming to return the customer's card at a step 68. A screen is then presented prompting the user to take their card which is represented by a step 70, and the ATM returns to the beginning of the logic flow as represented by arrow A. In this condition the ATM is ready to receive a card from another customer and to conduct additional transactions.

While conventional ATM programming is highly efficient for conducting transactions, it provides only a limited range of marketing capabilities to the ATM operator. While the operator may present some customized material in their screens promoting services provided by the institution, such information will not be of interest to many users. In addition, when institutions provide promotional messages, they often provide information that is only of value to customers of the particular institution. ATM users who are not generally customers of the institution will often have no interest in the promotional messages presented.

Some prior art systems have developed the capability of conducting an analysis of customer information at the host computer. The host computer either itself or through other connected computers may determine a particular marketing message that might be appropriate to present to the particular customer. The response message generated by the host may include data representative of a particular message to present. Alternatively, the ATM may include a CD-ROM or other data storage device which has marketing presentations thereon. The response message from the host may include an instruction to play one of these marketing presentations for the customer. The ATM then operates in accordance with the response message to provide the message to the customer.

While this approach provides more marketing options for operators of ATMs, such systems have drawbacks. One of these drawbacks is that it can slow transaction times for ATM operators by requiring the host to not only do the necessary financial transaction processing, but also the necessary processing to determine the appropriate marketing message. This additional processing time combined with the promotional message presentation time can slow down a user's operation of an ATM and annoy both the user and others who are waiting to use the machine.

A further drawback associated with such prior marketing systems is that the ATM programming and financial transaction flow must be significantly modified to accommodate the display of marketing presentations. In addition, the ATM must be modified to accommodate additional devices such as a video disc player or other appropriate storage medium for the presentations. A further drawback is that such systems do not have the capability of receiving responsive inputs from the customer concerning the presentation. This inability to obtain immediate feedback through the ATM terminal as well as the inability for a user to immediately accept a marketing offer, usually results in the user not following up on the offer even if there is some interest.

A further drawback associated with existing ATM marketing systems is that users will generally receive the same promotion every time they use the ATM. As a result, after the first presentation the user will generally ignore further follow-up presentations and will consider their presentation an inconvenience. A further drawback of existing systems is that the data which specifies the marketing information must come from the host computer that can authorize the transaction. Many times this is not a host computer that is controlled by the operator of the machine. If the host computer relies on presentations stored at the ATM machine to give the appropriate promotional message, and the ATM does not include this capability, no promotional message may be sent. A further complication would be if the ATM has the capability but the presentation files stored do not correspond with those that the host expects. This could result in a presentation of a totally inappropriate message to the user. A further drawback of such existing approaches is that the owner of the ATM cannot specifically address messages to those users who are not currently customers of the owning institution. This is because the entity owning the ATM cannot authorize the transaction unless the customer is one who already has their account with the institution owning the ATM. Conventional systems do not enable the ATM owning entity to selectively provide presentations to users who are not its customers for other purposes.

ATMs are also now increasingly owned or leased by the operators of the facilities in which they are installed. Alternatively the owner of the facility may rent space to an entity that provides the ATM. These facilities may include for example fast food restaurants, grocery stores, gas stations, bars, casinos or other facilities. Such ATMs present opportunities for marketing of products provided by their owner or an associated franchise of which their owner is a participant. Such ATMs may be used to promote products of the facility. In addition, operators of facilities where such ATMs are installed may not object to other products being promoted through their ATMs. This is particularly true if such other products would help to generate revenue from the advertiser. However, they would not want their competitor's products promoted on their ATM. At present there is no effective way to provide such marketing messages on a selective wide scale basis.

Thus, there exists a need for an improved ATM customer marketing system that is used to provide marketing messages to ATM users selectively based on the particular user as well as the location of the machine they are operating. There further exists a need for an ATM marketing system that does not significantly slow ATM transaction times and which does not adversely impact the financial transaction process and capabilities of the machine.

DISCLOSURE OF INVENTION

The following objects are objects of at least some exemplary embodiments disclosed herein.

It is an object of the present invention to provide an ATM customer marketing system and method.

It is a further object of the present invention to provide an ATM customer marketing system and method that may be used to selectively provide marketing messages to a user.

It is a further object of the present invention to provide an ATM customer marketing system and method that may be used to selectively provide a sequence of marketing messages to a user during different visits to ATM machines.

It is a further object of the present invention to provide an ATM marketing system and method that can receive immediate feedback from ATM users concerning marketing messages.

It is a further object of the present invention to provide an ATM customer marketing system and method that does not impact the underlying speed and reliability of the ATM in processing financial transactions.

It is a further object of the present invention to provide an ATM customer marketing system and method that selectively enables the presentation of different promotional messages and campaigns among groups of ATM machines.

It is a further object of the present invention to provide an ATM customer marketing system and method that enables analysis and use of the results of ATM marketing campaigns.

It is a further object of the present invention to provide a method of operating an ATM customer marketing system which provides increased effectiveness in marketing to ATM customers.

It is a further object of the present invention to provide a method and system for marketing to users of automated transaction machines.

Further objects of the present invention will be made apparent in the following Best Modes for Carrying Out Invention and the appended claims.

The foregoing objects are accomplished in an exemplary embodiment of the present invention by providing an automated transaction machine such as an ATM which is capable of carrying out transactions with connected financial computers. The ATM is programmed to send information representative of the identity of the customer to a remote computer which is different from the computer which is involved in authorizing the ATM transaction. In the exemplary form of the invention this information, which is representative of a customer's account number, is sent at the earliest available opportunity in the transaction before a financial transaction message is sent to the remote computer which processes the financial transaction requested by the user.

The computer handling the marketing message activity receives the information identifying the customer and determines the appropriate message or series of messages to be presented to the customer. A message including data indicative of this information is returned to the ATM. The ATM presents this information to the customer through its interface during the financial transaction. In some exemplary forms of the invention marketing sessions may be conducted during lull times such as when the machine is waiting for a response message from an ATM host or at other suitable times during the transaction. The customer is also enabled to respond with choices and input data in response to the marketing messages presented. This information is returned to the computer handling the marketing information. This enables the customer's indication of interest or acceptance of offers to be promptly responded to. In addition, the system of the invention enables the owner of the ATM to control the presentation of messages. This may be particularly helpful when the owner of the machine is attempting to obtain additional business from users of its ATM who are customers of other institutions.

The exemplary form of the present invention further includes a system for preparing promotional campaigns which include marketing presentations. The campaigns are selectively delivered and executed in ATMs connected to the system. This enables different types of promotional messages to be selectively presented at different ATMs. The exemplary form of the invention also provides for the distribution of coupons and similar premiums. The exemplary system further includes the tracking and analysis of the distribution of premiums and other marketing information. The exemplary system also provides other types of marketing and presentation capabilities at ATMs and other types of automated transaction machines.

BRIEF DESCRIPTION OF DRAWINGS

FIG. 9 is a schematic view of messages of a first type that are presented to a user of an ATM to encourage them to open a checking account with an institution owning the ATM.

FIG. 10 is a schematic view of presentations presented to an ATM user during a series of visits to ATMs to encourage them to acquire checking overdraft protection.

FIG. 11 is an exemplary sequence of messages that are presented to an ATM user to encourage them to take advantage of an offer which allows them to skip credit card payments.

FIGS. 14 through 31 are a schematic representation of the logic flow in an exemplary transaction which demonstrates features of the ATM customer marketing system of the exemplary embodiment.

FIGS. 91-96 are graphical views representative of steps in the transaction represented in FIG. 90.

BEST MODES FOR CARRYING OUT INVENTION

Figure 2:
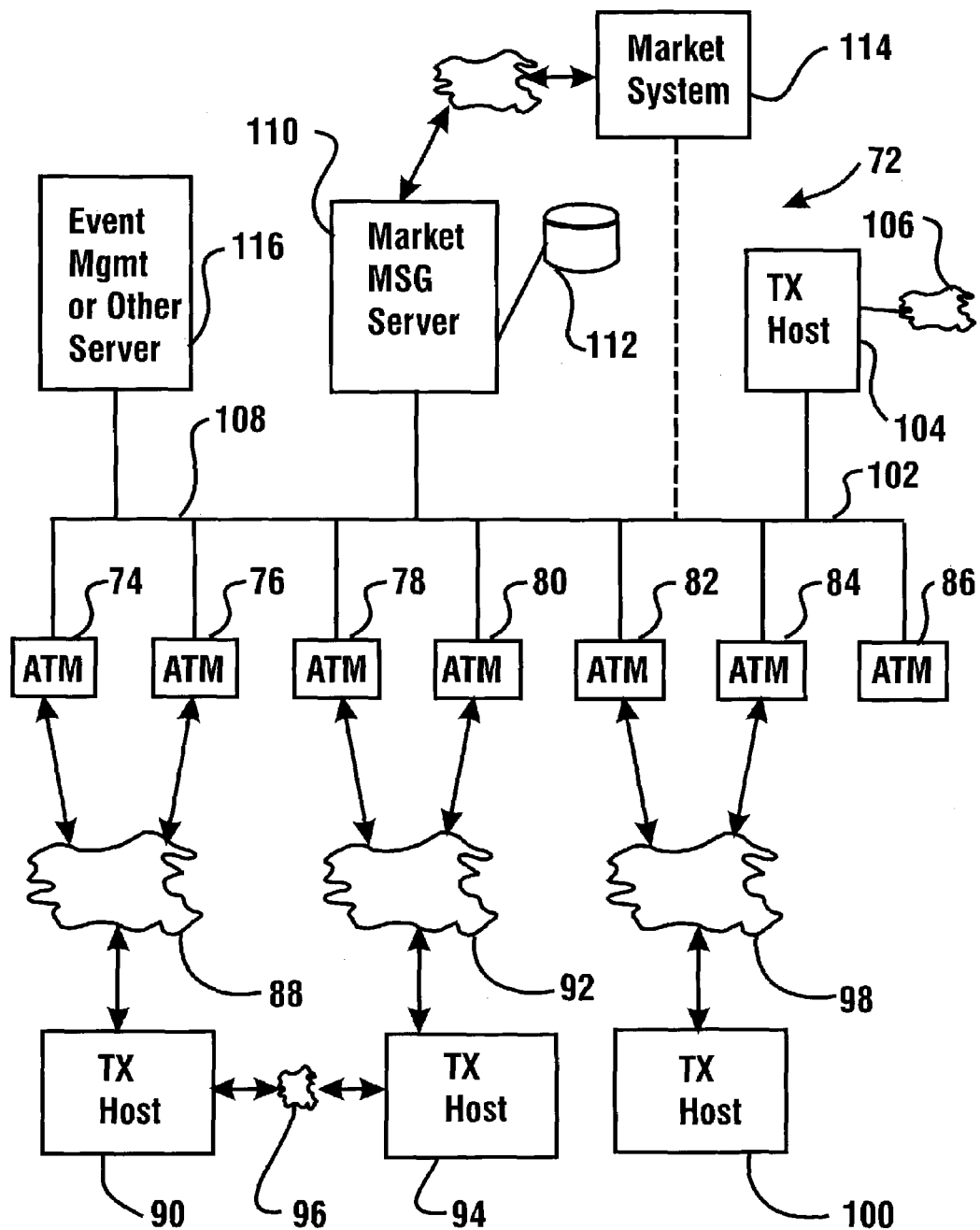
FIG. 2 is a schematic view of an ATM customer marketing system of an exemplary embodiment of the present invention.

Referring again to the drawings and particularly to FIG. 2, there is shown therein schematically a system generally designated 72 which includes a first form of an exemplary ATM customer marketing system. It should be noted that this exemplary system includes a range of capabilities intended to demonstrate aspects of the present invention. Other systems which are encompassed by the present invention may not include all the features described herein. Embodiments of the invention may also have other or additional features.

The exemplary system shown in FIG. 2 includes ATMs 74, 76, 78, 80, 82, 84 and 86. These ATMs may be similar to ATM 12 previously discussed or may be other types of ATMs or automated transaction machines. It should be understood that this grouping of ATMs is exemplary. In the example shown, ATMs 74 and 76 are shown in communication with a network 88. Network 88 is an ATM or other financial transaction network which communicates transaction messages between the ATMs and an ATM host computer schematically indicated 90. Such communications may occur between ATMs 74, 76, and host 90 in a manner similar to the communications between ATM 12 and host 14 previously described.

ATMs 78 and 80 communicate through a network 92 with a host 94. ATMs 78 and 80 may communicate, for example, to a different host or ATM processor than ATM 74 and 76. As schematically represented, a network interconnection 96 may enable hosts 90 and 94 to communicate. This interconnection may allow a customer whose transactions are processed at host 94 to use ATM 74.

ATMs 82 and 84 are connected through a network 98 with a transaction host 100. Transaction host 100 is representative of a host computer which is not interconnected to other transaction processing hosts. This may be, for example, a closed system in which ATM users are only enabled to use the machines which are operated by the particular institution with which they have accounts. Alternatively, host 100 may be representative of a credit card processing system. ATMs connected to such systems may only be enabled to dispense cash and have the amount dispensed charged to the credit card along with a transaction processing fee. This is in contrast to debit card systems which often enable a user to dispense money directly from their checking or savings account. Of course, in some cases debit card accepting systems may also enable the user to take a cash advance on a credit card.

The ATM 86 is schematically representative of an open systems type ATM of the type shown in published International Application PCT/US97/21422 filed Nov. 25, 1997, and published as WO98/24041 which is owned by the Assignee of the present invention and which is incorporated by reference as if fully rewritten herein. ATM 86 is shown connected through a TCP/IP connection 102 to a transaction host or server 104. Transaction server 104 is capable of operating the ATM 86 through a TCP/IP connection. In addition, server 104 may be connectible to a network 106 to other servers in the network. Network 106 may be a local area network, a wide area network or even the Internet.

Network 106 may provide connections to other servers which are capable of verifying the identity of the user operating ATM 86 as well as to authorize transactions. Any of the host computers represented may operate to process transactions in a manner described in allowed U.S. patent application Ser. No. 08/813,510 filed Mar. 7, 1997, now U.S. Pat. No. 6,039,245, which is owned by the Assignee of the present invention and which is incorporated by reference as if fully rewritten herein. It should be understood that these ATM transaction processing configurations are exemplary and in other systems other configurations may be used.

As will be appreciated from the foregoing discussion, each of the ATMs communicates transaction messages with a respective transaction host and network. These transaction messages include the messages necessary to authorize financial transactions. However, in the exemplary system 72, each of the ATMs also is connected to a TCP/IP network 108. The TCP/IP network has connected thereto a computer that is separate from the host computer which is used to authorize transactions. This computer is a market message server schematically indicated 110. The market message server is in operative connection with a database 112. Database 112 in this exemplary system includes data related to ATMs, promotional materials, campaigns, customers and other information necessary or desirable to selectively make marketing presentations to users at the ATMs. It should be understood that while the exemplary network 108 communicates messages in TCP/IP, in other embodiments other communications methods may be used.

The market message server may also be connected to a market system schematically indicated 114. The market system may include one or more connected computers and databases such as a data warehouse which is used for holding information concerning users of the system. System 114 may in addition or alternatively be a system that can be accessed for purposes of importing marketing presentation materials. Market system 114 may also or alternatively be a connected system for providing outputs which may be used to follow up on customer responses or to respond to customer requests. System 114 may also include capabilities for analyzing and modifying promotional messages and marketing campaigns. Various different or additional features may also be employed in the various systems connected to the market message server 110 and market system 114. As schematically indicated, market system 114 may be connected to the network 108 or may be connectable to one or more market message servers through various other types of electronic connections.

Network 108 further has connected thereto an additional server 116. Server 116 may be used for carrying out various types of functions in the system. One exemplary application which may be operated in server 116 is an event management system as described in allowed U.S. patent application Ser. No. 08/813,511 filed Mar. 7, 1997, now U.S. Pat. No. 5,984,178, which is incorporated by reference as if fully rewritten herein. The event management system is operative to receive messages that are indicative of conditions or status type information which exists at ATMs and to notify appropriate persons to take responsive or corrective action. In addition, the event management system may be operative to provide follow-up messages concerning conditions and to analyze status conditions which occur. Of course, other types of servers which carry out other types of functions may be included in the network 108.

Figure 3:
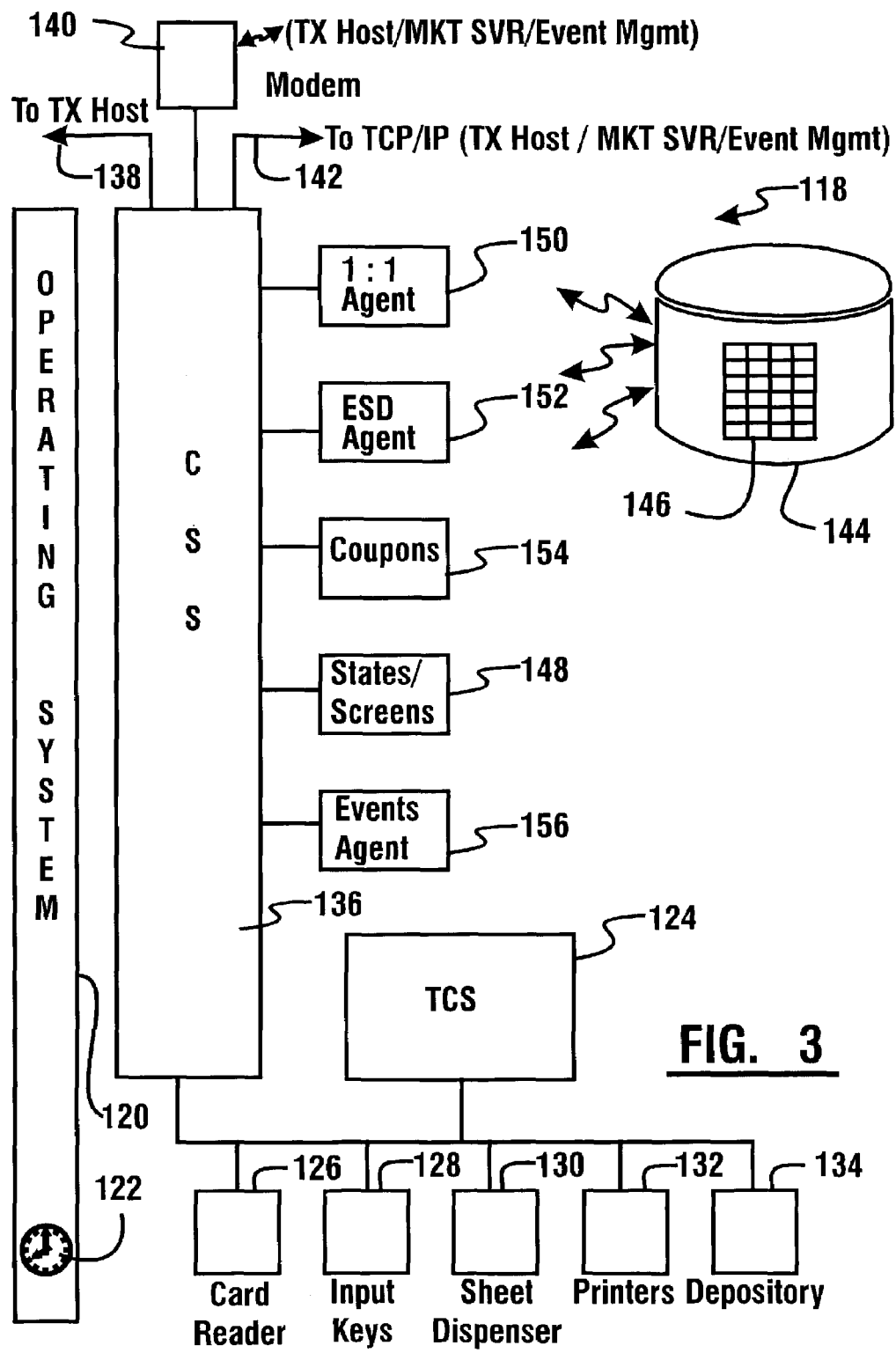
FIG. 3 is a schematic view of the software architecture included in an ATM used in the exemplary embodiment of the invention.

FIG. 3 is a schematic view of the software architecture which resides on a computer in an exemplary ATM which is used in connection with an embodiment of the present invention. This exemplary architecture schematically indicated 118 includes an operating system schematically indicated 120. Operating system 120 may be any of a number of operating systems such as OS2® version 4 from IBM, Windows98® or WindowsNT® from Microsoft or other suitable operating systems that operate in one or more computers to carry out the functions described herein. As schematically represented in FIG. 3, the operating system is in operative connection with a system clock 122.

Software applications running in the ATM include a terminal control software application schematically indicated 124. The terminal control software application is operative to control transaction function devices used in the ATM. These transaction function devices include the devices in the ATM that carry out transaction functions. These include in exemplary embodiments a card reader, input keys, function keys, sheet dispensers, printers, depositories, check reading devices and other transaction related components. The terminal control software application provides control signals and receives signals from the transaction function devices through respective device interfaces schematically indicated 126, 128, 130, 132 and 134. It should be understood that these devices and device interfaces are exemplary and that other embodiments of the invention may include other or additional devices and interfaces.

The exemplary embodiment of the software architecture 124 further includes a communication subsystem 136. A communication subsystem is operative to provide communication of messages from the ATM to other connected components. Such messages are preferably made by the communication subsystem in the protocols and message formats which are required by connected systems. In the embodiment shown, the communication subsystem is shown schematically with a connection 138 which represents a connection to an ATM host. This host connection may be a connection which provides, for example, a lease line connection communicating Diebold 91X transaction messages of the type previously described in the suitable protocol which can be handled by the financial transaction host. The connection is made through a suitable driver or other interface to the communication system which connects to the host.

The communication subsystem is also shown with a modem connection 140. This modem connection may be a continuous phone line type connection or a dial-up connection. The modem connection 140 may be controlled to communicate with other systems and components including components which may be connected to TCP/IP type networks and other types of networks. The communication subsystem 136 further includes an output 142, which in the embodiment shown is representative of a TCP/IP connection. Such a connection may be to TCP/IP network 108 or other networks. The connection may be made through a suitable network interface. It should be understood that these connections are exemplary and that other types of communications connections and configurations may be used in embodiments of the invention. In addition in some embodiments of the invention the ATM may connect to more than one network through a single physical connection.

As shown in FIG. 3, the software architecture further includes an operatively connected database 144. Database 144 preferably resides locally relative to the ATM and may include one or more data storage devices or regions which provide data storage for instructions, configuration data and other data used in operation of the various software components which operate within the ATM. As will further be discussed in detail, in an exemplary embodiment of the invention the data store also includes marketing presentation materials schematically indicated 146. These marketing presentation materials may include for example MPEG files, coupon graphics, coupon configuration data, screen icons, local states, local screens and activation script or other programming for causing the operation and presentation of such items in the computer of the ATM.

In the exemplary software configuration shown in FIG. 3, a states and screens application 148 is shown in connection with the communication subsystem 136. The states and screens application includes programs which correlate graphical output screens and programmed states which exist within the configuration of the machine. Such states may be representative of particular conditions or points in the execution of transaction logic flows which have associated screen presentations. In addition, the states and screens application may include states and screens logic downloaded or otherwise installed into memory in the machine which enables the execution of steps and the presentation of screens associated with marketing presentations which may be presented to users at the ATM.

A further software agent shown in connection with the communication subsystem 136 is associated with presenting marketing presentations targeted specifically to the current user of the ATM. The software agent is referred to as a 1:1 agent and is schematically indicated 150. Agent 150 executes program steps which cause the ATM to send information which identifies the current user to an external system such as the market message server. Agent 150 is also preferably operative in response to messages it receives to execute steps which cause presentations to be made and which cause user responses to presentations to be passed to the market message server or other connected systems. Agent 150 is operative to accomplish this activity without substantially affecting the operation of the ATM with regard to financial transaction messages. In one exemplary form of the invention later discussed, the 1:1 agent is operative to receive messages indicative of marketing messages to be presented to a user of the ATM through a separate communications path other than that used for transaction messages, and at a time before a transaction response message is received from the transaction processing host.

A further software agent designated ESD agent 152 is in communication with the communication subsystem 136. The ESD agent as later described in detail is operative to control the loading of market messages into the data store associated with the computer that operates in the ATM. In addition, ESD agent 152 in this exemplary embodiment is operative to control the presentation of marketing messages and other items associated with campaigns presented at the ATM. The ESD agent 152 is further operative to provide information concerning marketing messages and campaigns to a connected server such as the market message server so that results can be analyzed.

A further agent in operative connection with the communication subsystem 136 is a coupon application schematically indicated 154. Coupon application 154 works in cooperation with other applications in a manner hereinafter described to provide users of the machine with coupons and other promotional items associated with marketing messages and campaigns.

The exemplary software architecture 118 further includes an events agent schematically indicated 156. The events agent 156 is operative to monitor the generation of status messages of the solicited and unsolicited types by the transaction function devices and other devices within the ATM. The events agent 156 is responsive to the generation of status messages and to transmit corresponding messages either by modem or other communications channel to a server operating an event management system which takes action in response to these messages. The events agent 156 avoids the need to send messages to the server operating the event management system through the financial transaction processing host. This facilitates the delivery of messages to the particular entities that are responsible for taking corrective action at the ATM which generated the status message.

Figure 5:
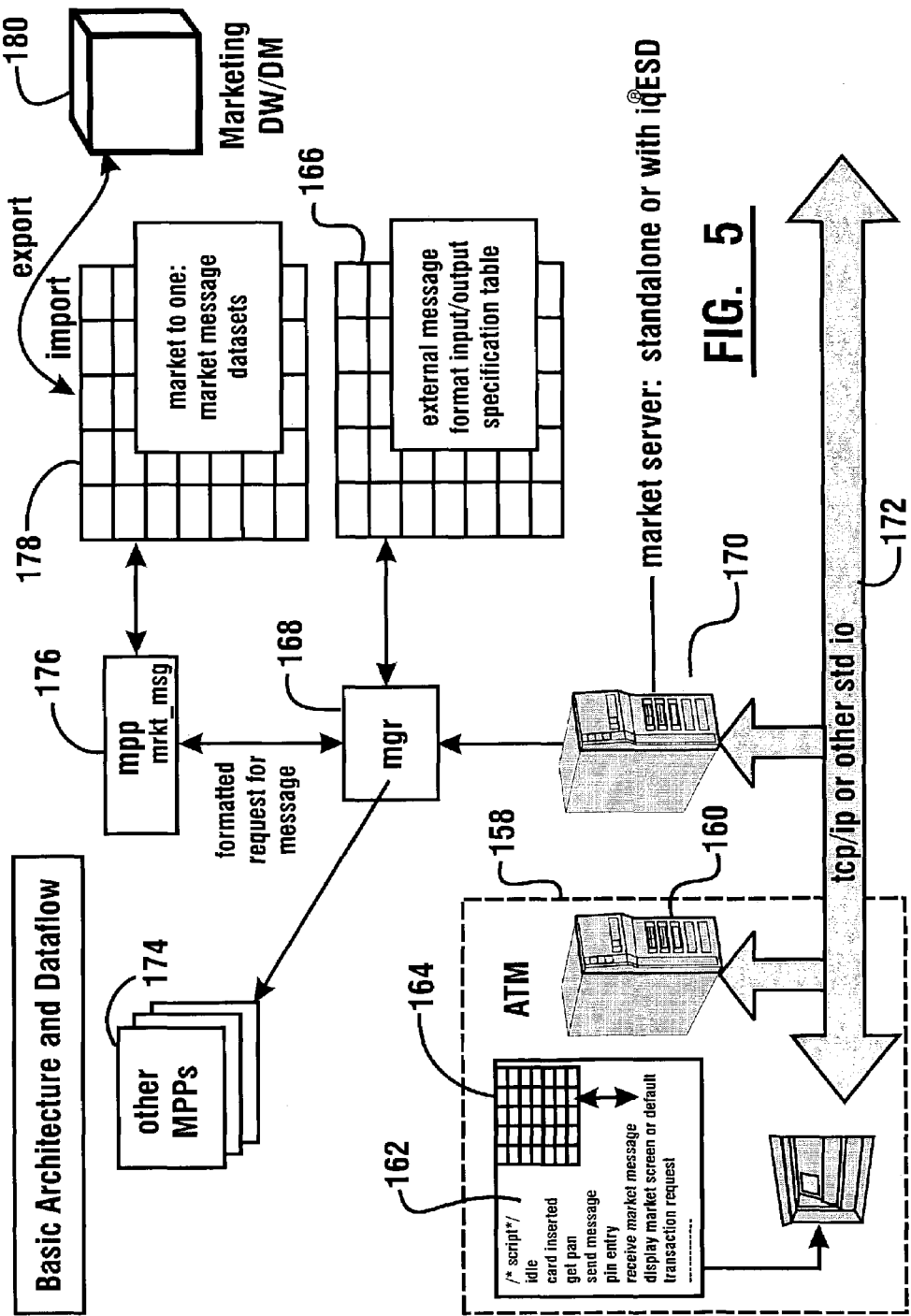
FIG. 5 is an exemplary embodiment of the architecture and data flow in the exemplary embodiment of the system.

The operation and architecture of an exemplary embodiment of the ATM customer marketing system of the invention is schematically represented in FIG. 5. An ATM 158 includes a computer 160 which is in operative connection with a data store 162. The data store includes instructions for operating the ATM and executing the associated financial transaction logic flow. The data store also includes data usable to generate a plurality of marketing presentations, for example, screens, graphics, icons, coupon layouts and other promotional items, which are schematically represented as market presentation materials 164. The market presentation materials may be originally loaded into the ATM from one or more external sources schematically indicated 166. The presentation material sources 166 operate to cause the presentation materials selectively downloaded into the data stores associated with the ATMs in accordance with presentation and distribution logic which is established through a system referred to by the Assignee of the present invention as iq® ESD, later described in detail.

The loading of the presentation materials from the presentation material sources is achieved through use of a message gateway router (MGR) software component schematically indicated 168. The message gateway router operates in a manner described in detail in the incorporated U.S. patent application Ser. No. 08/813,510 filed Mar. 7, 1997. The MGR converts the original formats of the presentation materials to a format suitable for delivery to the ESD agent 152 resident on the ATM. MGR 168 runs on a market message server schematically indicated 170 in FIG. 5. The market message server 170 is connected to a network 172 to which the computer in ATM 158 is connected. Network 172 may communicate using TCP/IP or other suitable communications methods. The transfer and distribution of the presentation materials from the sources are accomplished selectively and in accordance with the configurations established by a system operator. The selective transfer and distribution is carried out responsive to message processing programs (MPPs) 174, which run in the market message server 170. Message processing programs 174 are preferably operative to distribute market presentation materials at the times and in the manner desired by the operator of the system. The message processing programs may be further operative to provide downloading of states and screen data to enable the presentation of such materials at the ATMs as well as to carry out other functions as later described.

As is represented in FIG. 5, the market server further has operative therein additional message processing programs 176. Such message processing programs are in operative communication with user data schematically indicated 178. The user data in the described embodiment includes information about users and market data which can be used to selectively present marketing information to them at ATMs. The user data 178 in the exemplary embodiment may reside in a data store resident in the market server 170 or may be exported to or imported from other external servers and systems schematically indicated 180. In other embodiments the user data may reside in the data store in the ATM or in other areas in the system.

In the exemplary embodiment described herein the user data 178 preferably includes information associated with each user as well as information that is correlated with particular marketing campaigns. This may include, for example, market segment data which is indicative of demographic, financial or other characteristics that are associated with the user for marketing purposes. The user data may also include in this exemplary embodiment, data representative of a particular marketing campaign with which the user has been associated, and the particular point in the sequence of presentations which make up the campaign where the particular user is at the present time. Of course, other information may also be included in the user information.

In the exemplary embodiment each user is associated with at least one market segment. The segment or segments associated with the user and stored in correlated relation with the user identifying data in the database is indicative of attributes of the user which can be used to define products such as goods or services that the user may be interested in purchasing. The user data for each user may also include other information including information which corresponds to marketing presentations which are not to be made to the user. This may include personal information about the user, historical information about the user's responses to prior promotions, requests by the user that they not receive certain types of promotional information, data which indicates that information about a user cannot be shared, or other information that is useful in making marketing presentations to a user. As previously discussed the information about the user may also include information which indicates the next presentation to be made to the user when they operate an ATM connected to the system. This may include for example information about a marketing campaign which is being made to the user. It may also include the last presentation that the user has seen or a next presentation to be made to a user when they next operate a machine connected to the system. For some presentations the data associated with the user may include data representative of the presentations which have been made to the user, have not been made to the user, or other information that enables the computer to determine an appropriate presentation to make to the user.

In the exemplary form of the invention, data is stored in a data store associated with the marketing message server which corresponds to campaigns. Campaigns include one or more presentations that may be made to a user at an ATM. A campaign may include several presentations which are to be presented to a user in a particular sequence or order with each visit of the user to an ATM connected to the system. As later discussed presentations in an exemplary embodiment may include script data or other instructions, which enable presenting to the user several different displays, questions or prompts during a marketing session during an ATM transaction. Such presentations may also enable a user to input information. The input information may then be transmitted back from the ATM to the marketing message server to enable the products that the user has ordered or expressed an interest in receiving, to be delivered or further marketed to the user. In the exemplary embodiment users are enabled to respond with responsive inputs to presentations which include questions or prompts. These responsive inputs may include responses to yes/no queries. They may also include for example, numerical inputs such as phone numbers or amounts. Such information is further usable in delivering or marketing products to the user. It should be understood that these approaches are exemplary and other embodiments of the present invention may employ different approaches.

Figure 6:
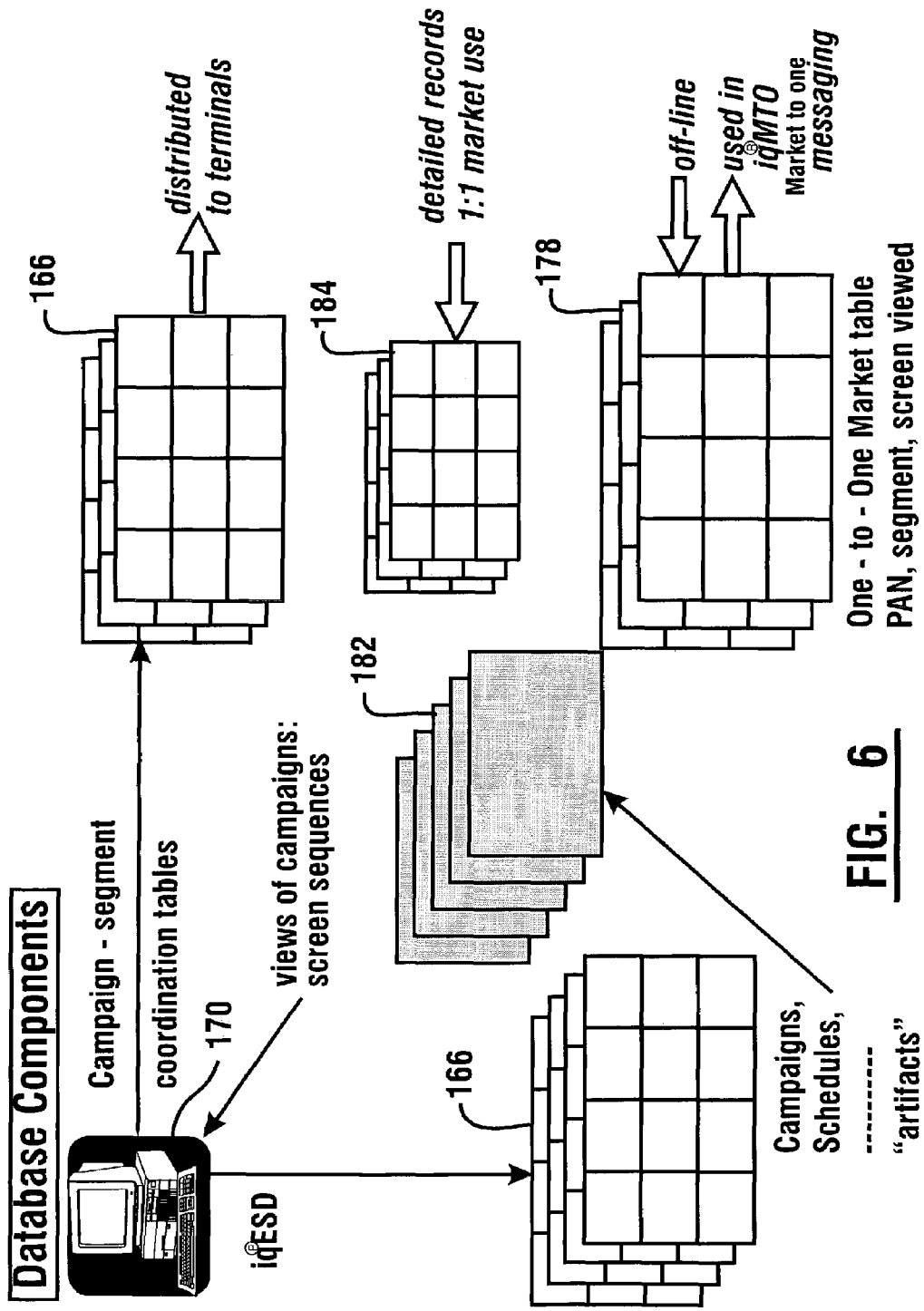
FIG. 6 is a schematic representation of database components used in the system of the exemplary embodiment.

In the exemplary embodiment of the invention, the operator of the system is enabled to develop campaigns for presentation to users. These campaigns may include for example, presentations to be made generally to users of the machines during various operations in the ATM transaction sequence. Alternatively, such campaigns may include a targeted sequence of presentations to which a customer may respond. For example users for whom information is not stored in the data store may receive presentations related to certain campaigns while users for whom information is stored may receive presentations in campaigns directed specifically to them. Such campaigns are schematically indicated 182 in FIG. 6. The exemplary form of the invention is operative to provide records related to frequency of presentation and responses to marketing campaigns which are schematically indicated 184.

Figure 7:
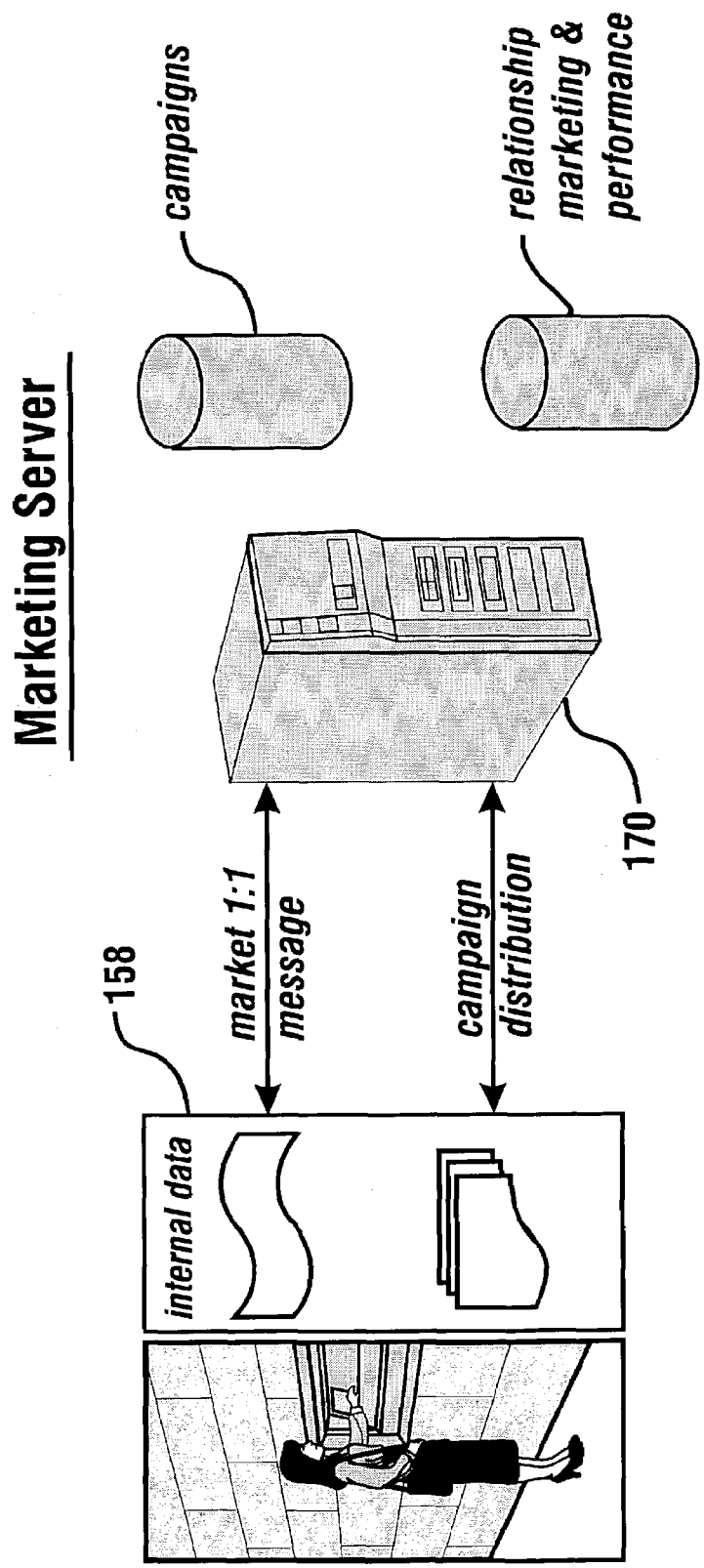
FIG. 7 is a schematic view representative of how the system operates in connection with ATMs to present marketing information.

As schematically represented in FIG. 7, the exemplary form of the present invention is enabled to distribute into the data stores of ATMs, presentation materials which can be presented and responded to totally independent of messages associated with financial transactions which are generated and received by the ATM. The system of the exemplary embodiment enables presenting marketing messages generally in the course of transactions at selected machines in accordance with selected time and date parameters. The exemplary embodiment also enables providing targeted marketing messages to particular users of ATMs. This includes, for example, a sequence of messages included in a campaign directed at users in a particular market segment.

Figure 8:
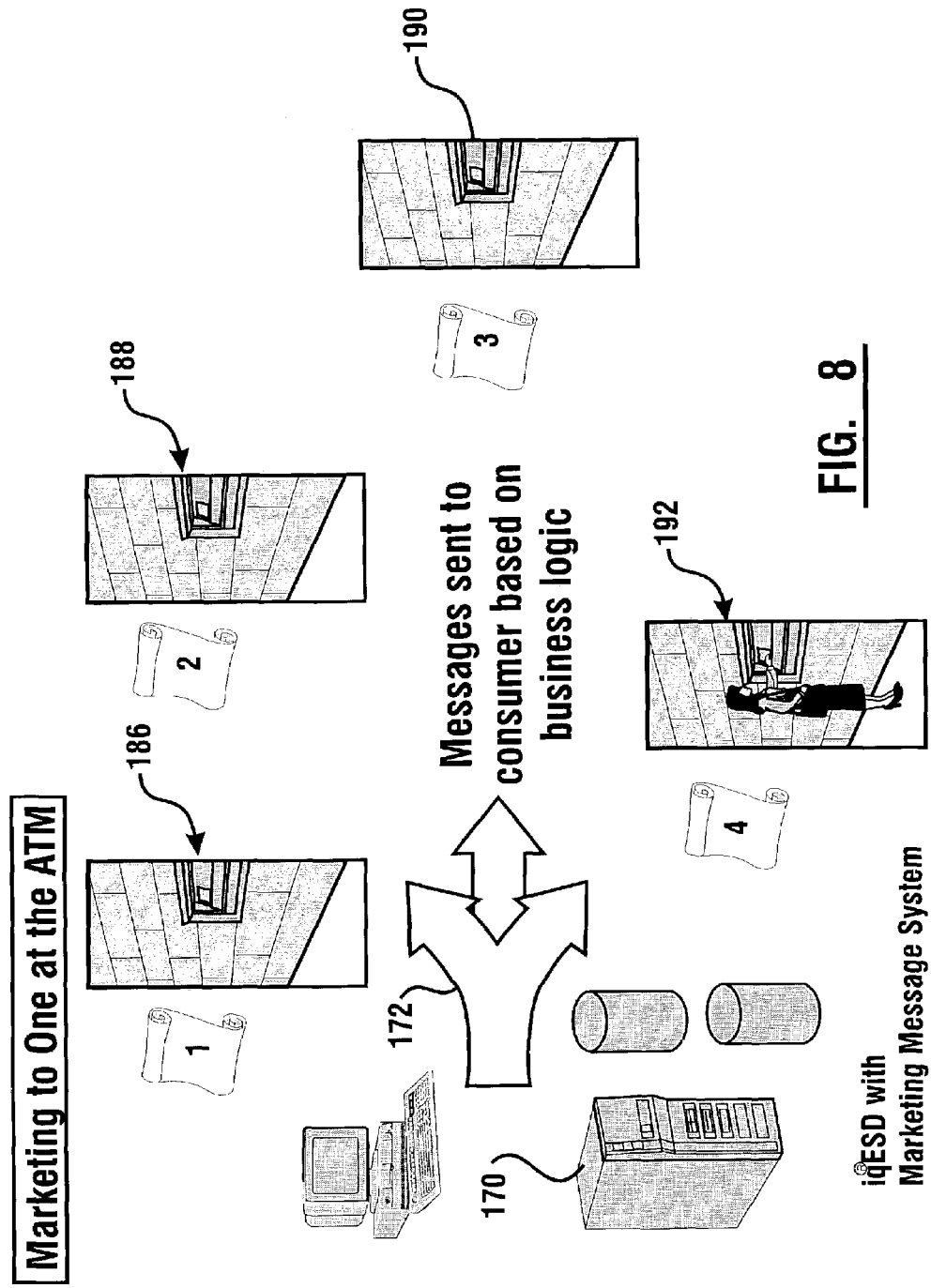
FIG. 8 is a schematic view representative of how marketing campaigns are presented to an ATM user through the presentation of a sequence of messages.

FIG. 8 indicates schematically an example of a campaign targeted to a particular user or a user in a given market segment. The campaign includes a series or sequence of presentation messages. In the exemplary embodiment, the campaign may involve several presentations which include messages intended to familiarize a user with the product or to stimulate interest. The user receives the first presentation during a first ATM transaction schematically indicated 186 in FIG. 8. Later when a user conducts a second transaction at the same or different ATM connected to the system, they will receive a second presentation in the campaign sequence. This is schematically indicated by a second transaction 188 in FIG. 8. Additional presentations in the sequence may be presented in a third ATM transaction 190 and in a fourth ATM transaction 192. The presentations may be made randomly but are preferably presented in a particular predetermined order. Such presentations may include a request for the customer to make a decision concerning a proposal or to provide information in response to a marketing message, which a user does by providing responsive inputs to the ATM. Campaigns may involve any number of such presentations in a sequence as is reasonable under the circumstances, and which are designed to spur consumer interest. In addition, inputs by users in response to campaign presentations, including inputs which indicate a lack of interest therein, may be used by the logic of the market message system to select future campaigns to be presented to users of the system or to modify existing campaigns. Customer responses to inquiries such as decision and input messages may also be exported by the system to other systems or personnel who can follow up on decisions made by the customer in response to the marketing presentations.

FIGS. 9, 10 and 11 provide exemplary campaigns targeted to users. FIG. 9 depicts an exemplary campaign designated 194 designed to interest a user in opening a checking account with a bank operating an ATM. This campaign is targeted to a user who is required to pay transaction fees because they do not qualify for free ATM usage. This may be because, for example, they are not a customer of the particular bank who owns the ATM, or they do not have the type of account to qualify for free ATM usage. The campaign at 194 presents to the user different presentations which include screen messages during the first two (2) visits to the ATM, which are designed to get the user thinking about the issue. The presentation on the third visit causes a screen to be shown which asks the user if they would like more information. In the operation of this exemplary embodiment as later explained, the user is enabled to provide response messages and inputs. If the user provides a positive response, the logic associated with the presentation operates to capture information about how to contact the user. If the user declines, they are provided with a coupon which may include a reminder that the user may exercise the offer at a later date. Alternatively or in addition, the coupon may be a coupon or other premium to reward the customer for participating in the promotional campaign. In either case the inputs from the customer and other information about the marketing presentations are returned to the market message server in a manner later explained so that further appropriate action may take place.

FIG. 10 details an exemplary campaign designated 196 which is a sequence of presentations which cause the ATM to output messages intended to interest a customer in acquiring checking overdraft protection on their account. Again, the initial message is to stimulate interest. During the second visit the customer is encouraged to make a decision. The decision information is followed by further appropriate messages, the responses to which are returned to the marketing message server. Follow-up messages are provided to the customer consistent with their decision during the second visit, on a subsequent ATM visit.

FIG. 11 shows an exemplary campaign 198. Campaign 198 consists of a sequence of messages presented to a user of an ATM on successive visits. This campaign encourages a user to exercise the option to skip a payment on a credit card after the holiday season. Again, as is the case with the prior exemplary sequences, the user is given messages to interest them in the product. Decisions and/or other inputs are made on subsequent visits and the customer's decision is followed up in an appropriate manner as a result of activity carried out by the market message server. Of course, campaigns 94, 96, and 98 are exemplary and many other campaigns which may or may not involve user responses may be presented by embodiments of the present invention.

As can be appreciated from FIG. 5, in the exemplary embodiment targeted market messages are provided to selected users of the system. This is accomplished through use of a software agent, such as agent 150, operating in the ATM. The agent operates to deliver customer identifying information to the market message server 170 as soon as possible in the course of the ATM transaction. In the exemplary embodiment this identifying information may include the user's PAN which is read from the card of the user by the ATM early in the financial transaction sequence. Of course in other embodiments other identifying inputs to the machine may be used to identify the user. This may include biometric data or other data that can be provided by the user or an item associated therewith. The agent 150 senses signals indicative of this identifying information being acquired and causes a marketing request message which includes data corresponding to the PAN to be output in a message to the network 172. In the exemplary embodiment the marketing request message includes a portion in an ISO 8583 message format.

The market message server receives this message which includes the customer identifying PAN. The message is transformed into a suitable internal format message by the MGR 168. The message sent from the ATM which includes the customer identifying information includes indicia indicating the type of message that it is, and based on this data the MGR routes the message to an MPP 176 that is capable of handling the message. In this case the MPP operates to look up information in the data store concerning the corresponding user and the next presentation in the campaign sequence that they are to receive. As previously discussed, the next presentation may be a presentation which causes the ATM to present a single screen or message to which no response is required. It may alternatively include a series of instructions which cause the ATM to output messages which request inputs from the customer.

In response to its activity (or activities in connection with other components and systems), the MPP outputs a marketing response message which includes data representative of the presentation appropriate for the customer in this situation. In the exemplary embodiment the marketing response message is also an ISO 8583 format portion. The MPP also preferably notes the fact of the user's activity in a data store and transfers a response message back through the MGR to the agent operating in the ATM. The agent 150 then operates responsive to the instructions in the presentation data to display the messages at the appropriate time in the transaction sequence in accordance with its programming and/or the configuration local states and screens application 148. In the exemplary embodiment shown in FIG. 5, the marketing presentation is displayed after entry by the customer of their PIN and before the financial transaction selection screen. Of course, in other embodiments, the messages may be displayed at other times in the transaction sequence in accordance with the configuration of the agent and/or the local states and screens application.

Figure 12:
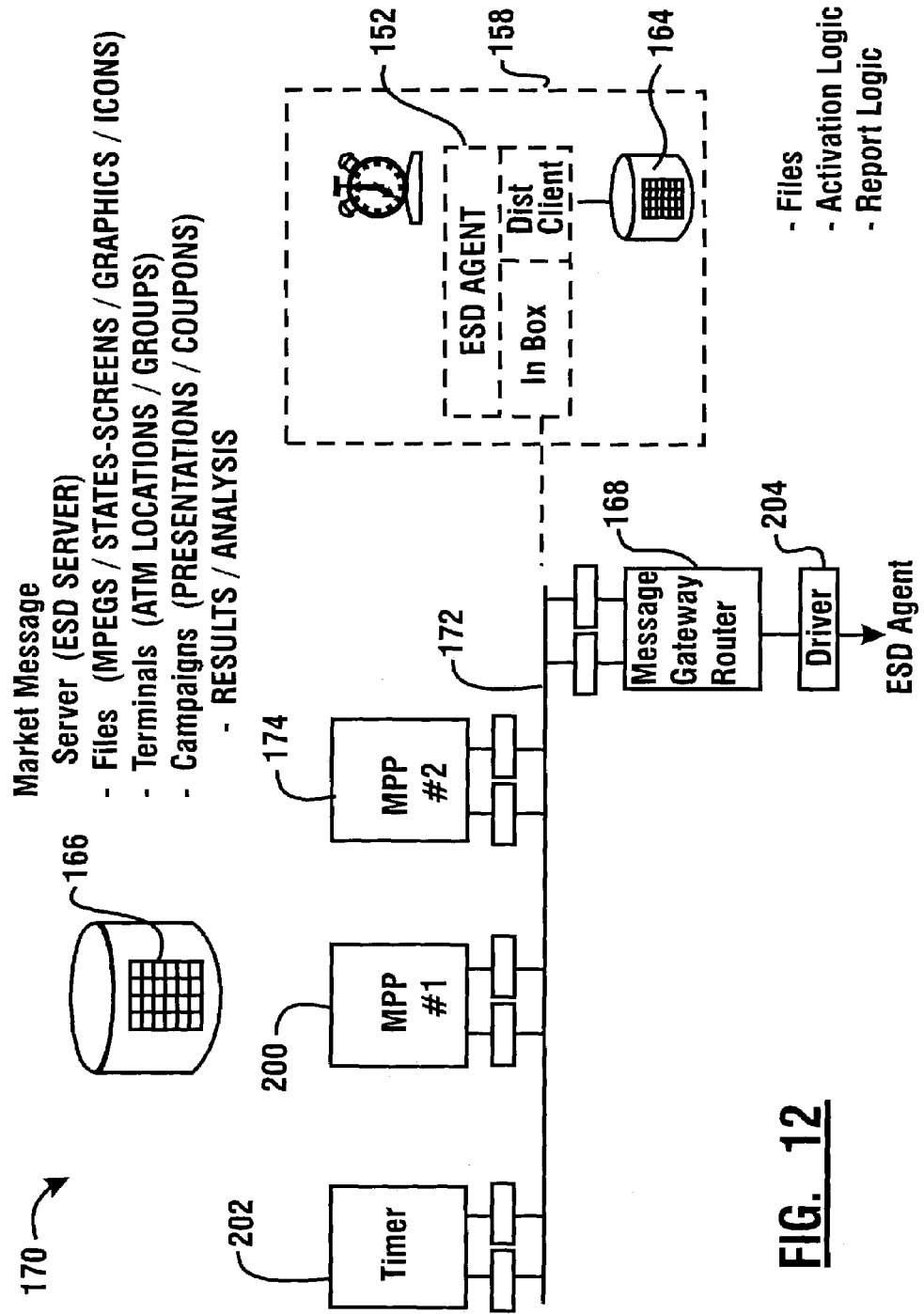
FIG. 12 is a schematic view of the ATM customer marketing system and the software components used therein to distribute campaigns and to obtain the results thereof.

FIG. 12 shows the software architecture associated with an exemplary market message server 170 which distributes marketing presentation material 164 to the ATMs. As previously discussed, source files such as MPEG files, graphics, icons and other items are passed from source files 166 into local data stores at selected ATMs such as ATM 158 where such items may reside. The distribution and configuration of such items is achieved by the operator of the system who determines on which ATMs such items are to be loaded. This is accomplished as later explained by delivering such items to particular ATMs or groups of ATMs as classified by the system.

A system user also develops campaigns which include marketing presentations to be made at the various ATMs. Such campaigns may include related types of visual or audio presentations, the dispensing of coupons or other promotions to be made at particular ATMs. The campaigns generally include activation logic for the presentation of a number of different items of presentation material. The setup of the system may also include the selective loading of states and screens into terminals to accommodate the presentation of the marketing content. The ESD agent may also provide for accumulation and reporting of data on marketing presentations. Such data may include responses received to marketing campaigns such as the number and types of coupons which users select to have printed. Data accumulated by the ESD agent may also include the number of times particular presentations were made.

The ESD agent information may be returned to the market message server. Such data messages may be converted by MGR 168 or other message converters, and processed by one or more MPPs such as MPP 200 which is configured for processing and analyzing such data. It should also be understood that the system of the present invention may include a timer program 202. The timer program may be operative in the manner of the incorporated disclosure to assure that messages transferred between MPPs or between MPPs and external devices are received in a timely fashion. The timer may further operate to cause the distribution of presentation materials and campaigns at selected times as well as to retrieve data from the ESD agent at selected times or intervals.

It should further be understood that as represented in FIG. 12, each of the components of this system are connected to the TCP/IP network 132 through associated listener and sender components. This facilitates operation of the components in a generally asynchronous manner as well as enables distribution of system components on one or more connected servers. As also represented in FIG. 12, the ESD agent component may communicate directly with the TCP/IP network or alternatively may be connected through an intermediate network. The ESD agent communicates through a driver 204 or other suitable communications device. It should also be understood that embodiments of the invention may include the capabilities for distributing presentation materials and campaigns to ATMs, and for receiving data from the ATMs, by dial-up connections such as through wired or wireless modems or other intermittent connections. This may be particularly appropriately where campaigns are run on the ATM that are not targeted to a particular user of the ATM.

Figure 4:
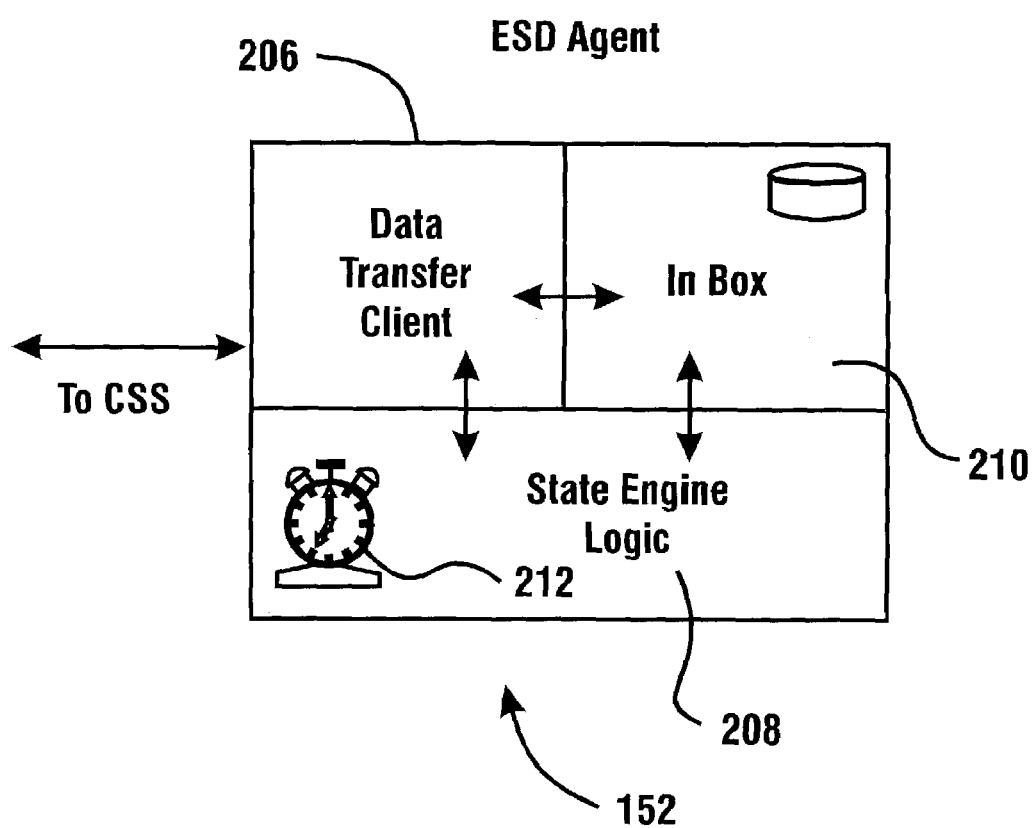
FIG. 4 is a schematic view of the software agent that operates in the machine represented in FIG. 3.

FIG. 4 shows schematically components of the exemplary ESD agent 152. The ESD agent 152 includes a data transfer client component 206. The data transfer client component is used for transferring data between the communications subsystem 136 and the ESD agent. Data transmitted through the data transfer client includes the distribution of presentation materials and/or states and screen logic appropriate for the presentation of campaigns which are to be stored on the ATM in memory. The data transfer client is also operative to sense the inputs which are operative to cause it to execute its instructions included in the ESD agent state logic 208. As previously discussed, the occurrence of various activities or inputs at the ATM are operative to cause the marketing presentations to be output. The state logic 208 receives the information through the data transfer client which causes the execution of these instructions. In addition, the data transfer client is operative to return accumulated report information concerning use of the system to the market message server.

An "in box" component 210 is operative to hold presentation materials and/or campaign logic. The in box 210 is operative to hold these items until the designated time for making the particular presentation materials available on the ATM. Likewise, the activation logic associated with presenting the campaigns is also held in the in box until an appropriate time for execution by the state logic. As will be appreciated, the state logic includes appropriate timing functions schematically indicated 212 which cause the actions to be carried out in accordance with the programmed instructions delivered to the ESD agent by the market message server.

Figure 13:
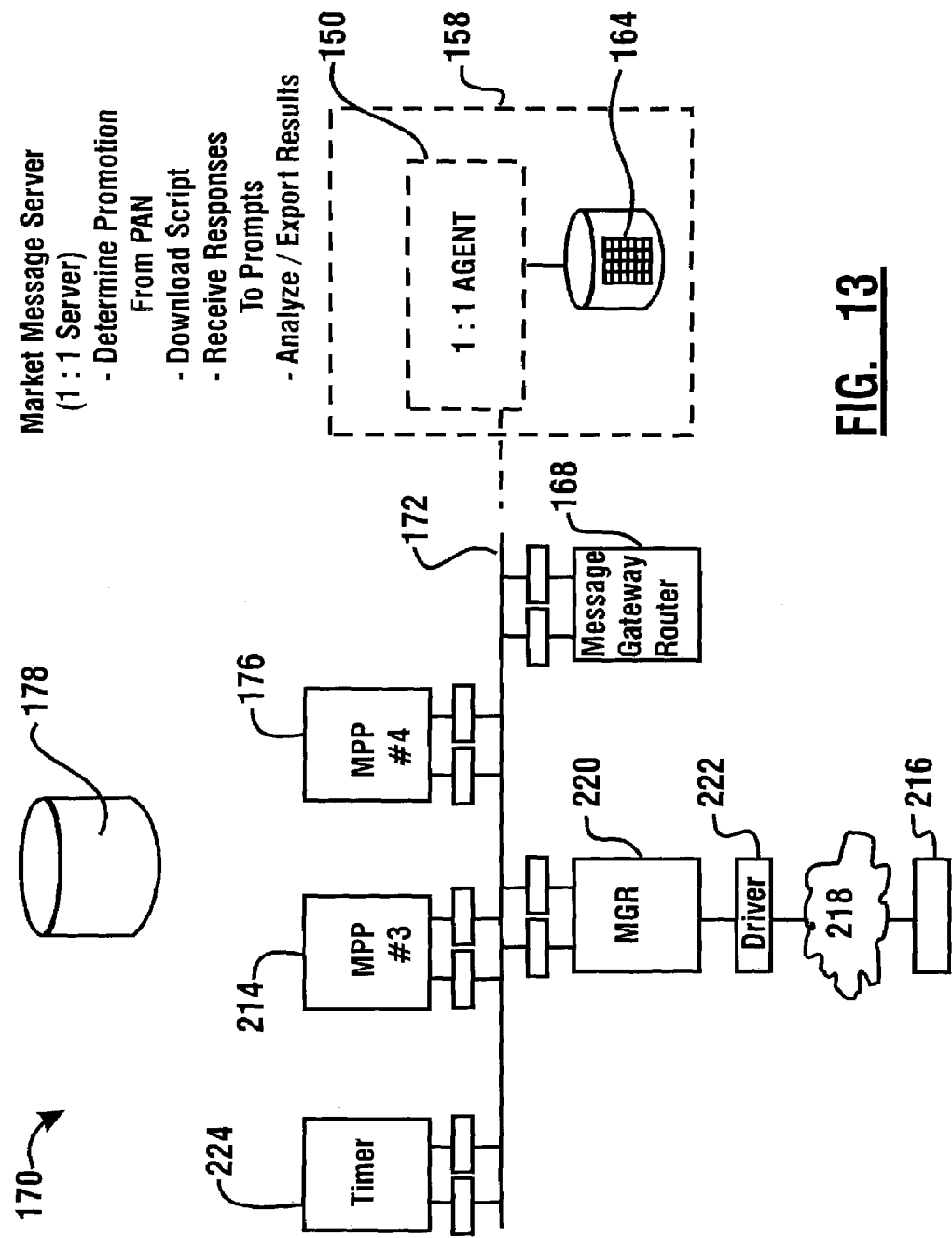
FIG. 13 is a schematic view of software components used in the ATM customer marketing system for purposes of presenting targeted messages to particular users.

As shown in FIG. 13, the operation of the market message server 170 in connection with the 1:1 agent 150 is operative to cause a specific message targeted to the particular user to be presented at the ATM, and in appropriate circumstances to return information to the server. In this example the 1:1 agent senses the user's PAN data through the communication subsystem 136 and operates in accordance with its state flow logic to deliver a marketing request message including data representative of the PAN which identifies the user, to the TCP/IP network 172. The MGR 168 or other suitable MGRs operate to convert the message format to one that can be handled internally by the system and routes the converted message based on its message type to the appropriate message processing program, which in this case is MPP 176. The MPP 176 or other connected MPPs are operative to determine responsive to the customer's PAN data the next presentation to be presented to the customer at the ATM and the particular relationship or logic script between the data which comprises the presentation.

A marketing response message including data representative of the presentation to be made at the ATM and which include logic which connects the components of the message, are downloaded as a message or script to the agent in the appropriate message format as determined by the MGR 168. The agent 150 executes the state logic included in the messages to cause the presentation to be made to the user. The state logic included in the agent 150 also selectively executes the delivery of the components of the presentation based on inputs from the user and captures the user's responses. Alternatively, if the user does not respond, the state logic in the agent 150 provides a time-out which returns the ATM to its usual financial transaction flow.

The state logic of the agent 150 is operative to further output a message responsive to inputs from the user which were requested by the logic script delivered to the agent for the customer. This information is included in an acknowledgment message that is returned by the agent through the MGR to an appropriate MPP, for example, MPP 214. MPP 214 may process this information and utilize it in accordance with its configuration. If, for example, a customer has indicated that they wish to accept a particular offer such as, for example, to open a new checking account, the MPP 214 or other connected MPP may be operative to export data responsive of this information to another system. This may include delivering the data to an appropriate workstation from which a service provider may process the customer's order or contact the customer. Alternatively information provided by the customer may be delivered to a data warehouse or other system where it is used to update information about the user as well as to conduct other analyses. The responsive inputs provided by the customer are also used to update information stored relative to the user in the data store associated with the marketing server. Such information may include for example the next presentation to be made to the customer in the campaign. It may also include for example the responses that the user has given in response to questions that have been presented to them. Such information may be used for example to discontinue the current campaign to the customer, to start another campaign or to select campaigns to be presented to the customer in the future.

In the exemplary embodiment, the marketing request message from the ATM to the marketing server, the marketing response message from the marketing server to the ATM and the marketing acknowledgment message from the ATM to the marketing server are each in the ISO 8583 message format. The request message and the response message are each a 300 type message. The acknowledgment message is a type 310 message. Of course these messages are exemplary and in other embodiments other message formats may be used.

In an exemplary embodiment the marketing request message includes data representative of the message length, the message type and the customer identifying data which in this case is data included in the customer's PAN from the card presented by the customer. This data allows the logic carried out by the marketing server to determine if the customer is one for whom information is stored in the data store. If the customer is not one for whom the system is capable of providing targeted marketing specifically to the individual, the marketing server may identify a default presentation to be made to the user. The default presentation may be common to all users for whom no data is stored in the database. Alternatively the default presentation may be determined based on characteristics associated with the user or the transaction such as the institution with which the user's card is associated. Alternatively the presentation may be based on the location of the ATM being operated by the customer, the time of year, the day of the week or the time of day that the user is operating the ATM.

In exemplary embodiments of the invention the data store associated with the marketing message server also has stored in connection therewith data representative of attributes of the ATMs. These attributes may include for example information about the type and location of the ATM. Such information may also include for example data representative of presentation materials that have been stored in the data store associated with the computer operating in the ATM. This information enables the system to determine the capabilities of the particular ATM including its capability to output presentations. It also enables the system to determine the types of messages to present so that they can be displayed to the customer and/or whether the customer can provide a responsive input to the messages presented based on the input and output devices in the ATM.

In the exemplary system the marketing message server is operative in situations where the user is one for whom data is available in the data store, to determine the presentation to be presented to the user. This may be done in the exemplary embodiment by reviewing the customer's market segment, determining the appropriate campaign and then determining the particular presentation in the campaign that should be made. Alternatively rather than resolving this information at the time the marketing request message is received, exemplary systems may have previously determined the presentation that the customer is to receive the next time appear at an ATM. The computer may operate to store data representative of the presentation in connection with data representative of the customer. This avoids any delay associated with resolving this information while a transaction is ongoing.

The marketing message server is operative to configure a marketing response message to the ATM which includes data representative of the presentation to be made to the user. In an exemplary form of the invention the marketing response message includes the message length and a message type indicator which indicates the type of message being sent. The marketing response message also includes data representative of the customer name and other information. This information may be inserted into screens presented to the customer in response to the instructions included in the marketing response message.

In the exemplary embodiment the marketing response message also includes particular instructions and data which cause outputs to be presented to the customer. The 1:1 agent operating on a machine executes these instructions and causes the corresponding outputs to be made to the user through one or more output devices such as the display on the ATM. In the exemplary embodiment the presentation includes script data associated with display steps, question steps and prompt steps. Of course these steps are exemplary and in other embodiments other or different steps may be used. It should be understood that presentations which correspond to the presentation data in a marketing response message may include one or several of the display, question and prompt type steps.

An exemplary display type step instruction operates to cause the agent to provide a display or enable printing of a coupon for the customer. The display type step includes data corresponding to a screen number for which corresponding data is stored in the local data store at the ATM. This screen number can be used by the computer operating in the ATM to produce a graphical output on the display. This graphical output may include an advertisement or other promotional message. The exemplary display step instructions also include data representative of a coupon number which may be printed for the customer in response to execution of the display step. In the exemplary embodiment when no coupon is to be presented a null value "00" is included so as to avoid the printing of any coupons. The display step instructions also include a time-out value which is used by the agent to determine how long to display the screen identified indicated in the display step.

The question step of the exemplary embodiment includes instructions which cause the presentation of outputs which include questions to a user. The question step may also include instructions to activate certain keys through which a user may provide responsive inputs. A question step may also include follow on instructions which are dependent on the responsive inputs provided by the user. In the exemplary system the question step includes a first screen number and a first coupon number similar to those described in connection with a display step. However in the question step the screen number will generally present a question requiring a response from the user. These questions may include a yes/no query or other query type. The question step also includes a time-out value associated with the first screen which causes the logic flow to move on if the customer does not respond. The question step further includes a key activation listing. This corresponds to function keys or other keys or input devices on the ATM that are rendered operative in response to receipt of the instructions. Rendering these keys operative enables the agent to receive the responses input by the customer. The key activation listing may also include keys that allow the user to input a cancel input as well as instructions to provide a time-out after which the designated keys are no longer enabled.

The exemplary question step also includes in the presentation data, data representative of screens to be presented depending on the type of responsive input provided by the customer to an output screen. In addition the question steps may provide for alternative coupons to be provided depending on responsive inputs provided by the user.

The third type of step included in presentation data of the exemplary embodiment is a prompt step. The prompt step is similar to a question step except that the user is requested to input data which may be more complex than responding to a yes/no query. For example a prompt step may cause output of a screen to ask a customer to input a numerical value. The numerical value may be an amount of a loan that they might be interested in or a phone number where they can be reached by a service provider to receive further information about an offer. The prompt step in the exemplary embodiment includes instructions such as data representative of a screen number and a coupon number similar to the display step. The time-out value is also provided as well as a key activation list to allow a customer to input data through selected keys. A cancel key is also enabled and a time-out instruction is included which operates to terminate the input capability if the customer does not respond quickly enough. The prompt step may also include data representative of one or more screens to display in response to inputs or selections made. In addition the prompt step may also include alternative coupon selection values to be provided to a user.

It should be understood that the exemplary step types described provide instructions to be used by the agent in operating the input and output devices of the ATM during a marketing session. The instructions included in the presentation data of the marketing response message enable the marketing session to be carried out concurrently and within the financial transaction the customer is carrying out at the ATM. Multiple instruction steps may be included in a presentation depending on the type of messages to be presented and the needs of the system operator. Generally the presentations made are of a relatively short duration to maintain rapid transaction speeds at the ATM. It should be understood that the display, question and prompt steps described are exemplary and other embodiments of the invention may include different types of steps, instructions or data.

After the presentation is made to the customer at the ATM the 1:1 agent operates to cause the marketing acknowledgment message to be sent from the ATM to the marketing server. In the exemplary embodiment the marketing acknowledgment method includes data representative of the message length and the message type. The marketing acknowledgment message also includes customer identifying data such as the customer PAN or other data which is usable within the system to identify the particular user. If the customer has been presented with a question or prompt step the marketing acknowledgment message may also include the responsive data input by the customer. This includes for example the key selections made by the customer in response to a question or data representative that the customer allowed the presentation to time-out. The responsive data may also include data representative of information that was entered by the customer. This may include for example the amount or phone number data which can be used in delivering further marketing or products to the customer.

In the exemplary embodiment the marketing server operates in response to receipt of the marketing acknowledgment message to update the information stored in its associated data store. This may include for example updating the information associated with the user to indicate the next presentation to be made to the user. Alternatively the marketing server may analyze the customer's responses and determine through comparison to programmed parameters that the current campaign being displayed to the customer should be discontinued and that a different campaign or no campaign at all should be presented. In addition the marketing server may also operate to forward data concerning the customer's responses to an appropriate work station or other system which may use the information that the customer has input for purposes of delivering products or marketing to the customer.

A useful aspect of the exemplary system described is that it has the capability of translating messages between a wide variety of message formats in accordance with configuration data stored in its associated database. As a result the system may generate a message to a terminal 216 which can take the necessary steps to have the user's checking account opened for example. Terminal 216 may be connected through another external network 218 or through a dial-up or other connection. Messages suitable for communicating with the terminal 216 may be produced by transforming internal messages to a suitable format for terminal 216 through an MGR 220, which delivers the messages through a suitable driver 222.

One or more timing components 224 may be operative in the network to assure the delivery and receipt of appropriate responses to messages output by the system. This may include, for example, responses to downloaded presentation data which include logic script for a particular user at a terminal to which responsive data is expected. The timing components may be used to assure the effective communication of messages between the market message server 170 and other connected data warehouse and data management systems or other system components.

As will be appreciated, the ability of the exemplary system to distribute presentation materials in numerous formats to transaction terminals which may be of different types is useful in enabling operation of the marketing system across an installed base of different terminal types. In addition, the ability of the present invention to activate market presentations in terminals that communicate through different formats as well as to export and import data from other connected systems which may utilize different formats and message types, presents opportunities for developing and presenting numerous varieties of marketing presentations.

FIGS. 14 through 31 show an exemplary transaction conducted at an ATM and the logic flow associated therewith. In this exemplary transaction, both the 1:1 agent and the ESD agent are operative to cause marketing presentations to be made. It should be understood that in embodiments of the invention the functions carried out by either agent may be affected absent the activities of the other. Variations of the features and functions described herein may be utilized in numerous types of systems which include transaction terminals by employing the principles of the present invention.

Figure 14:
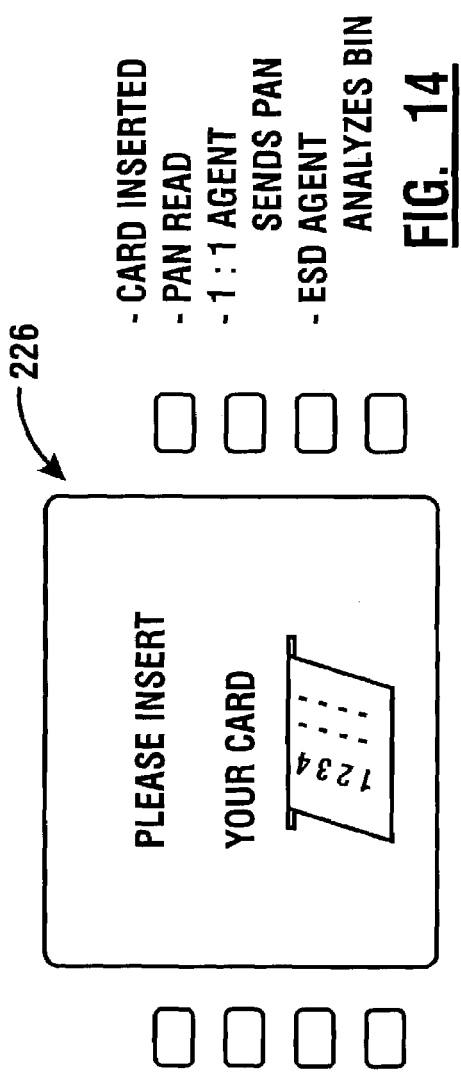
Figure 15:
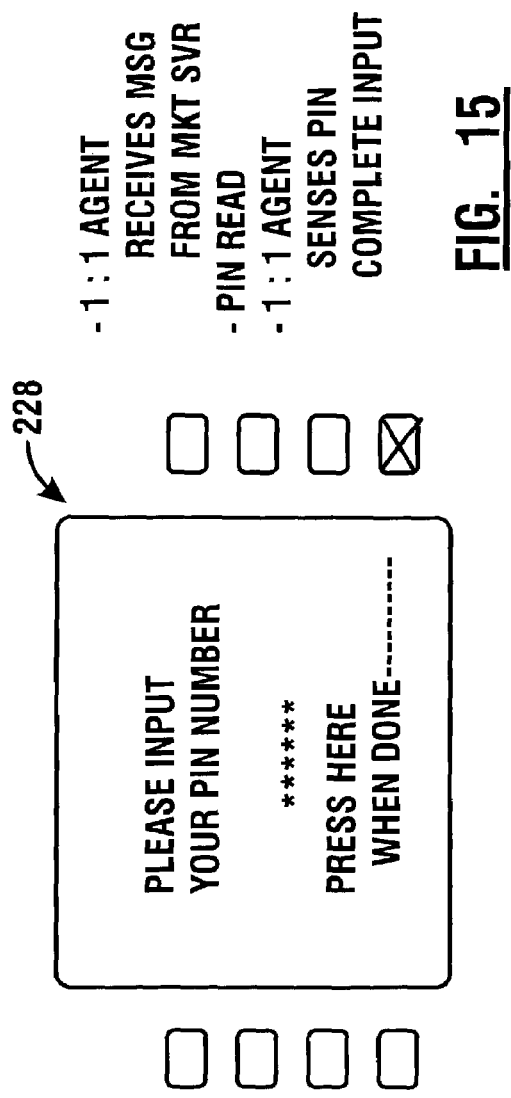

As shown in FIG. 14, a screen 226 is output by the terminal. Screen 226 is in the nature of an idle screen which is presented by the ATM when it is waiting to begin a transaction. Of course, machines may also operate in an idle condition to output presentations based on the available presentation materials in an attract mode. This may include, for example, periodically displaying a screen indicating to the customer how to begin a transaction while playing an MPEG file or displaying screens or providing other outputs that will tend to draw a user's attention to the ATM screen.

In response to the screen 226 a user inserts their card, and the card reader in the ATM reads the user's PAN from the magnetic stripe or other indicia on the card. In response to sensing the PAN input on the communication subsystem 136, the 1:1 agent is operative in accordance with its state logic to send a marketing request message including the data corresponding to PAN to the market message server 170.

As indicated by the logic steps shown adjacent to screen 226, the ESD agent may also be operative in response to the input of the card. For example, the ESD agent may be configured in its state logic to look for customers of banks other than the bank owning the ATM, and to provide special messages to them in order to encourage them to switch their business to the bank operating the ATM. Of course, this logic in the ESD agent is exemplary of how the ESD agent may operate to do targeted marketing to users of the ATM.

The ATM terminal configuration in its normal operation responds to a card read event by presenting a subsequent screen. In this exemplary embodiment the next screen is a screen 228 shown in FIG. 15 which prompts a user to input their PIN number and to press a particular function key when done. As indicated by the logic steps next to screen 228, during this time the 1:1 agent will generally have received a marketing response message from the market message server including logic script which indicates which screen presentation(s) is(are) to be made and connective logic is to be employed. In this exemplary embodiment the 1:1 agent is configured to make these presentations upon the completion of the PIN input operation. As a result, the customer's touching of the key indicating completion of the PIN entry event is sensed by the agent.

Figure 16:
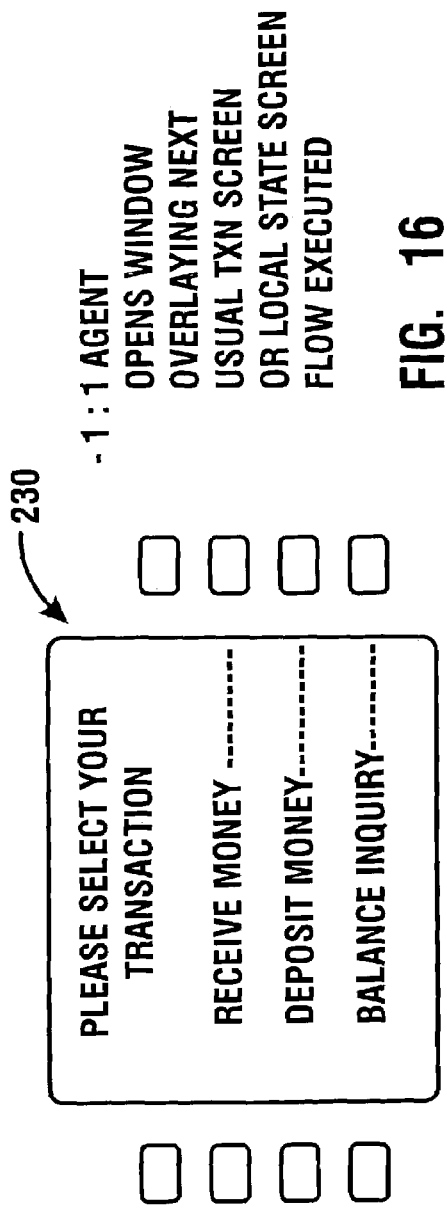
Figure 17:
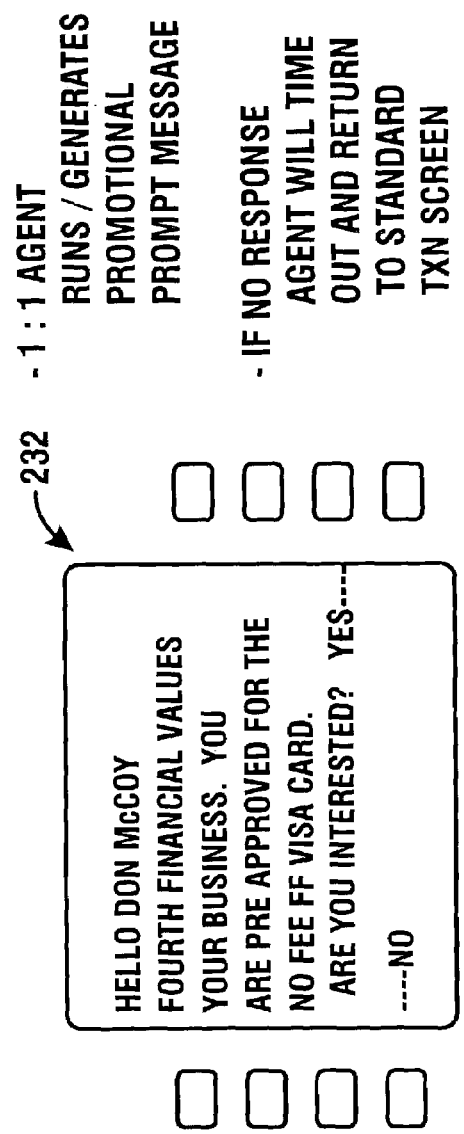

The next screen that is normally seen in the course of the ATM transaction is indicated 230 and shown in FIG. 16. However, in this exemplary embodiment the 1:1 agent has operated in accordance with its state logic to begin controlling operation of the machine in response to the PIN input. As a result the user is not presented with screen 230 at this time but instead is presented with a different screen such as screen 232 shown in FIG. 17.

Achieving the modification of the screen flows normally carried out by the ATM without significant modification of the financial transaction logic may be accomplished in various ways. For example, the 1:1 agent may be operative to open a window overlying transaction screen 230 which causes the screen that the agent is causing to present to cover the transaction selection screen 230. The transaction selection screen may continue to run in the background. Alternatively, a modified state and screen flow may be included in the state/screen application 148. This modified state and screen logic flow may provide for the execution of steps designated by the 1:1 agent before presentation of the transaction selection screen 230. Alternatively, other approaches may be used for delaying or deferring the presentation of a next ATM transaction screen to the user to enable the agent to execute in accordance with its state logic.

It should be understood that the 1:1 agent is configured such that if no message has been received from the market message server indicating a marketing message to present to the customer, the ATM will be allowed to proceed to the transaction selection screen 230. The state flow logic operating in the agent 150 may cause the operation of the machine to default to its standard logic flow if the agent has nothing to present. Alternatively the 1:1 agent may be configured to output a default marketing screen or presentation if a marketing response message is not received timely.

In the exemplary transaction the 1:1 agent 150 has received a marketing response message from the market message server which causes screen 232 to be displayed. The agent 150 operates responsive to the presentation data in the message to cause the computer in the ATM to retrieve the data from memory to present this screen. The screen as stored in memory includes a space for the customer's name that corresponds to the data included in the marketing response message. Alternatively the agent may be operative to fill the space in the screen with the customer's name as read from the card. Screen 232 includes a message which asks the customer if they're interested in a credit card. It includes a question requesting that the customer make a decision. The 1:1 agent operates to cause the message 232 to be displayed until the customer responds by touching a "yes" or "no" function key or until the agent times out without the customer responding. In the case of a time out the agent will cause the next screen as dictated by the presentation data, or if no further screen data is included, screen 230 will be displayed.

In situations where the agent 150 is operative to overlie the normal transaction screen, the ATM programming continues to run in the background. Generally if a customer does not provide a response within a given time, the ATM is configured to present a screen asking the customer if they need more time. Such a screen is indicated 234 in FIG. 18. In embodiments in which the 1:1 agent is operating to overlie the usual transaction screens rather than operating in accordance with local states and screens to present the marketing messages, the 1:1 agent operates to prevent a machine time-out. This is accomplished by the 1:1 agent sensing the presentation of the time-out screen through the communications subsystem 136. The 1:1 agent then responds by providing an input which simulates the user providing an input that they need more time. In this way the financial transaction will not be stopped by the presentation of the marketing information.

If in response to screen 232 the customer indicates that they are interested in the credit card offer, the 1:1 agent operates responsive to the presentation data and causes a screen 236 shown in FIG. 19 to be displayed. The agent also makes note of the customer's response for purposes of formulating the acknowledgment message that it will eventually send to the market message server. Screen 236 is produced responsive to a prompt step and prompts the user to input their daytime phone number and to press a particular function key to confirm the number or to press another key to start over. The agent enables the appropriate keys in response to the presentation data. The agent senses the inputs to the keypad and the function keys through the communication subsystem 136 and captures the data. The configuration of the 1:1 agent is further operative to time-out and return to the normal transaction screen if the input is not completed within the time indicated in the presentation data. Of course, if a customer declines the offer in screen 232, the agent may be operative to then present the normal ATM transaction screen 230, or alternatively may be operative to present additional screens, print coupons or the like. For example, even if the user declines the offer of the credit card, the machine operator may wish to provide a promotional message to instill good feelings about the institution. This may be done, for example, by the presentation of further promotional messages such as screen 238 shown in FIG. 20. Screen 238 tells the customer that they have been entered in a sweepstakes. Screen 238 may also be presented after screen 236, after the customer has input the appropriate response. The presentations output depend on the steps and logic script included in the presentation data in the response message sent by the market message server to the 1:1 agent. Alternatively in other embodiments the logic scripts may be stored in memory at the ATM and activated selectively in response to presentation data in the messages received and/or logic programmed in connection with the agent.

After the completion of the marketing session by the 1:1 agent, screen 240 shown in FIG. 21 is displayed. This is the next normal ATM screen and corresponds to transaction selection screen 230. Screen 240 is produced either by the 1:1 agent closing the window overlying the normal screen or by following the local states and screens logic in which screen 240 is the next screen produced as the logic flow moves to the next state. In response to screen 240 the customer inputs their transaction selection, which in this exemplary transaction is to receive money. The 1:1 agent also generally operates at a time during the remainder of the financial transaction or thereafter to send an acknowledgment message indicative of the results of any decision or prompt messages back to the market message server. The generation of a message to the market message server is caused in an exemplary embodiment of the invention by the logic associated with the 1:1 agent which results in an acknowledgment being sent to all response messages. This can be used to confirm the presentation was made. Alternatively the agent may only send an acknowledgment when it has received a message from the server which includes an indication that it expects a customer response. Alternatively, the 1:1 agent may be configured to send an acknowledgment message in response to each message it receives which includes an instruction to present a question or prompt, which message provides the responsive inputs (if any) from the user. Additionally, or in the alternative, the 1:1 agent may send its acknowledgment messages back to the market message server at a later time, either individually or as part of a batch. The particular approach used will depend on the needs of the operator of the particular system and the configuration of the 1:1 agent.

Figure 22:
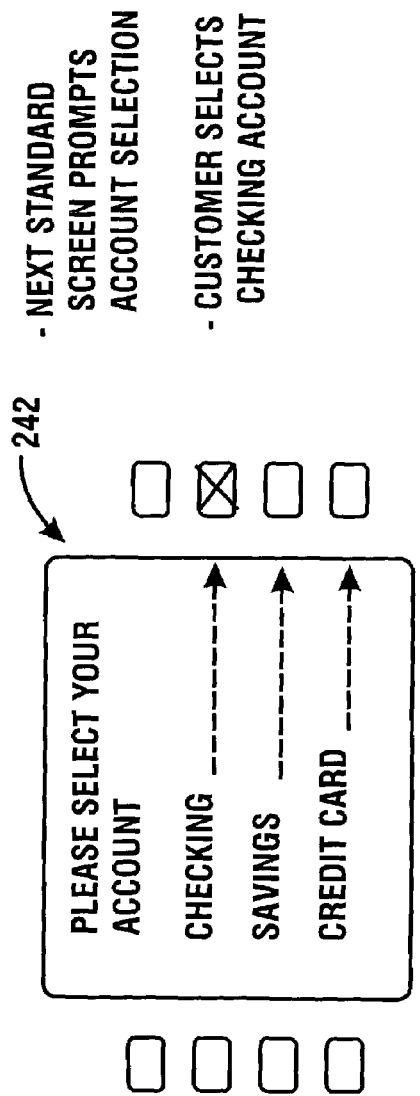
Figure 23:
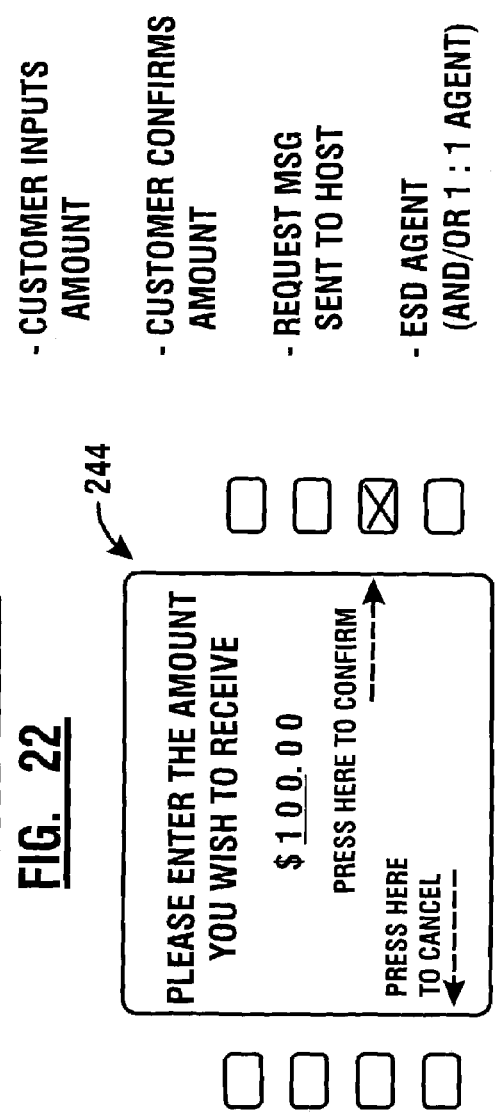
Figure 24:
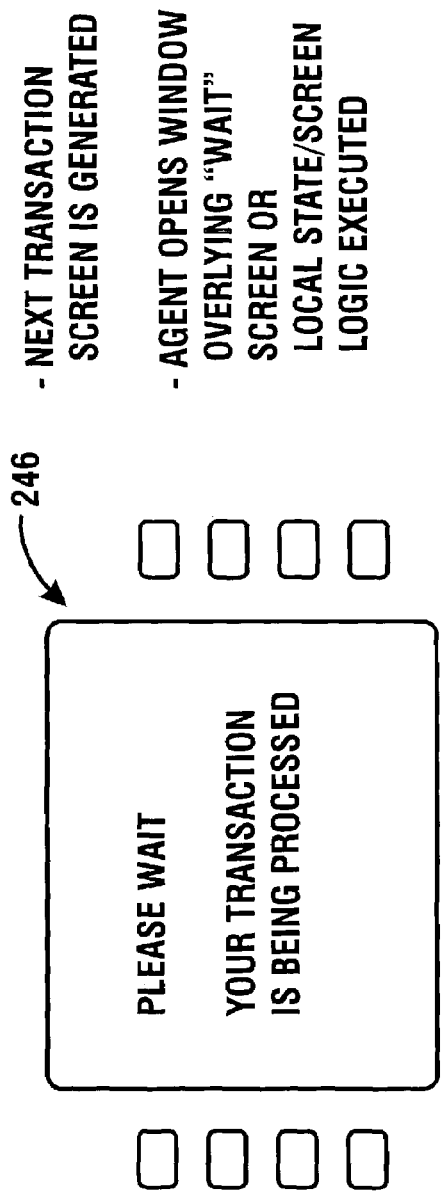

In response to the user's selection of a dispense transaction in screen 240, an account selection screen indicated 242 in FIG. 22 is presented. In this example the customer chooses to withdraw money from their checking account. The next screen presented is screen 244 which is shown in FIG. 23. In this screen a customer is requested to input an amount and to confirm the amount they wish to receive. As indicated in this exemplary transaction, the customer requests a $100 withdrawal from checking and confirms the request by touching a function key.

Figure 1:
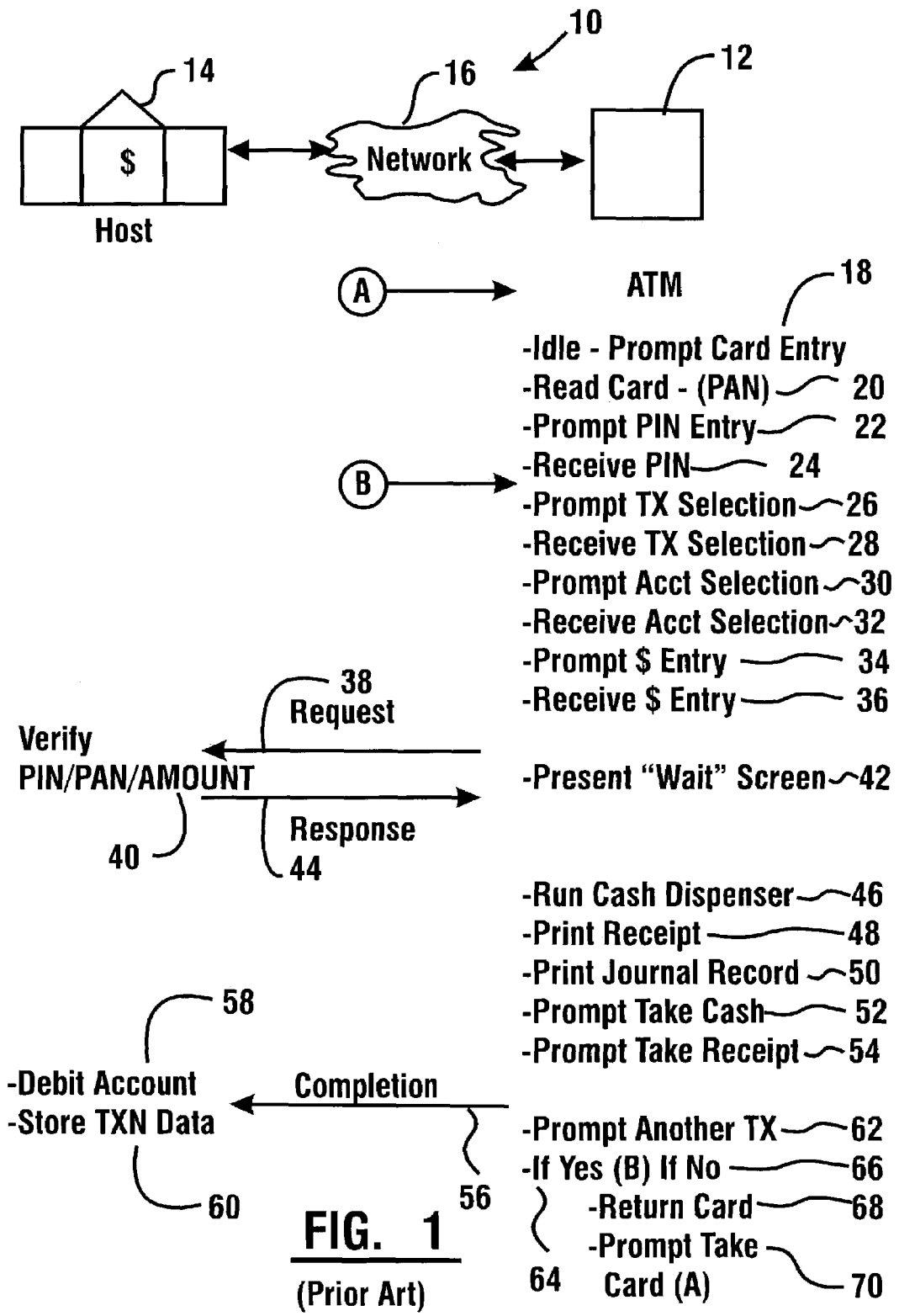
FIG. 1 is a schematic view of an ATM transaction system and the logic steps executed in carrying out an exemplary cash withdrawal transaction.

As previously discussed in connection with FIG. 1, in the usual ATM transaction processing, the ATM is operative at this point to generate a request message and to forward the message to the financial transaction host. The host now determines if the transaction may be authorized and to provide a response. In this case the ATM would normally present the "please wait" screen 246 shown in FIG. 24. However, in this exemplary embodiment the ESD agent 152 is configured to cause the ATM to present promotional messages at this point in the transaction where time is available and the user is waiting for their money. In this exemplary transaction, the ESD agent is configured to sense the confirming input by the customer on the communication subsystem 136 and to begin the execution of its state logic in response thereto. It should also be understood that the 1:1 agent 150 may alternatively be operative in this lull time period to present marketing presentations in the manner previously described.

Figure 25:
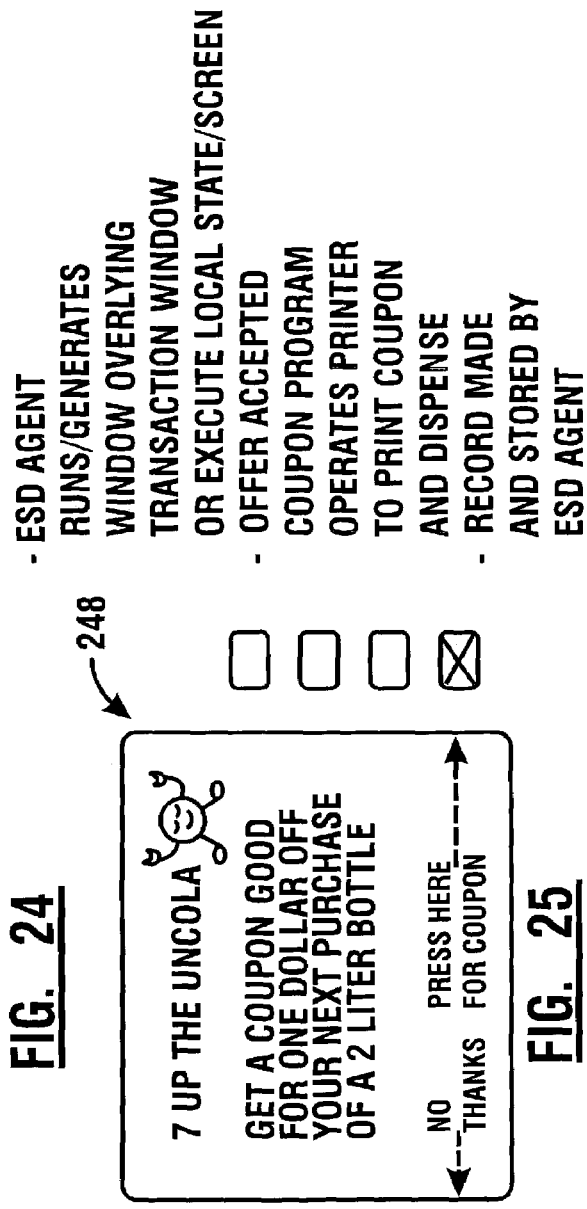

In this exemplary embodiment the ESD agent operates in accordance with its configuration to present a screen 248 shown in FIG. 25. Screen 248 may be a static display screen or alternatively may include moving portions which may be achieved by executing MPEG files or other presentations which get the customer's attention. In addition, the particular presentation made may depend on the time of year, day of the week, the time of day, the customer's account number or other parameters as defined by the ESD agent state logic.

Screen 248 prompts the user to select whether they would like to have a coupon printed for a discount on the purchase of a beverage. For purposes of this exemplary transaction, it is presumed that the user selects to have the coupon printed by providing the corresponding input. The ESD agent then is operative to control transaction function devices such as a printer in the ATM to print the coupon. The appearance of the coupon is based on the coupon layout data stored in the data store associated with the computer in the ATM. In addition, the ESD agent presents a further screen 250 shown in FIG. 26 prompting the user to take their coupon and re-emphasizing the promotional message. The ESD agent is also operative to capture information about the coupon dispensing event for later reporting to the market message server. Of course, if the customer declined the coupon, the fact of this event is also recorded, but the coupon is not printed.

If for some reason the ESD agent does not include state logic to carry out these steps responsive to the transaction inputs, or is deliberately made inoperative to carry out this marketing presentation transaction responsive to stored parameters, the ESD agent is operative to cause the normal "please wait" screen 246 to be displayed until the next screen is displayed in the ATM transaction logic flow. In addition, the exemplary form of the system provides for locking in the ESD agent execution script during each ATM transaction. This prevents the promotional message from being changed to a different campaign presentation while the customer is in the midst of operating the machine. This might otherwise occur due to time dependent routing and/or release of marketing campaigns which are held in the in box of the ESD agent.

In this exemplary transaction during the output of screen 250 shown in FIG. 26, the coupon application 154 causes the coupon to be printed and presented by the ATM. After the coupon is presented the ESD agent causes the next transaction screen that would occur in the conventional operation of the ATM to be displayed. As by this point the ATM has received a response message from the host, the ATM configuration is ready to operate in response to the state information in the response message to present the next transaction screen. Assuming the transaction is authorized, the ATM operates to dispense the cash. Screen 252 shown in FIG. 27 is then displayed. Screen 252 prompts the customer to take the cash which has been dispensed. The state flow logic configuration of the ATM further causes the receipt printer to print a receipt for the customer. It should be understood that in some embodiments this may involve an additional screen presentation which asks the customer whether they would like to have a receipt and only prints the receipt in response to an affirmative customer request.

Figure 28:
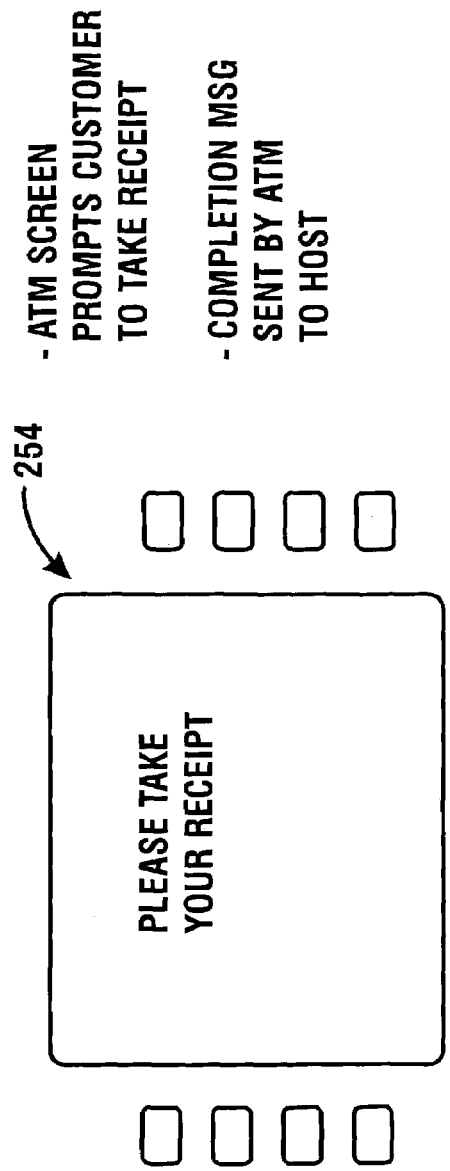
Figure 29:
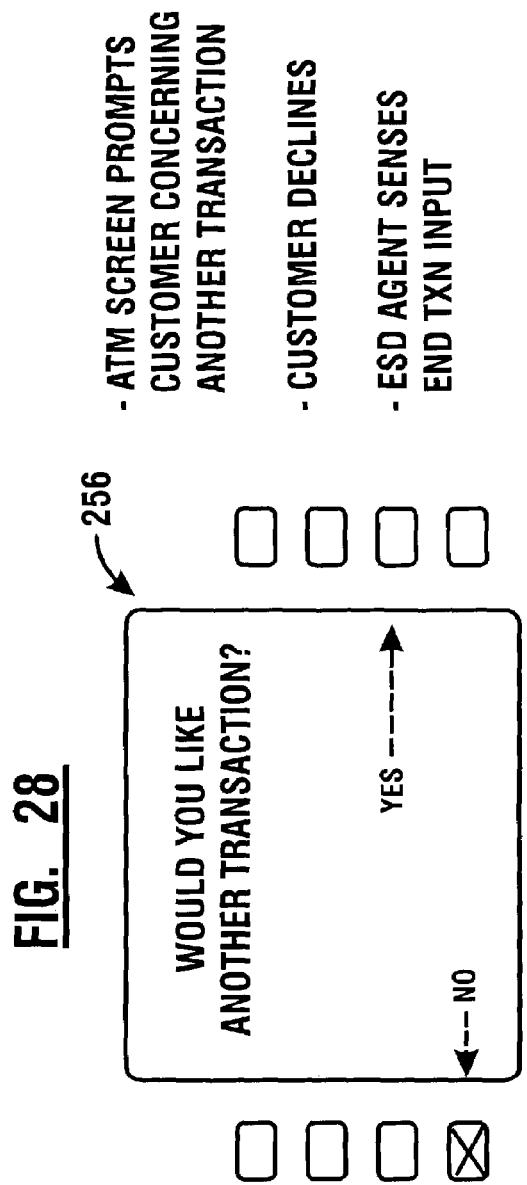
Figure 30:
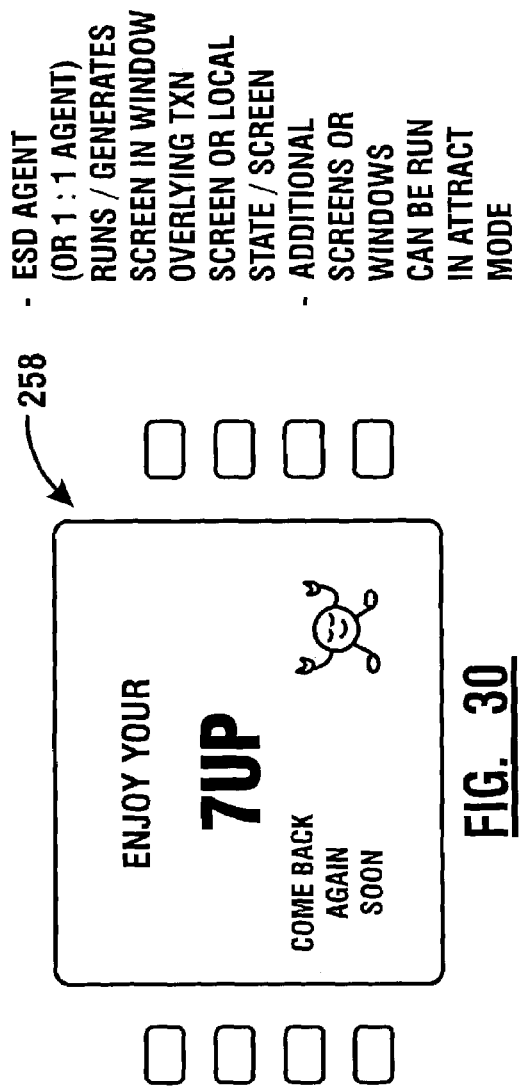
Figure 31:
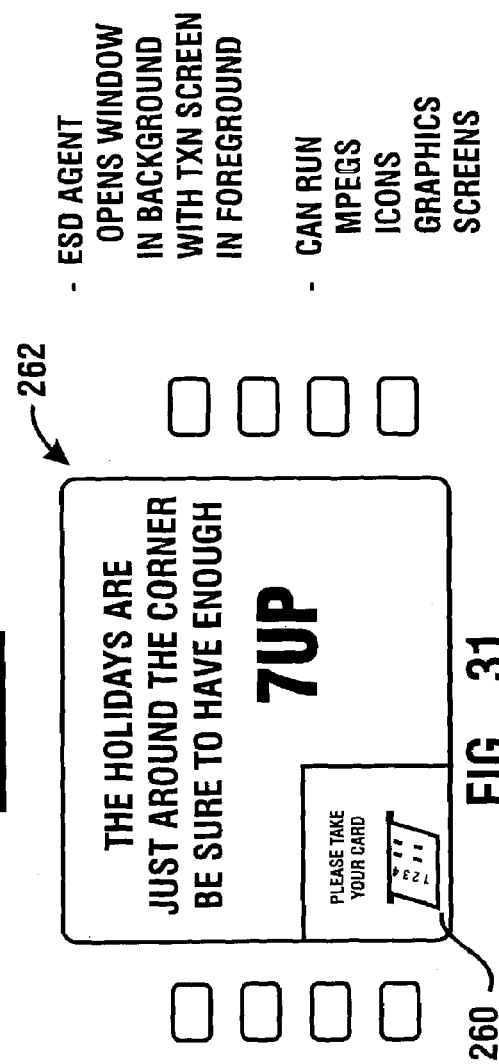

Assuming that the receipt is printed, the configuration then causes a screen 254 shown in FIG. 28 to be displayed. This screen prompts the customer to take their receipt. The next transaction screen indicated 256 in FIG. 29 prompts the user concerning whether they wish to conduct another transaction. If the customer inputs an affirmative response during the display of screen 256, the ATM is configured to return to the point in its logic sequence where the transaction selection screen is displayed. In this exemplary embodiment the 1:1 agent and the ESD agent are configured through their state logic to present only one promotion per customer visit. As a result, the standard transaction logic flow will run without the promotional presentations previously described. However, in alternative embodiments different or additional promotional presentations might be presented to the customer during subsequent transactions during the same visit. It should also be understood that in some embodiments the agents may carry out multiple sessions during a single transaction. This might be done in situations where a customer has provided an input expressing interest in an offer and the marketing server delivers a follow up presentation to the 1:1 agent while the customer is still at the machine.

In this exemplary transaction the customer declines additional transactions when screen 256 is presented. The ESD agent is operative to sense the negative input through the communication subsystem 136. In this exemplary embodiment this causes the ESD agent to present a further promotional screen indicated 258 in FIG. 30. In this example, screen 258 is a promotional screen which reinforces the promotion presented to the customer. It should also be understood that while this screen is described as being generated by the ESD agent, in other embodiments the 1:1 agent could also produce the output of a similar screen.

The transaction is completed with the return of the customer's card to the customer. Normally this is accomplished with a screen indicated 260 in FIG. 31. However, the ESD agent may be operative in accordance with its state logic to open a promotional window 262 in the background behind window 260. This enables presentations of promotional messages or other messages to the customer. In addition, the ESD agent may continue to run various graphics in the background as the ATM logic returns the screen flow to the original screen 226. Screen 226 like screen 260 may be displayed in a window either in the foreground or background by the ESD agent so as to enable promotional and/or attract messages to be displayed while the machine is waiting for the arrival of the next customer.

It should be understood that the foregoing transaction is exemplary of the capabilities of systems of the present invention. Many alternatives for presenting marketing messages and receiving customer responses to marketing presentations are encompassed by the principles of the present invention. As will be appreciated, a useful aspect of the exemplary system is the ability to handle marketing messages and responses independently of the financial authorization messages. In some embodiments, the use of separate communications for such messages facilitates presenting marketing materials without disruption in the transaction processing capabilities of the ATM. Further, the described embodiment enables the provision of marketing capability at the ATM modification of the underlying programming of the financial authorization system. It should further be understood that while the exemplary form of the invention is described in connection with marketing type messages, the invention is also applicable to the communication of other types of messages and information.

Figure 90:
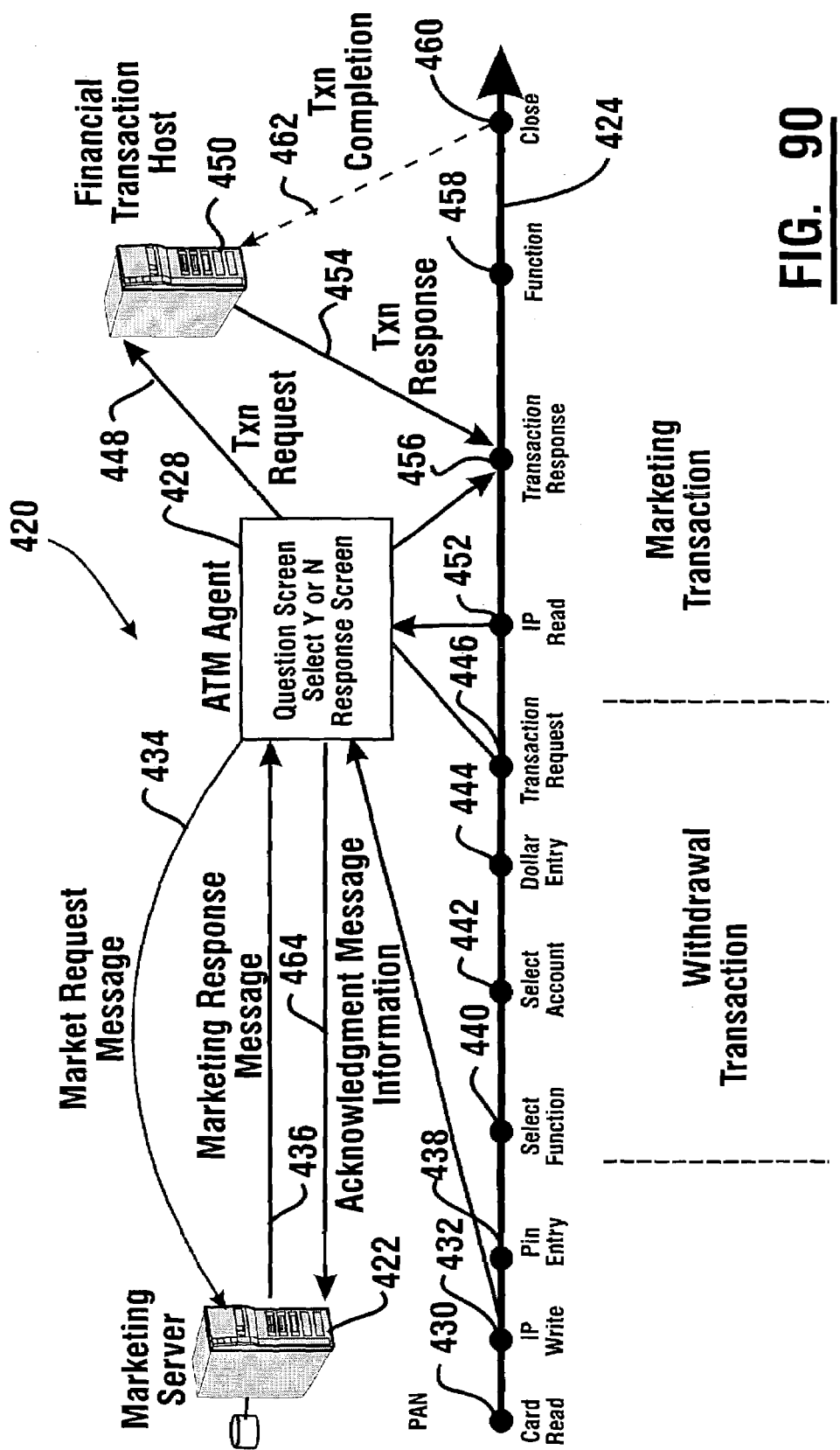
FIG. 90 is a schematic view showing an exemplary logic flow carried out by ATM machines in conducting a marketing session as well as a financial transaction for a customer.

FIG. 90 is a schematic view of an alternative system indicated 420 in which marketing presentations are presented to users at an ATM. In system 420 marketing messages are directed to a user on a targeted basis. The presentations are targeted to the user based on information concerning the user stored in the data store associated with the marketing server schematically indicated 422. In the exemplary system 420 customers for which data is not stored in connection with the marketing server receive a general presentation suitable for users of the machine.

In system 420 the logic flow associated with the ATM is represented by points along a line 424. The points along the line represent states or other logic steps executed by the ATM in carrying out a transaction. The ATM 426 (see FIGS. 91-96) has a software agent 428 installed in the computer operating therein. Agent 428 is similar to the 1:1 agent and other agents previously described. In this exemplary embodiment the agent is connected to the ATM logic flow to present marketing presentations to users on a targeted basis.

Figure 91:
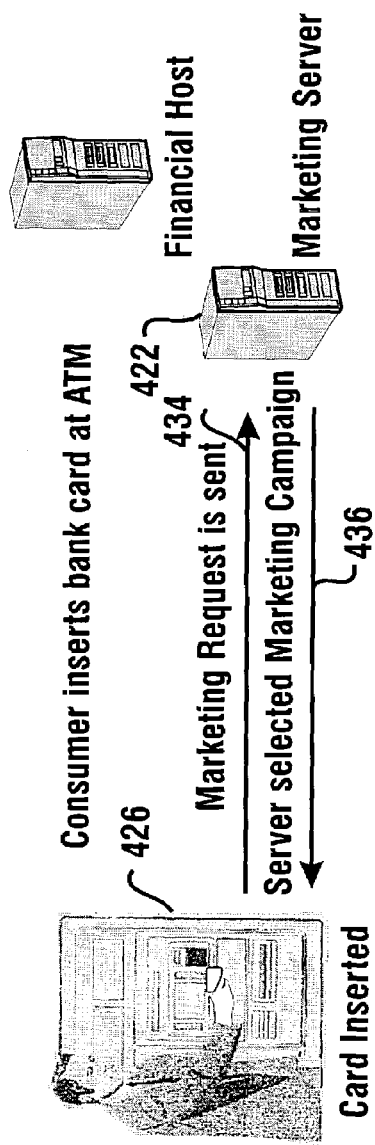

When a user begins to conduct a transaction at the ATM 426 the transaction may begin with the user inserting their card into the card reader of the ATM. This is represented by FIG. 91. In the logic flow of the ATM represented in FIG. 90, the activities associated with reading the card are represented by a card read step or state 430. In response to this activity the PAN is read from the customer's card. The ATM 426 includes a state 432 in which the agent 428 is activated. The agent operates to send data corresponding to the PAN in a marketing request message 434 to the marketing server 422. It should be understood that while a user's PAN is used as the identifying information for the user in this exemplary embodiment, in other embodiments other data which uniquely identifies the user may be used.

In response to receipt of the marketing request message the marketing server resolves the presentation to be displayed to the particular user based on data related to the user stored in the data store. In the exemplary embodiment if information concerning the user is not stored in the data store, or if the user has data associated therewith which indicates that the user declines the presentation of marketing messages, a general presentation suitable for users of all types may be resolved. Once the marketing server has resolved a presentation for the customer, the marketing server sends a marketing response message 436 including data representative of the presentation to the ATM. In the exemplary embodiment the marketing response message corresponds to a presentation which includes instructions which cause the ATM to present a question screen to which a customer may respond with a yes/no answer, as well as response screens to be presented responsive to the nature of the user's input.

While the marketing server 422 is resolving the presentation data for the user and configuring the marketing response message, the logic flow associated with the ATM moves to a PIN entry state 438 in which the user is prompted to enter their personal identification number (PIN). The user is then prompted to select a transaction function at a select function state 440. It will be presumed for purposes of this example that the customer selects a withdrawal transaction.

Figure 92:
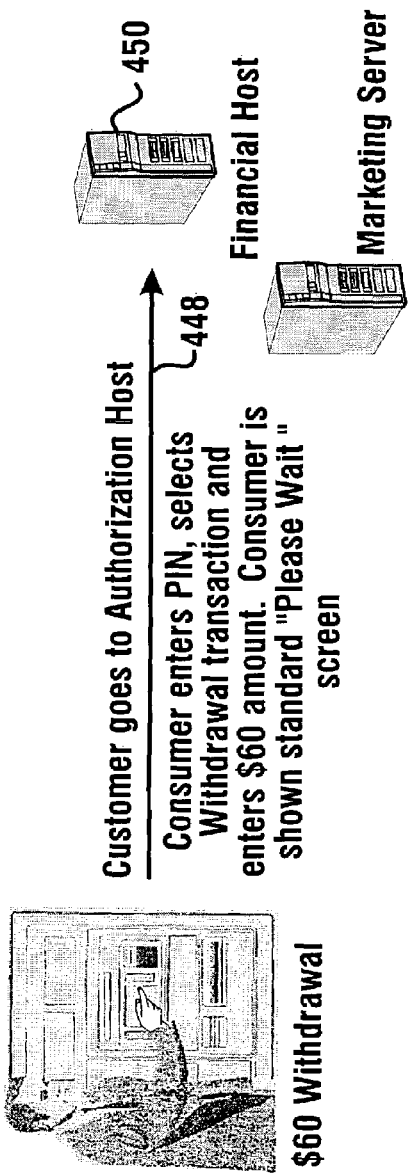

The logic flow of the ATM next moves to a state in which the customer is prompted to select the particular account upon which the transaction will be conducted. A single account number may be correlated with several accounts including checking, savings, credit card or other types of accounts. The ATM prompts the user to select the account type in a state 442. Thereafter the machine moves in its logic flow to a state 444. In state 444 the user is prompted to input the dollar amount of the transaction that they wish to conduct. As the user has provided all the information necessary to present a request to conduct a financial transaction, the exemplary ATM then moves to a state 446 in its logic flow. In state 446 the ATM operates to send the transaction request message schematically indicated 448, to a financial host computer 450. The steps associated with sending the transaction request message to the financial host computer is also represented in FIG. 92.

After executing the steps associated with the transaction request sending state 446 the transaction flow of the ATM moves to a read state 452. In read state 452 the agent 428 operates to cause the output of the presentation corresponding to the presentation data in the marketing response message through one or more output devices on an ATM. In this exemplary embodiment the ATM agent operates responsive to the presentation data in the message to recall from the data store associated with the computer in the ATM, screen data. This screen data includes a question that the customer may respond to with a yes or no answer. In addition the agent operates to enable the keys through which the customer may input appropriate responsive inputs. The agent operates to sense a customer input, and then operates to cause the computer to output another screen responsive to the script logic in the presentation data. This further screen may be tailored to the responsive input from the user. Alternatively if the customer does not provide the requested input, the agent operates in accordance with the time-out instructions included in the presentation data to discontinue the marketing session with the user. In addition the agent 428 may also operate to cause coupons to be output or additional presentations to be made in the manner previously discussed. For purposes of this transaction it will be presumed that the user provides a responsive input to the screen output as represented in FIG. 93.

Figure 95:
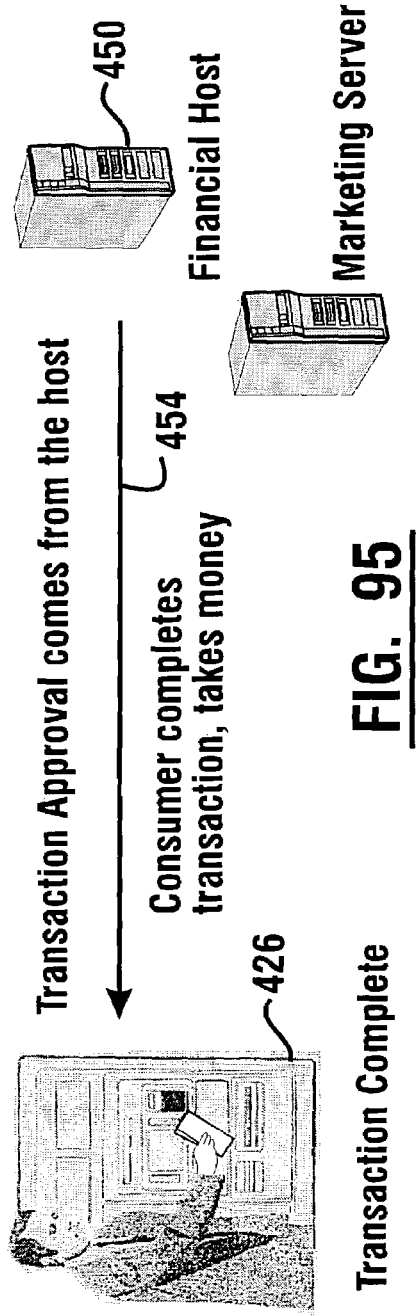
Figure 96:
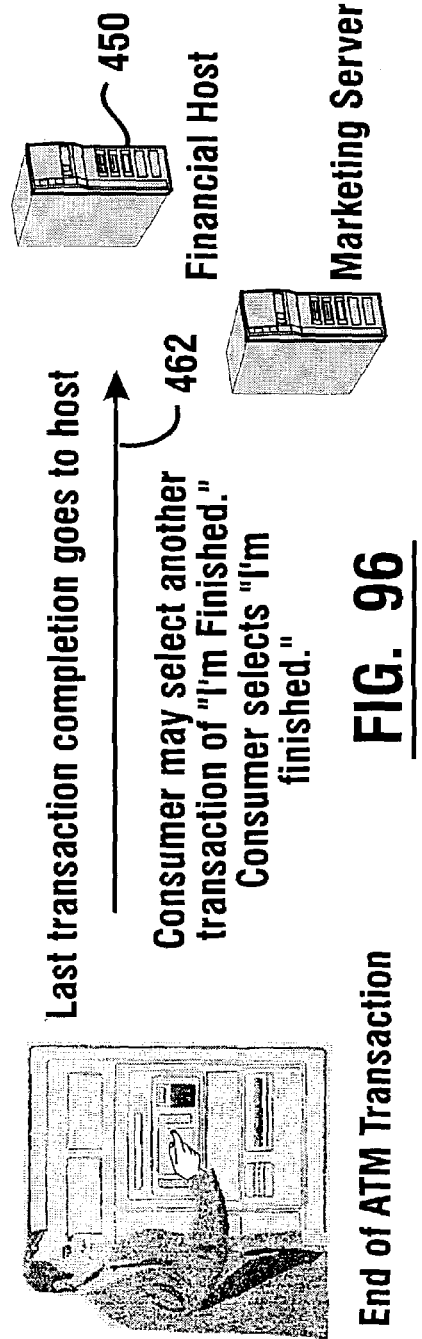

While the customer is presented with the marketing information the financial transaction host 450 generates a transaction response 454 to the transaction request message. The transaction response generally indicates that the transaction may proceed or is to be denied. After the marketing session the agent 428 enables the logic flow within the ATM to move to a next state 456 in which the ATM receives the transaction response data from the host. In response to receiving the transaction response, the logic flow moves to a state 458 in which the transaction is carried out through operation of the transaction function devices in the ATM. In this exemplary transaction the functions include the dispense of cash to the user. This is represented in FIG. 95. Of course if the transaction response message 454 indicates that the transaction cannot be carried out, the function state 458 causes the computer to operate so that the ATM presents to the user an indication that the transaction cannot be completed or other appropriate information.

In the exemplary transaction, after completing the cash dispensing function the ATM then moves to close the transaction. This may include for example executing steps in states associated with returning the card to the user or prompting the user to indicate through an input whether they wish to conduct another transaction. The ATM will also execute steps in states that provide the user with a receipt for the transactions conducted. The ATM computer also takes steps to make a record of the transaction that has been performed. To confirm to the financial host 450 that the transaction requested was completed, the computer operates in a state 460 to send transaction completion message 462 to the financial host. This advises the host computer that the transaction was completed and that the customer's account should be charged for the funds dispensed. This step is schematically also indicted in FIG. 96.

Either during the course of the financial transaction or thereafter, the ATM agent 428 operates to forward a marketing acknowledgment message 464 to the marketing server. The marketing acknowledgment message preferably includes identifying data concerning the customer as well as data indicative of the responsive inputs that they have provided to the presentations. This data is processed by the marketing server as required to determine the presentation that will be provided to the user on subsequent occasions, or to satisfy the request that the user has input. The sending of the marketing acknowledgment message 464 is schematically represented in FIG. 94.

In the exemplary embodiment of the system 420 shown in FIG. 90, the processing of the financial request message to determine whether the transaction is authorized is conducted during the same time period that the marketing presentations are being made to the user. This may reduce the time that the transaction may be prolonged due to marketing presentations. In addition the use of the agent to acquire the presentation data during the time that the customer is inputting data necessary to carry out the financial transaction reduces transaction time. The delivery of the acknowledgment message to a computer other than the computer which handles financial transactions avoids the need for additional processing within the financial transaction host. This avoids the need to modify the standardized operation of the financial host. The system also enables the customer input data to be delivered either during or after the financial transaction which also potentially reduces the time required to carry out the transaction. The exemplary system also enables the marketing presentation to be determined independent of the entity authorizing the financial transaction.

Figure 97:
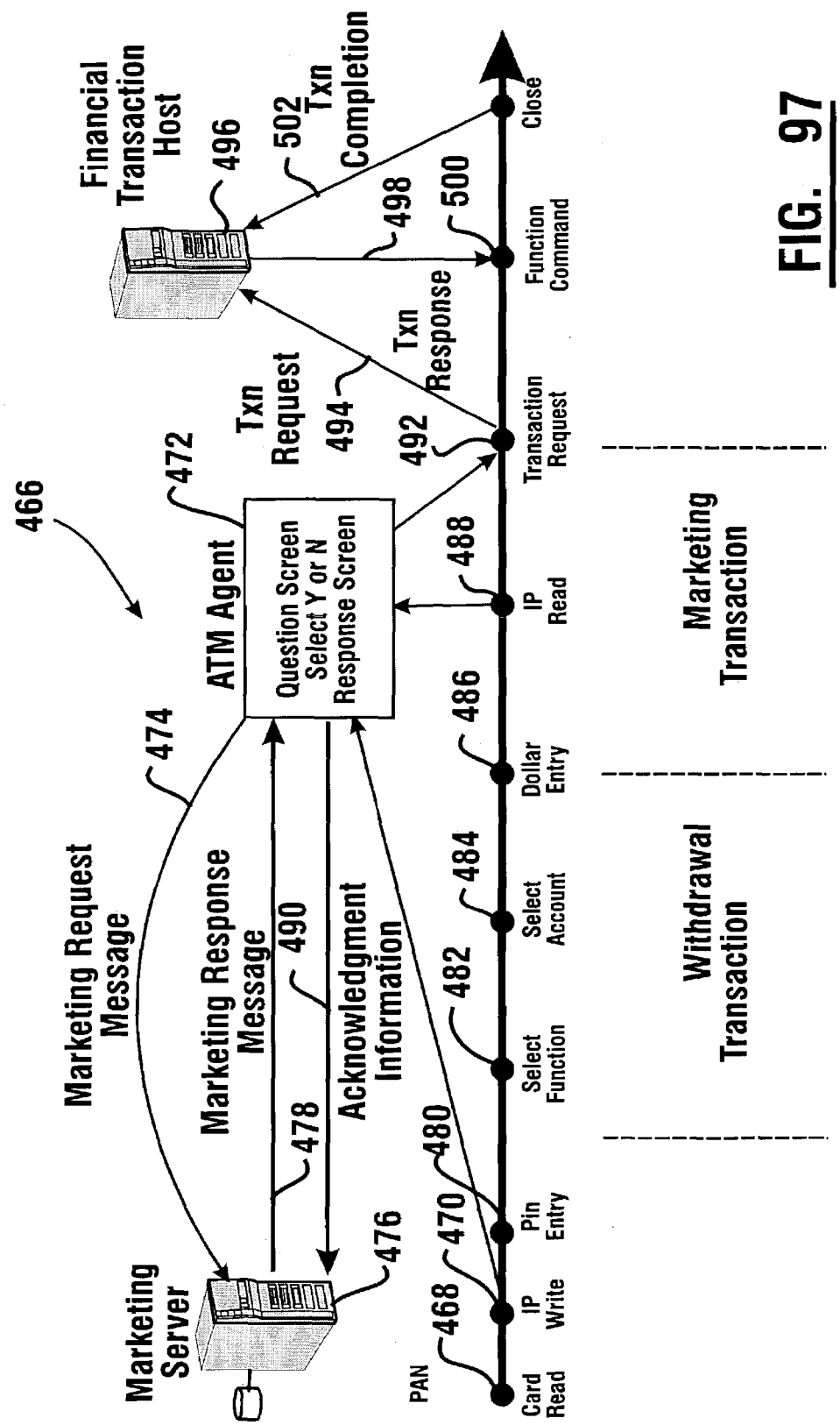
FIG. 97 is a schematic view of an alternative logic flow used in conducting a marketing session and a financial transaction for a user at an ATM.

FIG. 97 shows yet a further alternative embodiment of a system of the present invention generally indicated 466. System 466 is similar to system 420 except as otherwise indicated. System 466 enables the delivery of marking presentations at an ATM that is configured so that a single state is responsible for both sending the transaction request message to the financial transaction host and receiving the transaction response which dictates the next function to carry out. Many existing ATMs are programmed in this manner and the system shown in FIG. 97 enables such ATMs to include the marketing capability previously described without modifying this underlying programming of the state responsible for sending and receiving the financial messages.

As in the previously discussed embodiment the customer initiates a transaction by providing an identifying input such as the input of a card which includes a PAN. This is accomplished in a card read state 468. The ATM next moves to a write state 470 in which the customer identifying PAN data is caused by an agent 472 installed on the computer in the ATM to send a marketing request message. The marketing request message 474 is sent to the marketing server 476. The marketing server operates to resolve the presentation to be made to the user and includes data representative of the resolved presentation in a marketing response message 478.

After the customer enters their card the ATM proceeds in its logic flow through a PIN entry state 480, a select function state 482 and a select account state 44. For purposes of this exemplary transaction it will again be assumed that the user is requesting a dispense of cash. The user inputs the dollar amount to be dispensed and the ATM executes the dollar entry state 486.

After the dollar entry state the logic flow moves to a read state 488. In the read state 488 the agent operates in the manner previously described to deliver the marketing presentation to the user. After delivering the presentation the ATM agent also operates to cause the ATM to send an acknowledgment message 490 to the marketing server 476. The acknowledgment message includes any responsive input data from the customer. As previously discussed this acknowledgment message may be sent either while the financial transaction is ongoing or subsequent to the completion thereof.

After the agent operates to provide the marketing presentation the logic flow of the ATM proceeds to a transaction state 492. In the transaction state the ATM operates to send a transaction request 494 to the financial host 496. In the transaction state 492 the logic flow waits for a transaction response message 498 before moving to the next state in the logic flow. In this exemplary embodiment the user may be presented with a "please wait" or other screen during this period. Of course as previously discussed embodiments of the invention may also present marketing campaign messages during this time period.

In response to the transaction response message 498 the ATM operates to execute the function in accordance with the response by executing steps in a state 500. The ATM logic flow then moves to close the transaction in the manner previously discussed. This includes sending a transaction completion message 502 to the transaction host to confirm that the transaction was carried out successfully. Of course the ATM logic flow also goes through additional steps to close the transaction in a manner similar to that previously discussed.

It should be understood that while presentations have been discussed as being made during cash dispensing transactions, this is exemplary. The present invention may be used to provide for presentations to be output during many types of transactions which are conducted at an ATM or other transaction machine.

An advantage of the exemplary system shown in 466 shown in FIG. 97 is that the functionality of providing targeted marketing messages to users is achieved in existing ATM systems in which the activities associated with sending a transaction request and receiving a transaction response are carried out within a single state within the ATM logic flow. This avoids the need to modify such ATMs other than by installing the ATM agent on the computer operating in the ATM, and adding the states which operate in connection with the ATM software agent. Such states may be relatively simple programs which can be included as part of the state logic flow executed by the ATM. For example an exemplary write state such as state 470 may include the logic necessary to send the message to the marketing server and the next state to move to in the logic flow. Alternative configurations of the write state may require that the marketing response message be received before moving on to the next state. In such cases the write state will preferably include a time-out period after which the logic flow moves on to the next ATM state if no marketing request message has been received.

Similarly exemplary embodiments of the read state 488 in which presentations are delivered responsive to the operation of the ATM agent are also relatively simple to include in the logic flow of the machine. Such exemplary read states may include instructions on the next state in the logic to proceed to after the presentation is made. Such states may also include time-out values so the logic flow may move forward in the event that there is a problem with the presentation or the customer input of a response. State 488 may also include instructions which cause the display of certain default screens or presentations in the event that a marketing response message has not been received.

As can be appreciated the inclusion of these additional states in the ATM programming logic generally do not impact the performance of activities associated with other states. Such additional states may be installed on the ATM by being configured and downloaded into the memory of the ATM terminal. Alternatively, the ATM may be programmed in various ways with the necessary logic flow and the software agent that enables carrying out the marketing function. In addition marketing presentation materials may also be downloaded into the local data store associated with the ATM in the manner which will be hereinafter described.

In the exemplary embodiment, operators of the system are enabled to selectively distribute and display presentation materials at ATMs or other transaction terminals that are connected to the system. This is accomplished in the exemplary embodiment by a data-driven system which includes a structured user interface to acquire the necessary information about the ATMs connected to the system, the presentation materials and the promotional campaigns to be presented. The required data is then downloaded to the ATMs through the TCP/IP network and other connected networks. The message processing programs (MPPs) and the message gateway routers (MGRs) do the necessary processing and message conversions to load the presentation materials and activation script to each respective ESD agent operating in an ATM. The system of the exemplary embodiment also receives the results of the campaign information and may selectively provide analysis thereof. In addition, the system is enabled to import data such as presentation materials from and to export data and other information to other systems which operate using different message types and formats.

In the exemplary embodiment the market message server is operative to provide the messages and instructions to both the ESD agent and the 1:1 agent. In this exemplary embodiment the market server is also operative to distribute the presentation materials used by the 1:1 agent to present targeted messages to customer. Messages from the 1:1 agent including the customer's PAN are routed through an MGR to one or more MPPs. The MPP determines the response message and the included data representative of the appropriate presentation which the 1:1 agent uses to provide outputs at the ATM. Similarly, the market message server in the exemplary embodiment also receives and analyzes the acknowledgment messages from the 1:1 agent that include the results of its activities and responsive inputs from customers. It should be understood that in other embodiments the function for communicating with the 1:1 agent as well as for loading presentation materials used by the 1:1 agent may reside on a separate computer from the computer that communicates with the ESD agent. Indeed, in other embodiments, the system which communicates with the 1:1 agent may be a separate computer from the one which operates the ESD agent. Also, ATMs may include the 1:1 agent but not the ESD agent and vice versa. The particular configuration will depend on the desires of the operator of the ATMs. It should further be understood that the various arrangements of computers and data stores discussed herein are exemplary and systems with different arrangements of computers and data stores, and which distribute functions in other ways, may be used in embodiments of the invention.

Figure 88:
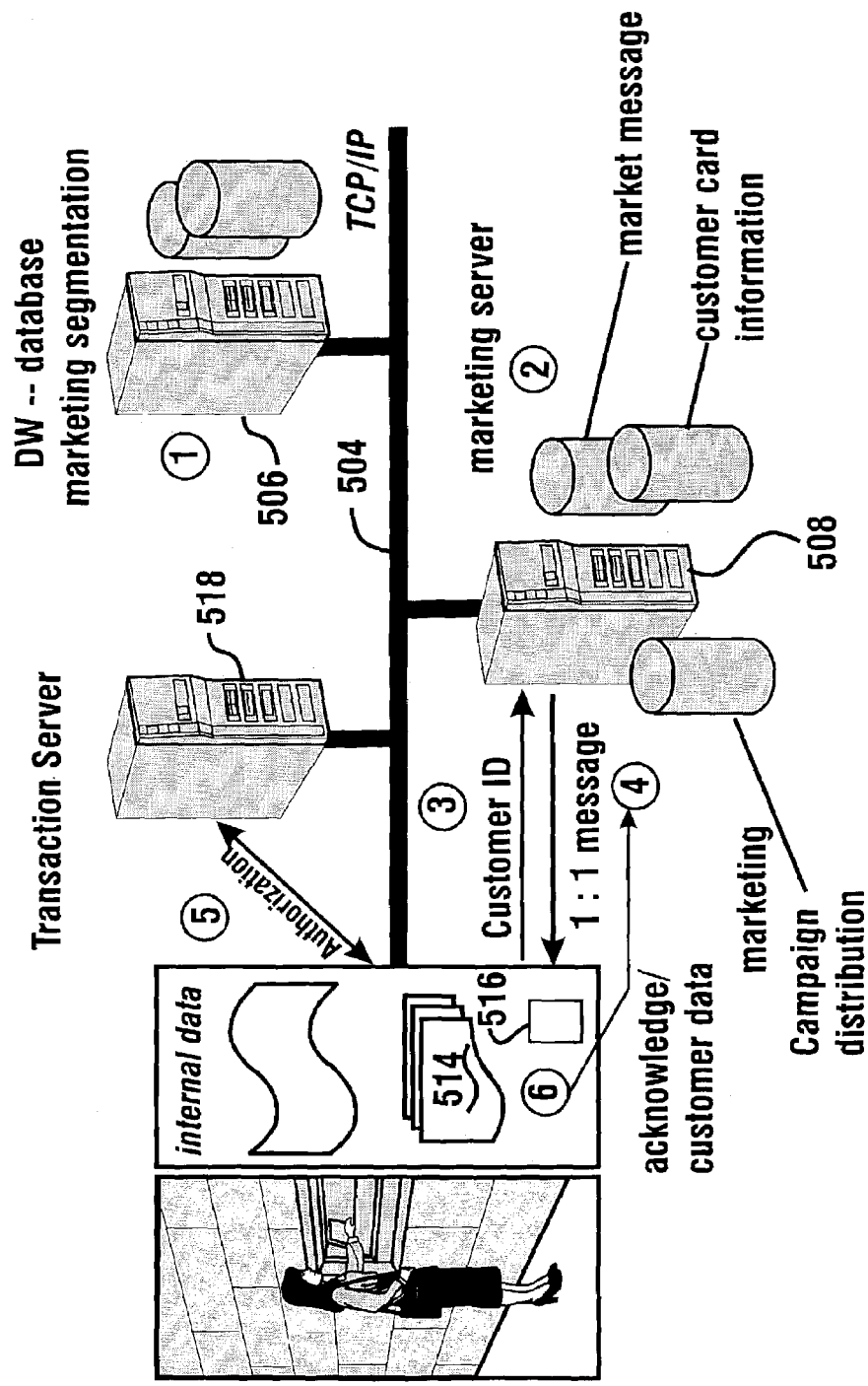
FIG. 88 is a schematic view of components connected in the system which operate to carry out the functions of marketing to particular users as well as to categories of users at a plurality of ATM machines.

FIG. 88 shows schematically an exemplary configuration for components which make up a system of the invention. In this exemplary embodiment all of the components are connected to a common network 504 such as a TCP/IP network. Of course other network types may be used. The marketing data used in the system may generally be imported from one or more computers schematically indicated 506 which serves as a data warehouse. Data warehouse computers may include information on customers, market segments, campaign information or other customer presentation information. In the exemplary system the data from the data warehouse is put to work in the marketing server 508. The marketing server has machine data associated therewith such as features of automated transaction machines and the capabilities thereof. The marketing server also has available information about the distribution of presentation materials into the local memories at the ATMs. Customer identifying data such as customer PAN information and other information about customers is also stored in connection with the marketing server. The marketing server also operates to determine presentations to be made to customers and to receive customer responses to those presentations, which responses may be used for selling and marketing products.

Figure 89:
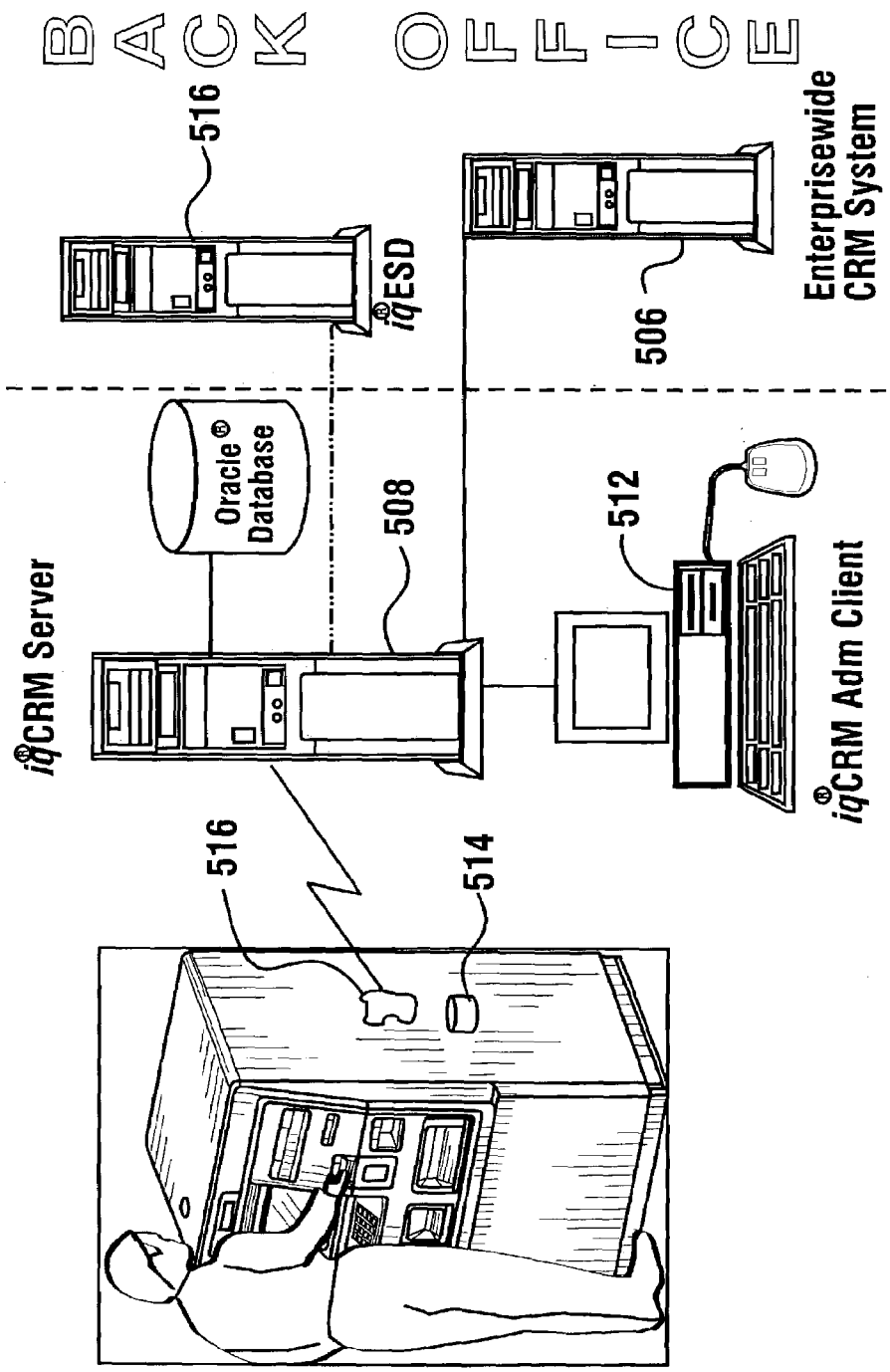
FIG. 89 is an exemplary embodiment of the relationship between connected computers in the system represented in FIG. 88.

As represented in FIG. 89 the distribution of presentations to local ATM memories as well as the development of marketing campaigns to users in general or groups of users, may be configured from a separate computer schematically indicated 516. Computer 516 of the exemplary embodiment operates software provided by the assignee of the present invention under the trademark iq® ESD. Of course it should be understood that the message presentation software may also operated in the marketing server. As also represented in FIG. 89, workstations 512 are also connected in the network. Workstations may be used for inputting data as well as for controlling the distribution of presentations and the development of campaigns. Workstations may also be used as output devices for obtaining reports and customer data. The customer data may also be used for contacting users concerning products that they have expressed an interest or for delivery of products that users have ordered through operation of the system.

As represented in FIGS. 88 and 89 presentation data 514 is stored in the exemplary embodiment in memory on the ATMs. One or more agents 516 are installed in the computer operating on the ATM and are operative responsive to their programming to output the presentations stored in memory. In addition as represented in FIG. 88, a separate financial host computer 518 is operative to carry out the financial transactions requested by users at the ATMs.

As previously discussed, exemplary forms of the present invention enable various types of selected marketing activities to users of automated transaction machines. The marketing may be tailored to attributes of the particular user as well as to the user's location or other circumstances. The marketing activities may also be controlled by the owner of the machine rather than the entity which has the financial account relationship with the customer. This may be particularly advantageous in circumstances where the entity with which a user has an account relationship may have no interest in marketing certain products that may be of interest to the user. The capabilities of the exemplary embodiment to provide marketing capabilities within the context of existing ATM transaction authorization systems is also useful in enabling such capabilities on existing ATM systems.

Figure 32:
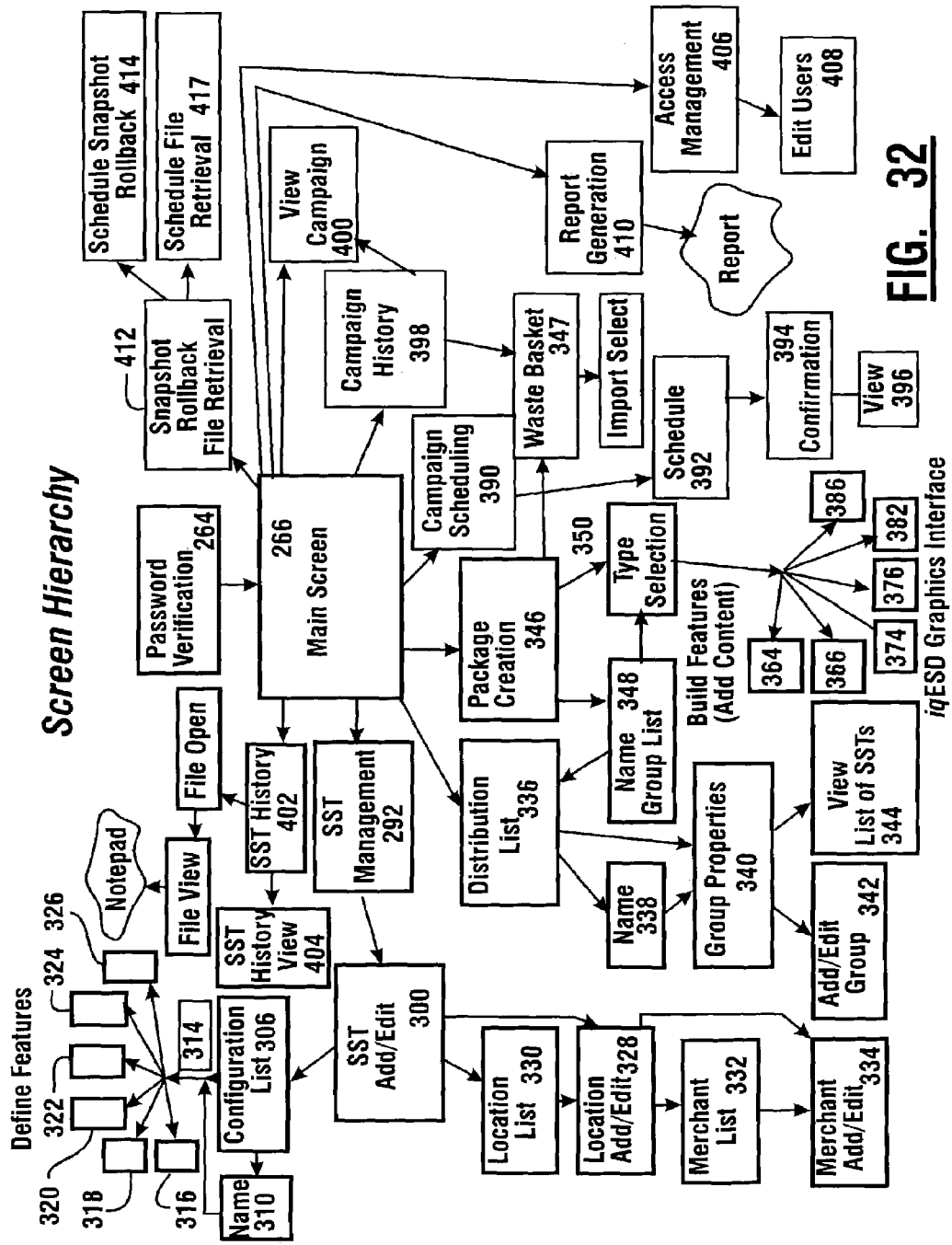
FIG. 32 is a schematic view of the exemplary relationships between categories of data used in connection with distributing and presenting marketing information through an ATM marketing server to automated transaction machines.

FIG. 32 schematically represents an exemplary organization of data which is used in connection with a server that distributes presentations to ATMs and which causes presentations to be presented responsive to operation of the ESD agents. FIG. 32 is representative of screens which are output through a graphical user interface of the system. The boxes are representative of screens produced responsive to operator inputs to the system. The arrows are representative of the logic flow which the system employs to obtain the input of data and instructions to the system. This input data is then stored in connection with the appropriate records so that it can be utilized by the MPPs and MGRs of the system for distribution, presentation and analysis of marketing material.

In the operation of the system, an operator wishing to access the features provided by the market message server is first required to input a recognized password. This is generally done through a workstation that is connected in a network with the server. The workstation includes the input and output devices used by the operator. The input of a password is indicated by screen 264 in FIG. 32. Upon entry of a recognized password the software causes the market message server to present the user with a main screen indicated 266 and shown in greater detail in FIG. 33. Screen 266 is the primary screen for accessing the data and instructions underlying operation of the system. It includes a listing of the marketing campaigns 268 which are currently active. An icon 269 enables an operator to selectively view either those campaigns that they are specifically associated with, or all campaigns which are operating in the system. Main screen 266 also includes icons 270, 272, 274, 276, 278, 280, 282, 284, 286, 288 and 290. Selecting these icons enables a user to access and modify the associated data which controls operation of the system. It should be understood that while a Microsoft® Windows® type graphical user interface is presented in the exemplary embodiment, in other embodiments of the invention other types of interfaces may be used. These include, for example, non-visual type interfaces through which a user may input and receive data.

Figure 68:
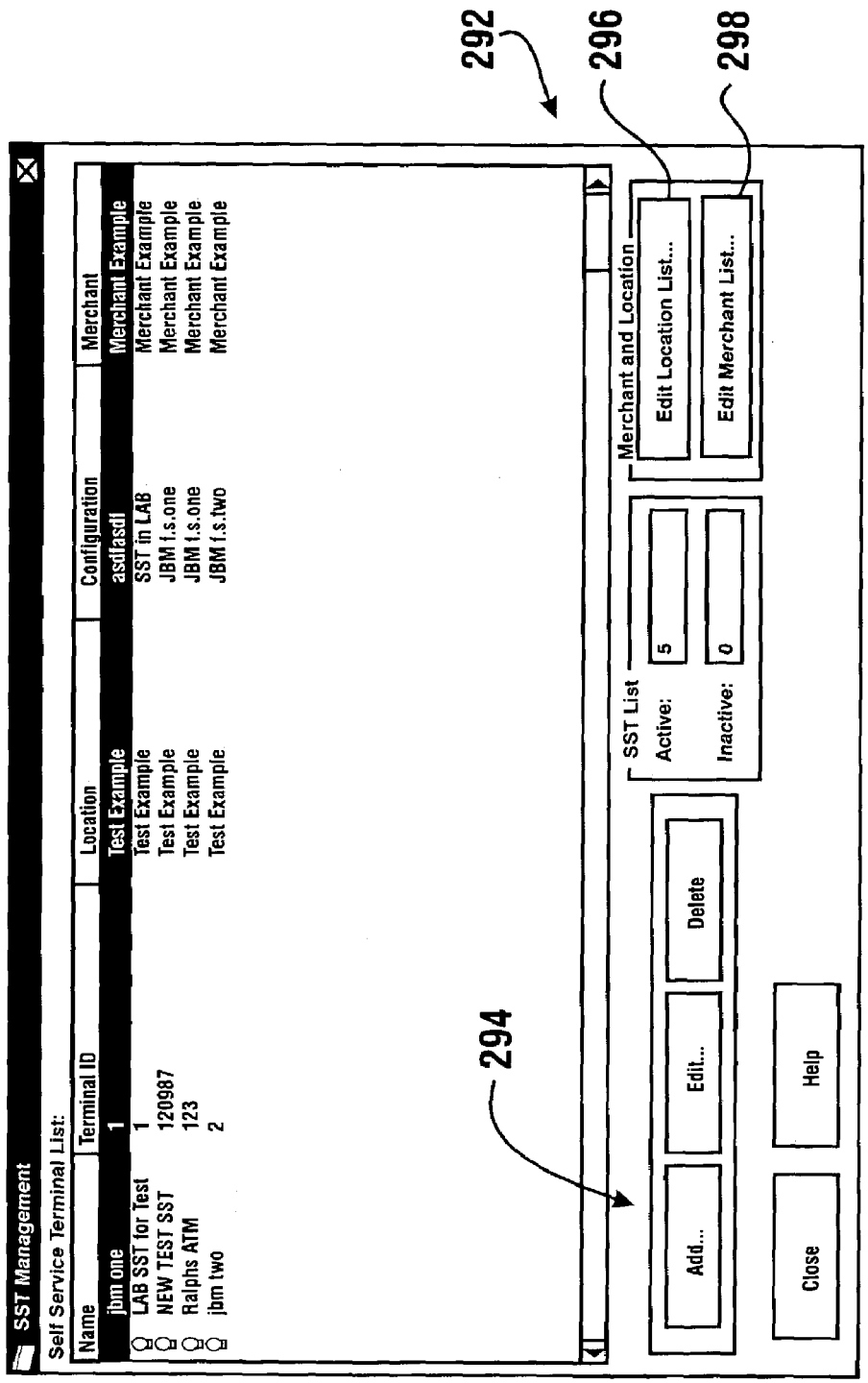

In operation of the system the user is enabled to define the data which controls the system operation. Such data may generally be populated in any order, and it should be understood that the examples presented herein are exemplary. To provide or view the current information about ATMs and other transaction terminals, a user may select icon 284 in FIG. 33. The selection of icon 284 causes an SST management window 292 shown in FIG. 68 to be presented. Screen 292 includes a listing of ATMs or other transaction terminals which are operating in connection with the system. This window displays the terminal names, identification data, location, configuration data and the merchants with which each terminal is associated. By selecting icons 294 the user is enabled to add, modify or delete terminal information from screen 292. In addition, by selecting an icon 296 a user is enabled to view a location screen later discussed, and by selecting an icon 298 a user is enabled to view a merchant list as later discussed.

Figure 74:
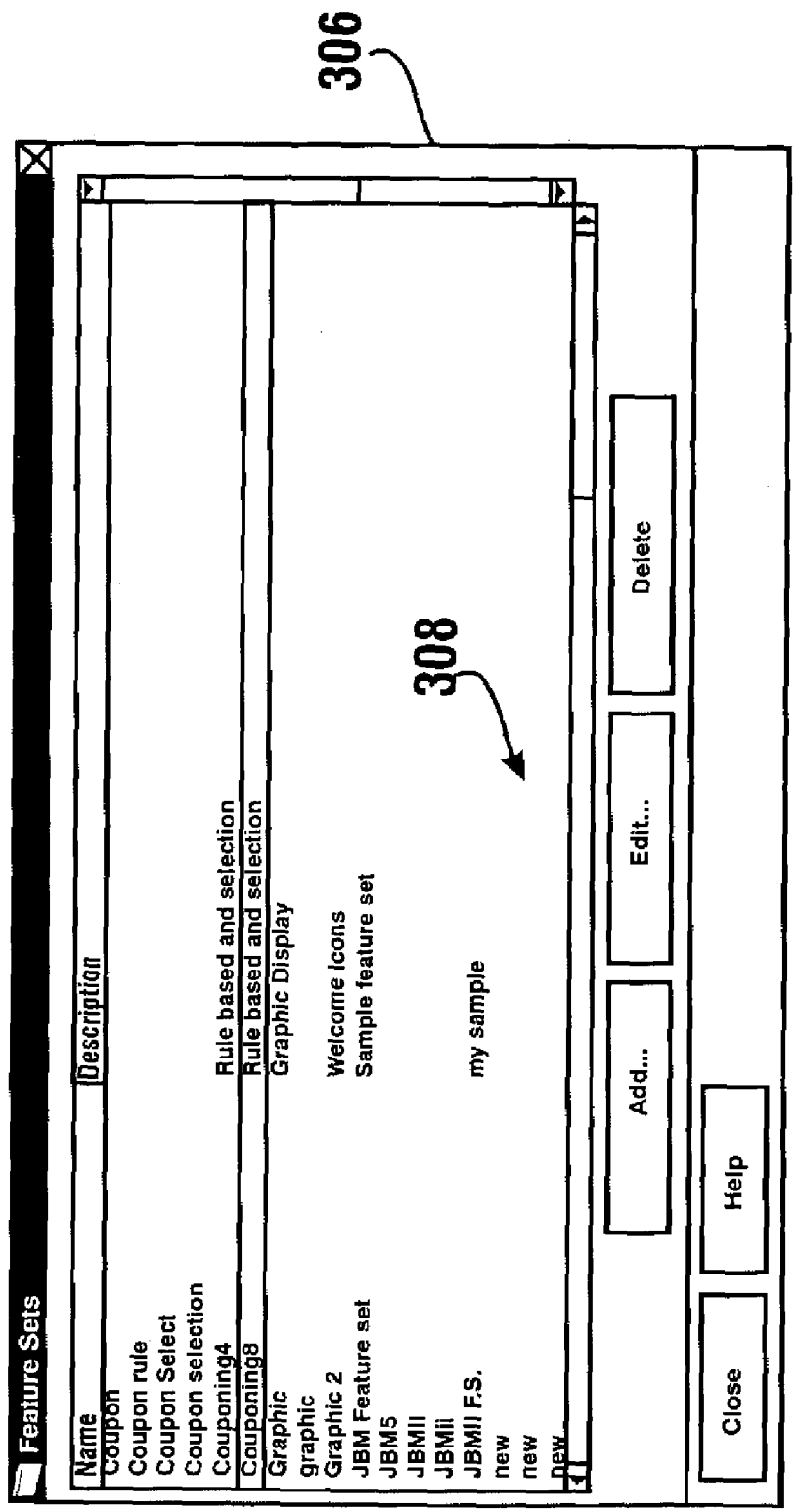
Figure 75:
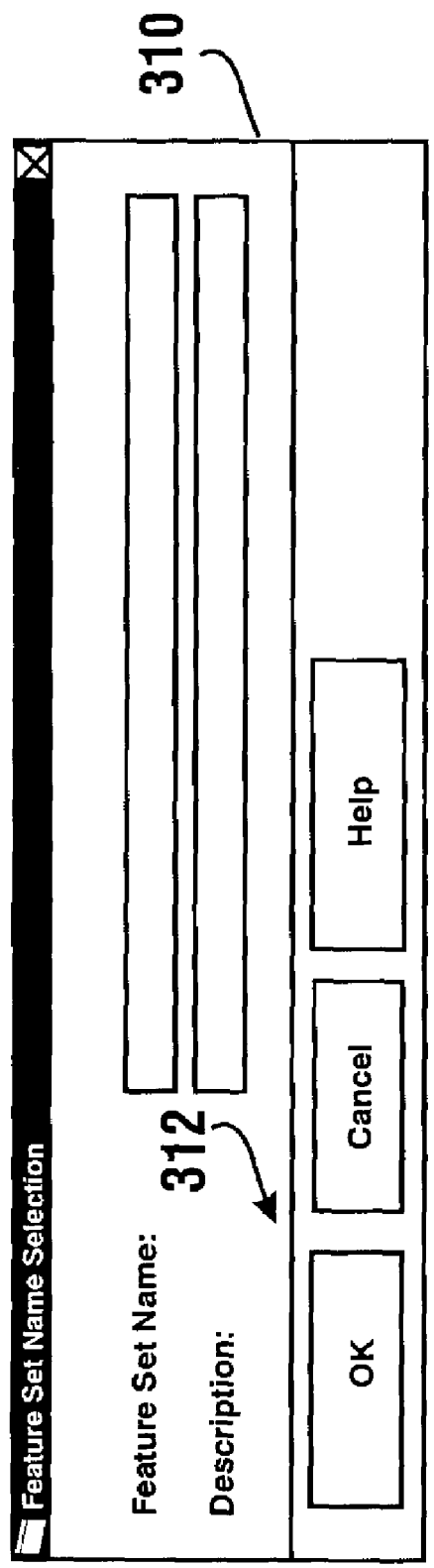

By highlighting and selecting one of the selected terminals in screen 292, a user is enabled to view selected information about that terminal. The information includes data corresponding to attributes of the ATM terminal. Selecting a terminal from screen 292 causes a screen 300 like that shown in FIG. 69 to be displayed. Screen 300 includes information about the particular terminal including its location, features and other information. Screen 300 includes configuration data indicated 302 for the particular terminal. This data may include, for example, the presentation materials resident on the terminal as well as local state and screen data, when local states and screens are used. The configuration data can be modified by selecting an icon 304. Selecting icon 304 from screen 300 causes a screen 306 to be displayed which is shown in FIG. 74. Screen 306 lists feature sets which are included on the ATM. By selecting icons 308 in screen 306, the user is enabled to add, delete and edit feature sets. For example, if a user inputs a selection to add a feature set, a screen 310 shown in FIG. 75 is displayed. Screen 310 enables a user to provide a name and description for the particular feature set. The user then selects one of icons 312 to accept or edit the feature set description.

Figure 76:
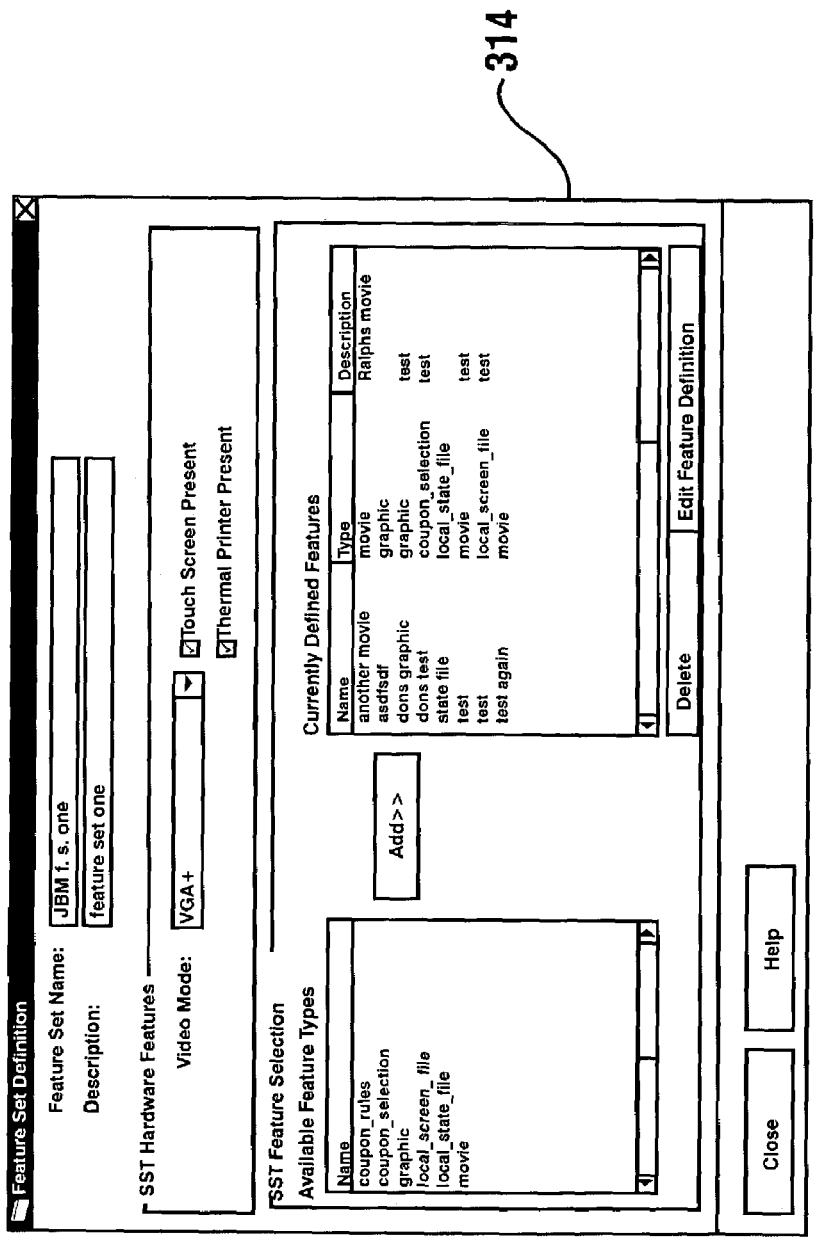

Alternatively, by selecting a feature set in screen 306 or by indicating that they wish to define a new feature set in screen 310, the system provides a feature set definition screen 314, which is shown in detail in FIG. 76. Screen 314 indicates the feature set and its description as well as the features that are available on the terminal to operate in connection with the presentation materials. Screen 314 further includes the particular features that are available on the terminal as well as currently defined features that are enabled to be added to the terminal based on the available feature types that the terminal can operate.

Figure 77:
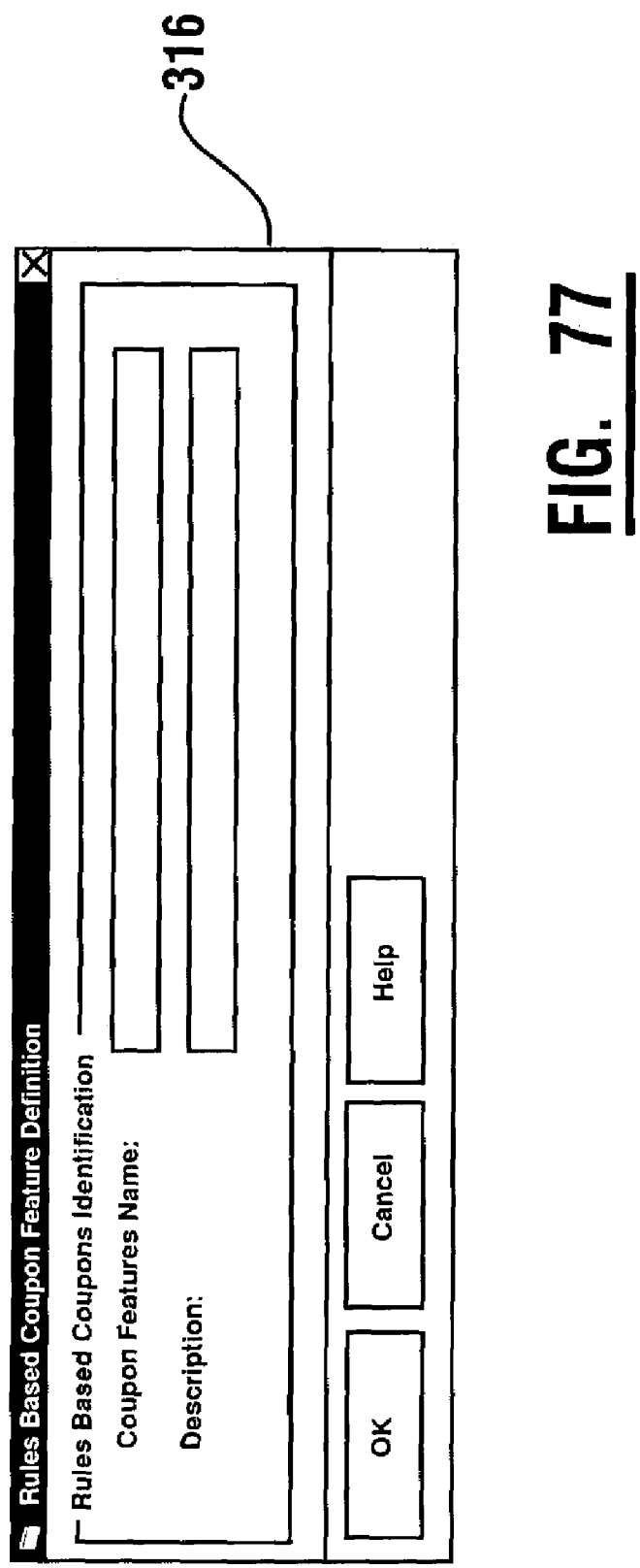
Figure 78:
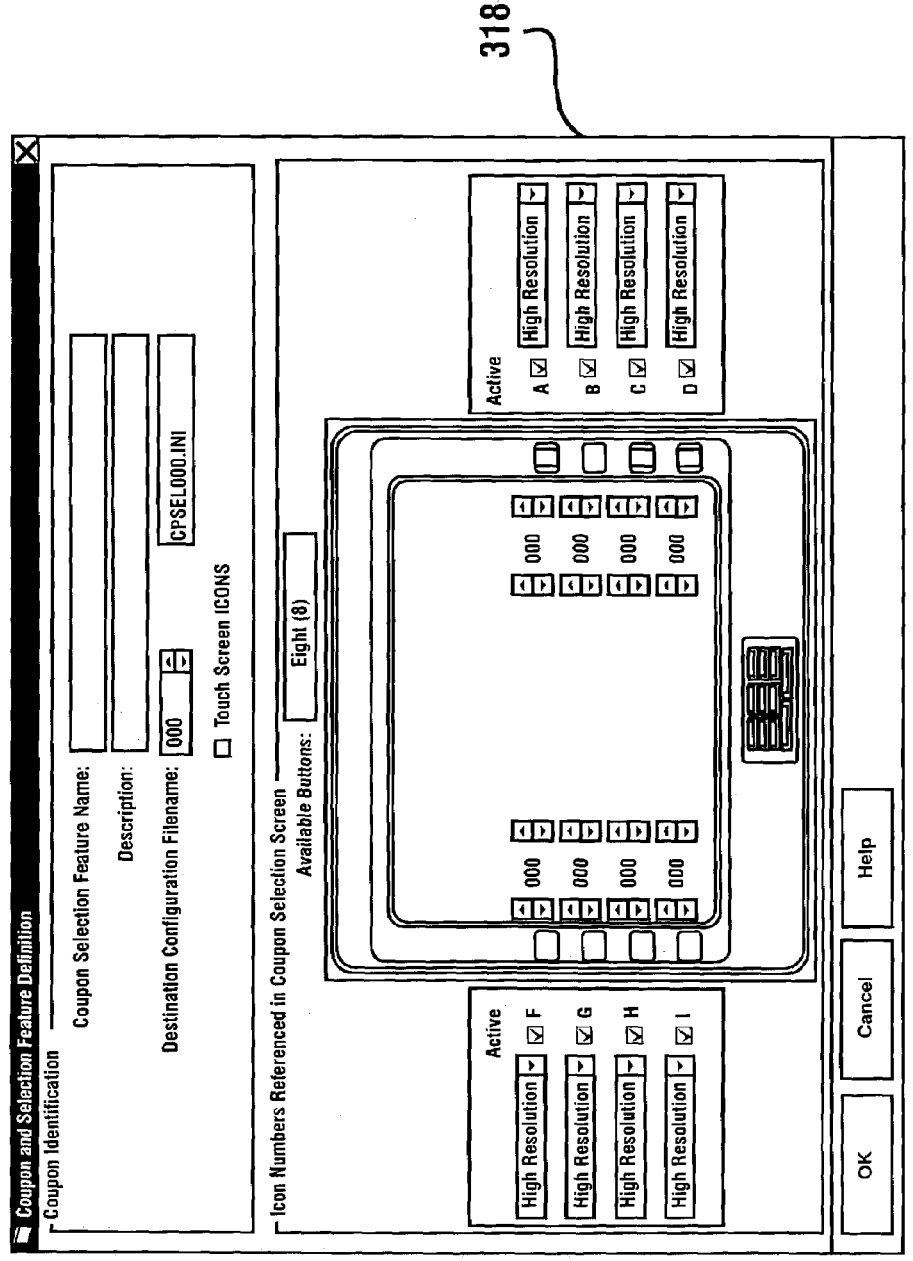

For a selected feature type, a user is enabled to review and set up the rules which control the presentation of that feature on the terminal. For example, if a user selects "coupon rules" from the available feature selection, a screen 316 shown in FIG. 77 is presented. This enables a user to define the coupon feature and description for the particular terminal. By selecting the "coupon selection" feature type from screen 314, a coupon selection screen 318 shown in detail in FIG. 78, is displayed. Screen 318 enables a user to define the screen layouts associated with a coupon selection feature definition. As can be appreciated from screen 318, a user is enabled to designate which function keys are active on the interface for a coupon presentation.

Figure 79:
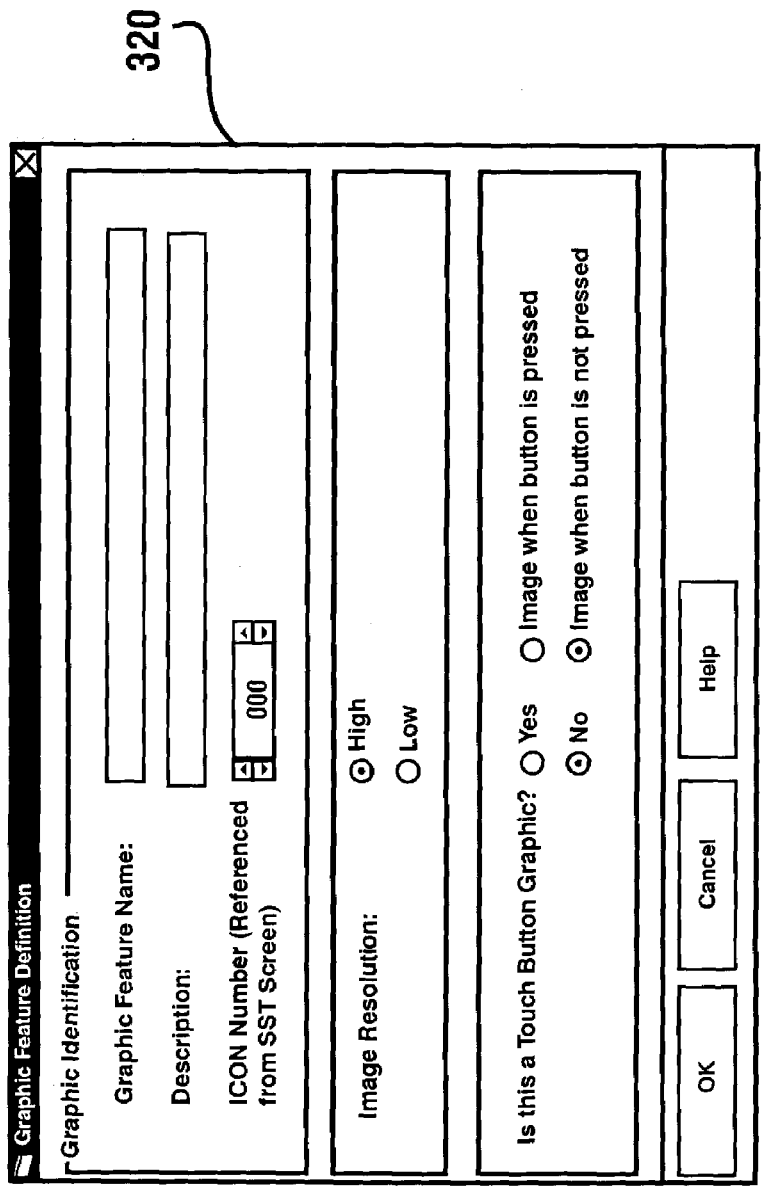

Selection of graphics under the available feature types from screen 314 causes a screen 320, which is shown in greater detail in FIG. 79, to be displayed. Screen 320 enables an operator to set up graphic definitions for particular icons which will be presented on the screen of the ATM as referenced in the layout shown in screen 318.

Figure 80:
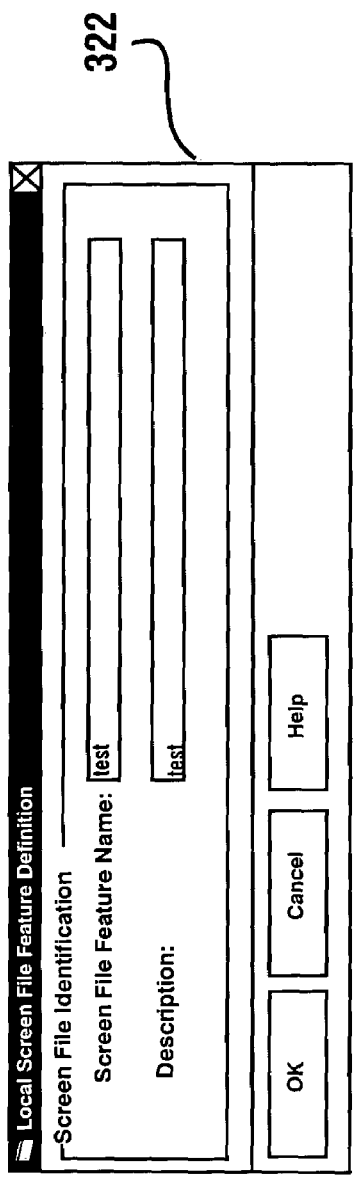
Figure 81:
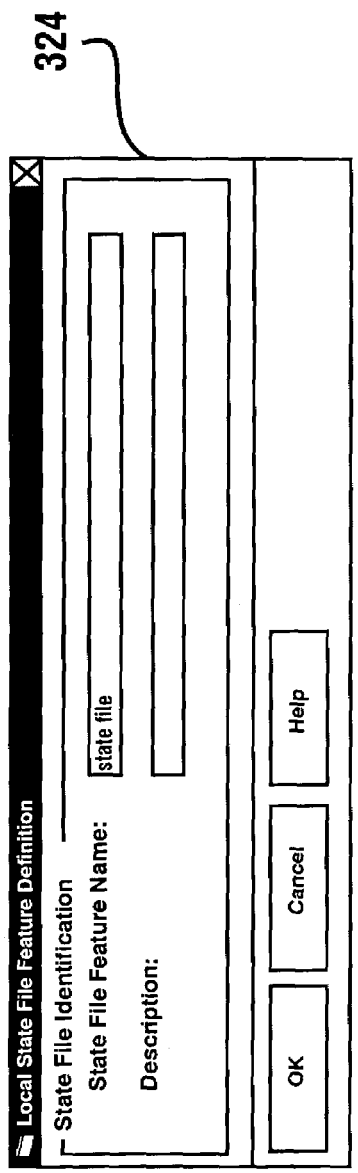
Figure 82:
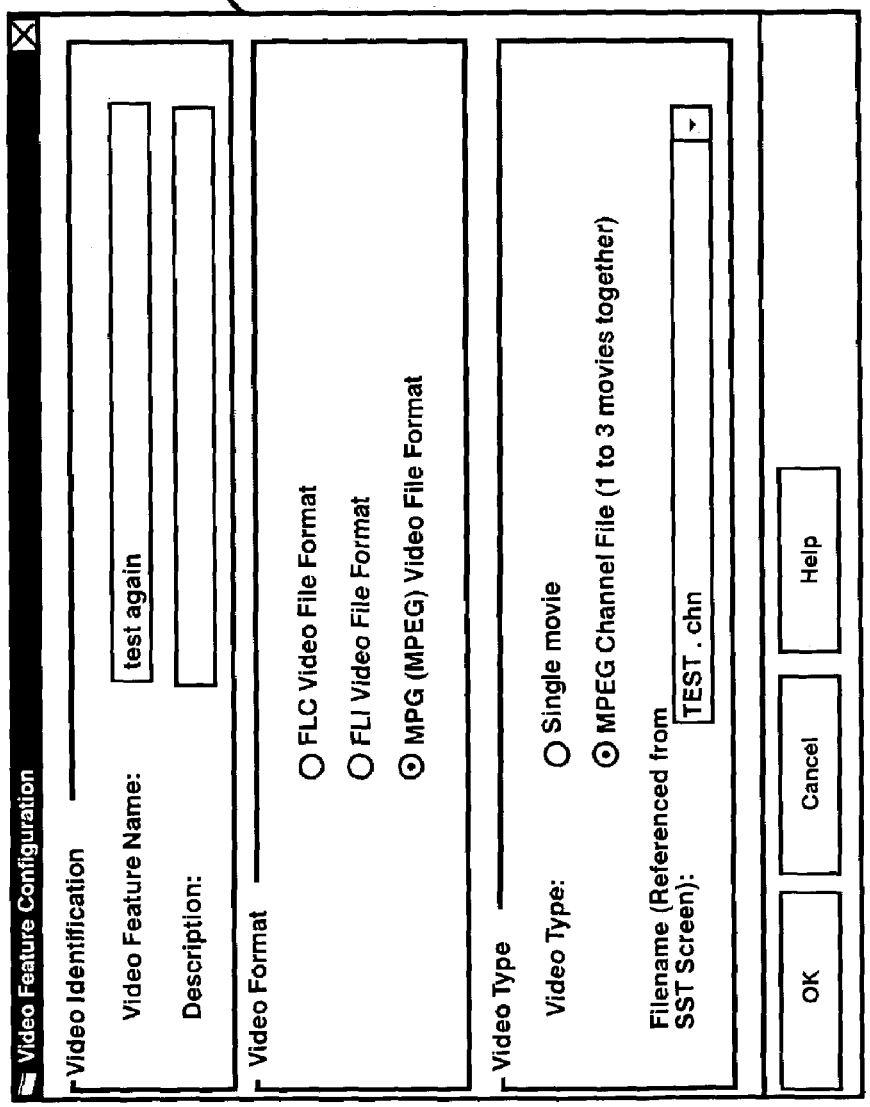

Selection of the local screen file designator among the available feature types in screen 314 causes a local screen file feature definition screen 322 to be displayed. Screen 322, which is shown in greater detail in FIG. 80, enables the user to review and input information describing a local screen file stored at the terminal. Likewise, selection of the local state file from the available feature types in screen 314, causes a screen 324 to be displayed. Screen 324 enables the user to input and review information concerning a local state which is present in the state logic operating the ATM. Such local states may include states such as states 432, 470, 452, 488 or other states that enable the graphical presentations to be presented at certain times in the logic flow. Likewise, selection of the movie feature under the available feature types in screen 314, causes a screen 326 to be displayed. Screen 326, which is shown in greater detail in FIG. 82, enables the user to provide and review information concerning the video format and type that the particular terminal may present.

Figure 69:
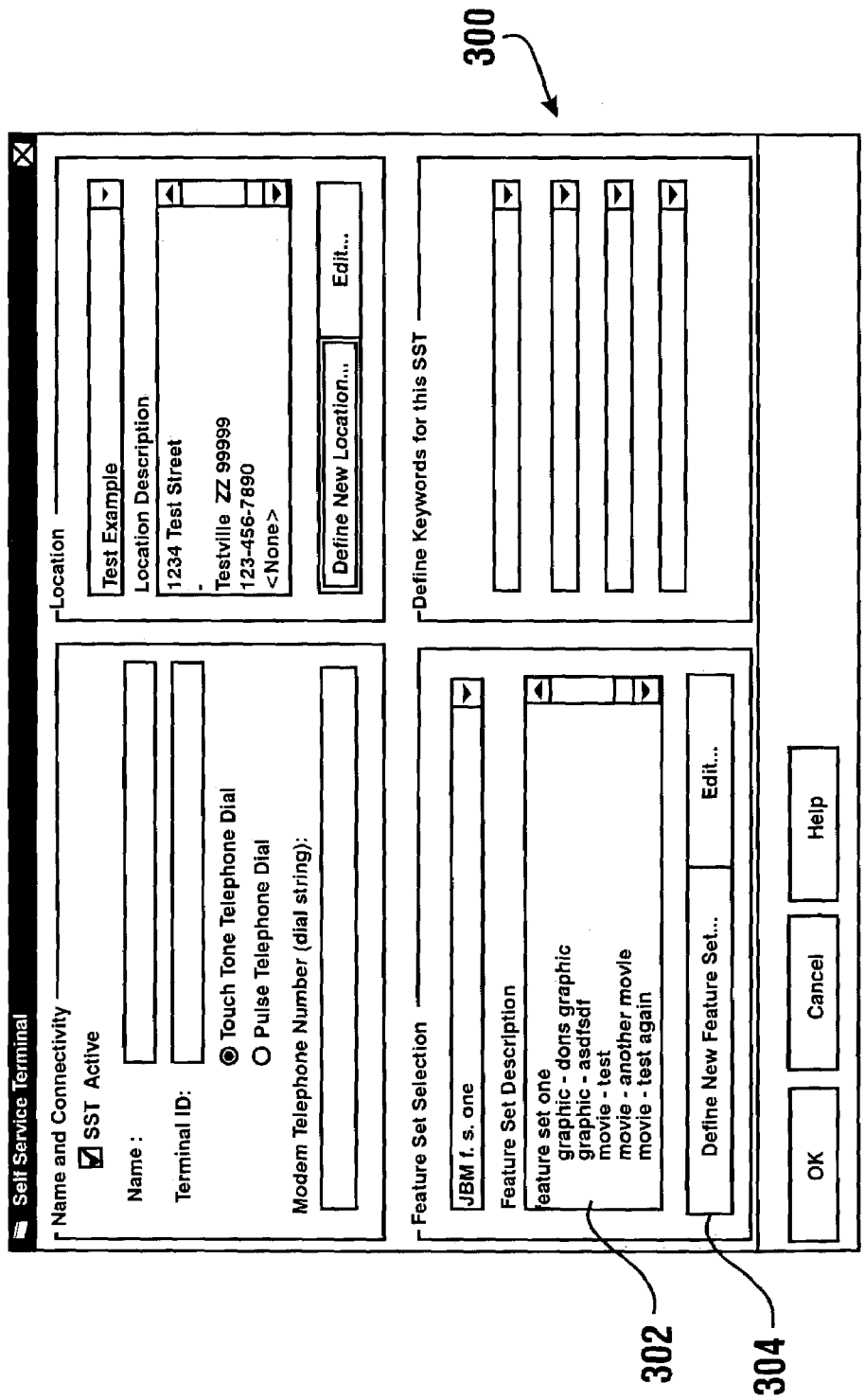

As will be appreciated from the foregoing description, an operator is enabled to set up the configuration data for each ATM by populating or changing the data in the screens which may be accessed by making selections from screen 300 shown in FIG. 69. In addition, operators are enabled to add new ATMs to the system from either the screen 292 shown in FIG. 68 or screen 300 shown in FIG. 69. This may be done by selecting icon 294 in screen 292 or the "define new location" icon in screen 300. Selecting these icons causes a screen 328 to be displayed. Screen 328 is shown in greater detail in FIG. 71. Screen 328 includes a template for information to be input regarding each ATM which is referred to as a self-service terminal (SST). Screen 328 is used to guide the operator to input the required information about each ATM including information about a merchant with whom the ATM may be associated.

Selecting icon 296 from screen 292 causes a list of ATM locations to be displayed. This list is represented by a screen 330, which is shown in greater detail in FIG. 70. Screen 330 provides a listing of all locations for ATMs connected to the system.

Figure 73:
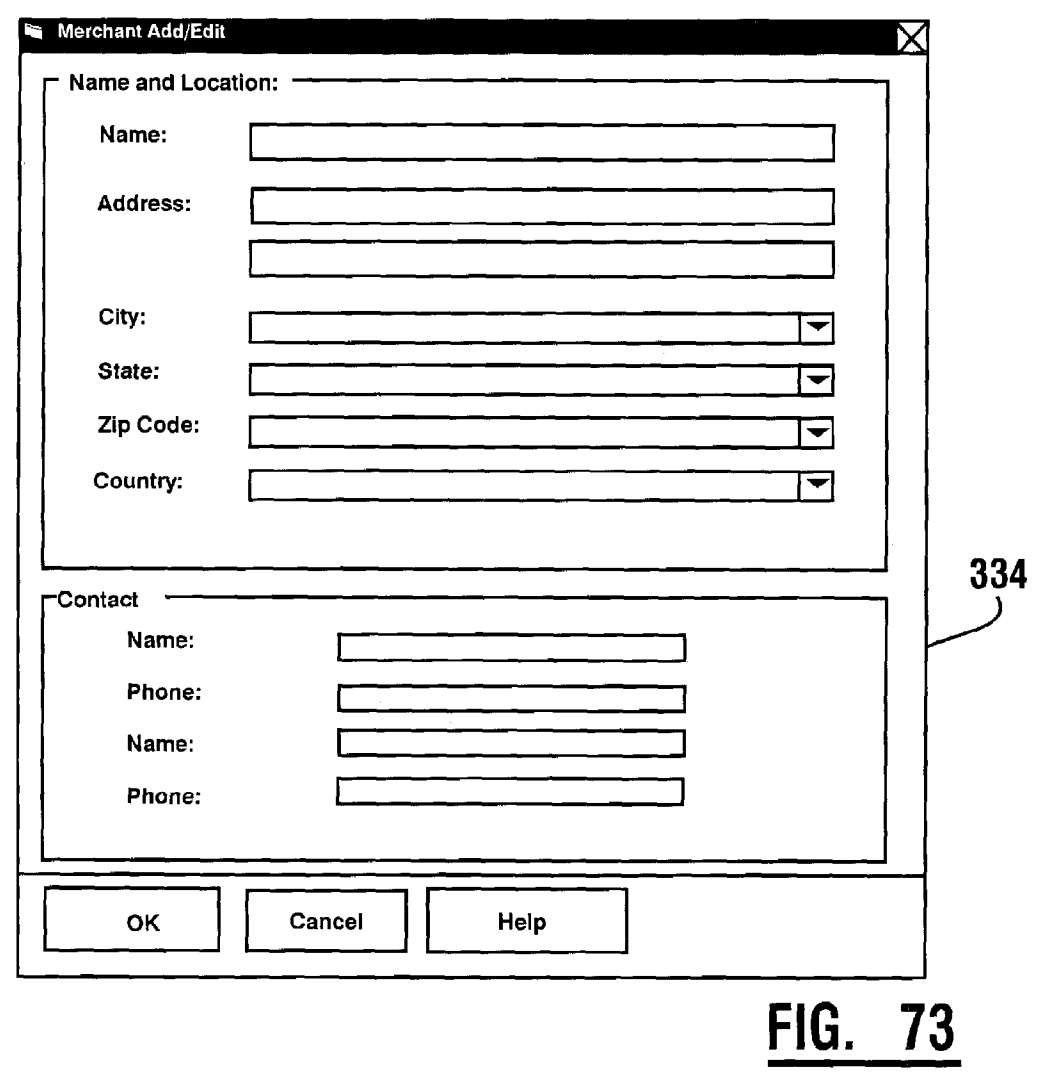

Selecting icon 298 from screen 292 enables a user to display a merchant selection screen 332. Merchant selection screen 332 includes a listing of merchants who are associated with ATMs connected to the system. The merchant selection screen is shown in greater detail in FIG. 72. Further, by selecting appropriate icons from screens 328 or 332, the user is enabled to display a merchant add/edit screen 334. The merchant add/edit screen which is shown in greater detail in FIG. 73, enables a user to input or modify the information concerning the merchant associated with a particular ATM.

Thus it will be appreciated that the logic carried out by the software and the associated user interface enables an operator to enter the data and instructions necessary to define the locations and characteristics of ATMs and other self-service terminals that are connected to the system. An exemplary embodiment of the present invention enables an operator of the system to establish selected groups of ATMs which will receive campaign presentations. This is useful as it enables selectively presenting campaigns which are expected to be of interest to persons in the particular location. This may involve promotions for the particular business in which the ATM is located. Alternatively, an operator may selectively distribute campaigns to ATMs that are in proximity to operations of advertisers. Similarly, the division of ATMs into groups may be used to prevent the presentation of advertising that would be considered inappropriate in particular locations such as advertising of competitive entities. However as later discussed, presentations may be selectively "rolled back" at particular ATMs as well.

Figure 34:
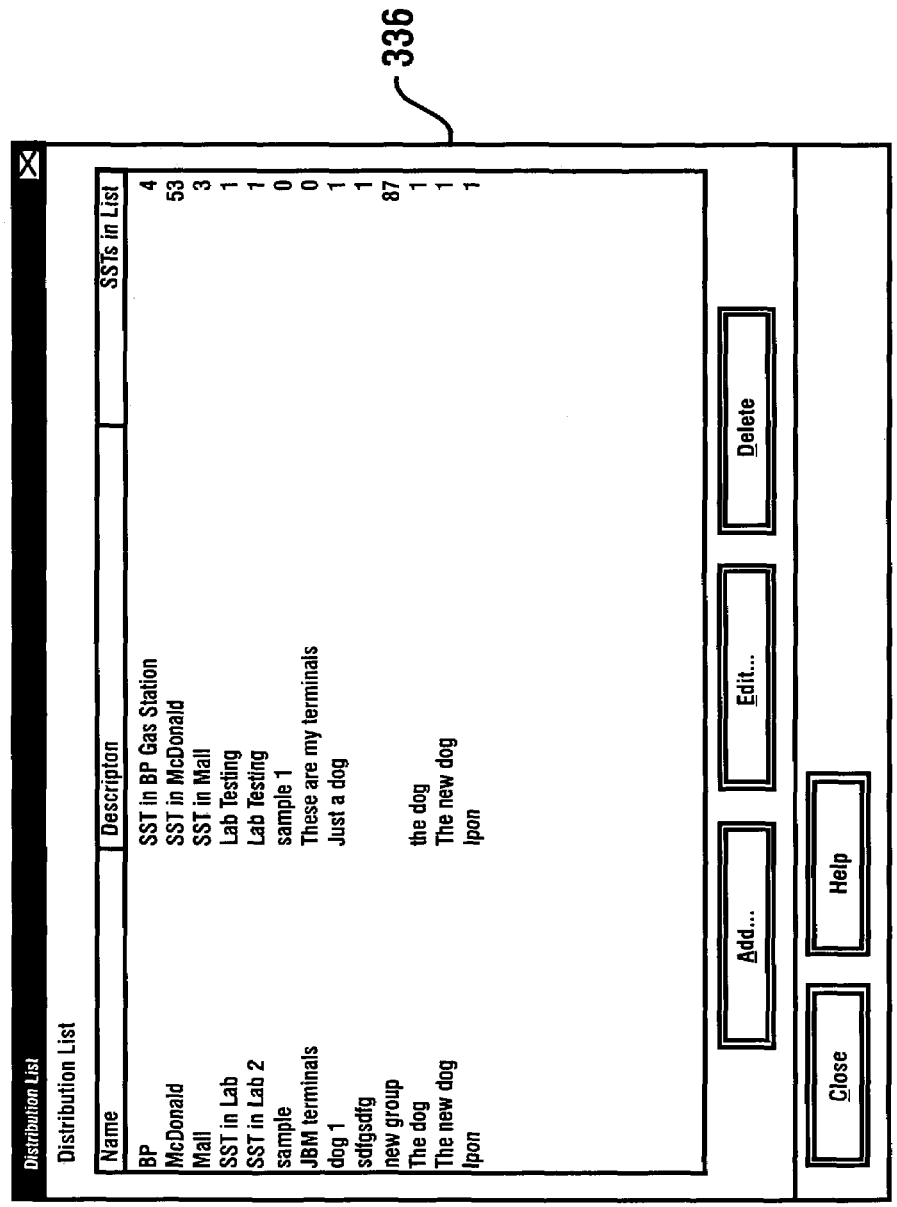
Figure 35:
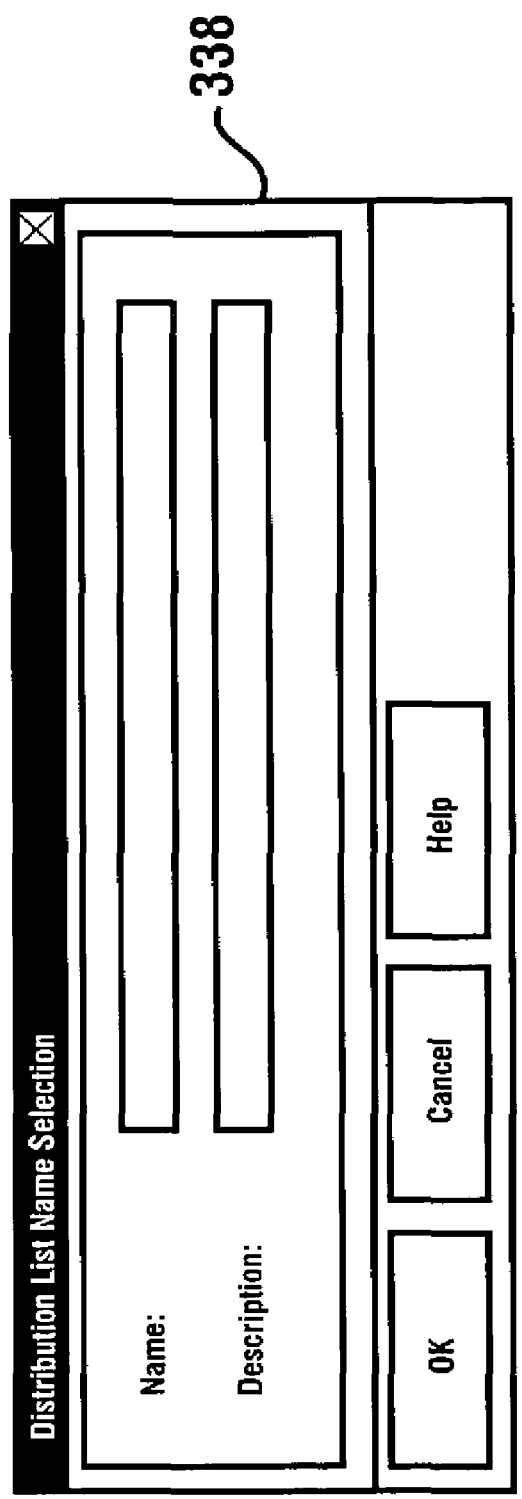

The user is enabled to define groups of ATMs by selecting icon 270 from the main screen 266. This causes a distribution list screen 336 to be displayed. Distribution list screen 336 is shown in greater detail in FIG. 34. Screen 334 shows the distribution list that had been created in the system as well as the number of self-service terminals (SSTs) which comprise ATMs which are part of the group. Selecting an appropriate icon from screen 336 indicating that a group is to be added, causes a main selection screen 338 to be displayed. Main selection screen 338 which is shown in greater detail in FIG. 35 enables a user to define a new name in the distribution list.

Figure 36:
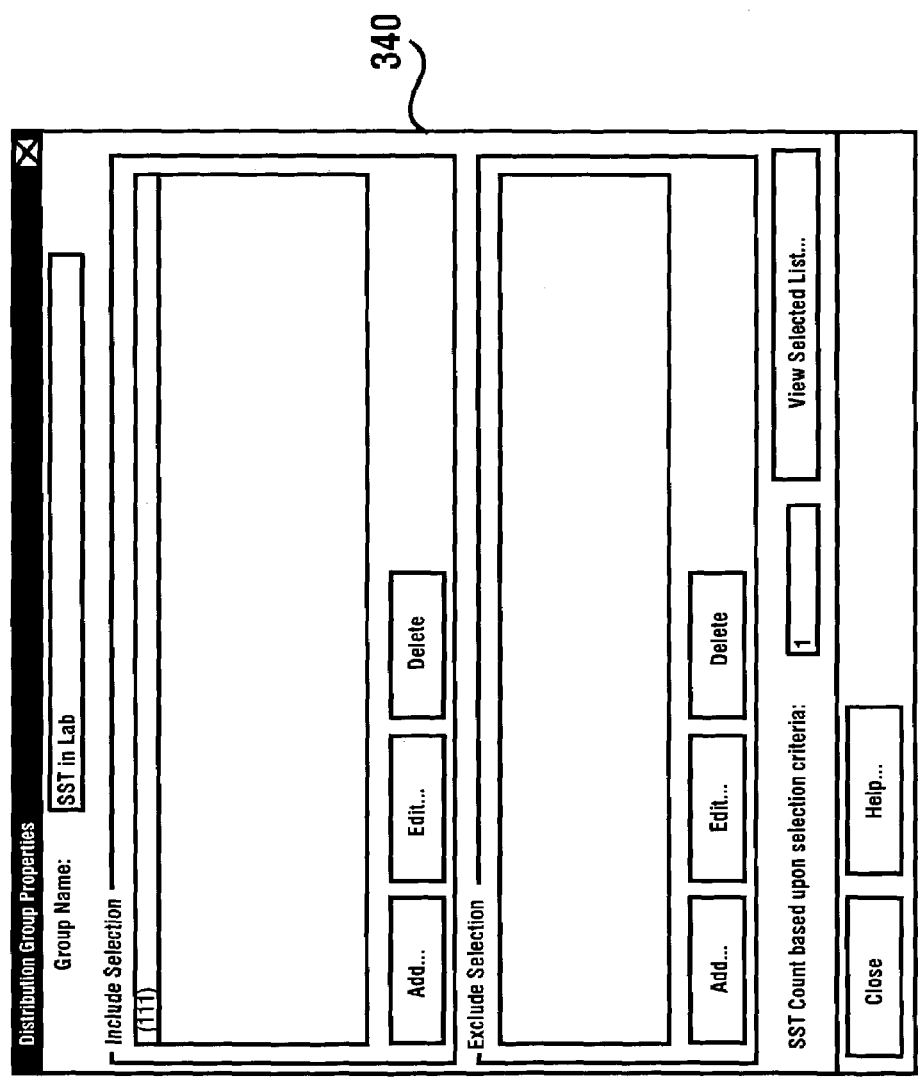
Figure 37:
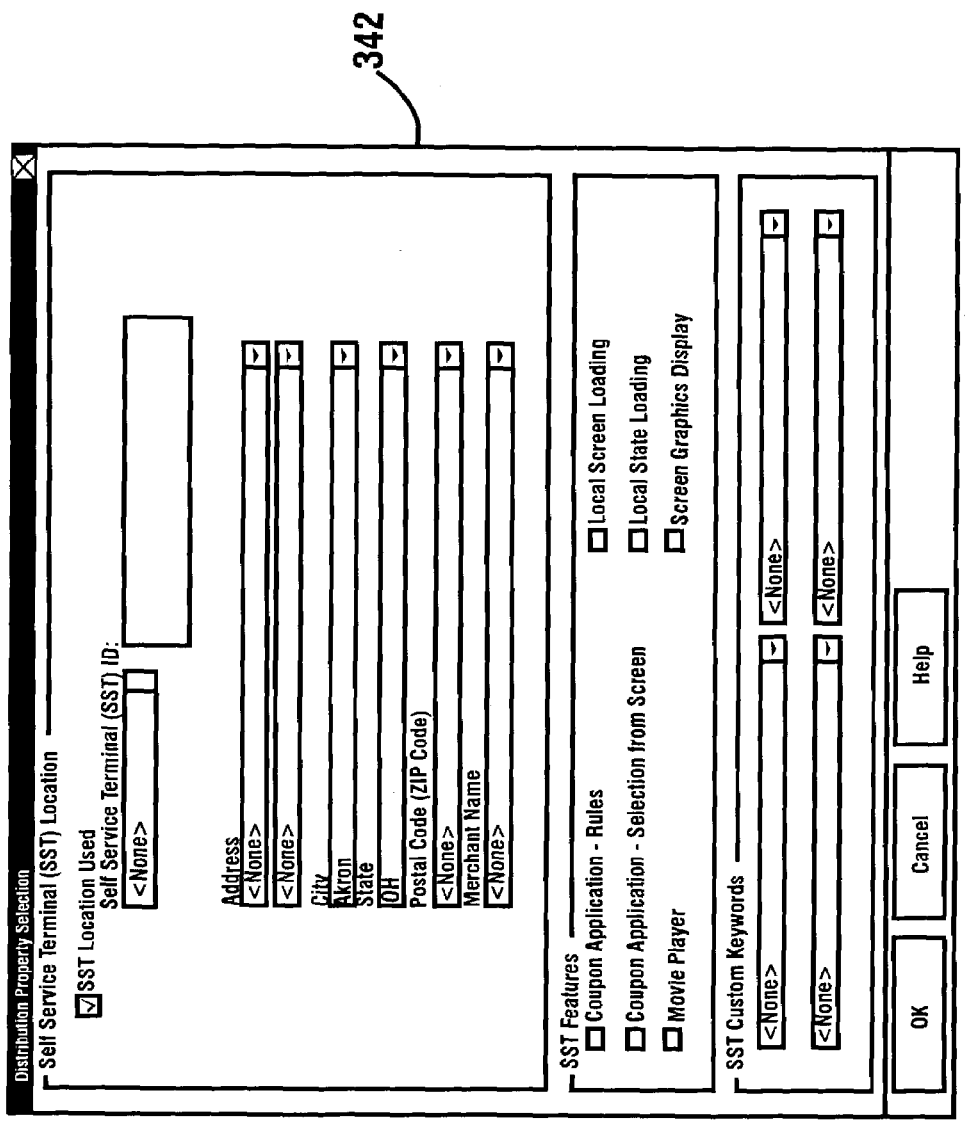

Selecting a particular distribution list name from screen 336 causes a group properties screen 340 to be displayed. Screen 340 is shown in greater detail in FIG. 36. Screen 340 enables an operator to selectively include and exclude ATMs in a group. This is done based on selection criteria such as machine properties and configuration data which an operator may input from the screen 340. By selecting appropriate icons the user is enabled to review terminals that are included in any group. This is done by the system causing a screen 342 to be displayed. Screen 342 is shown in greater detail in FIG. 37. The user is also enabled to edit the information concerning the particular terminal in screen 342. In addition to editing information, the user is further enabled to define listings of key words that are associated with a particular terminal. By associating these particular key words with a given terminal, a user is enabled to locate terminals having particular properties more readily through use of the system. In addition, it should be further understood that in this exemplary embodiment if a screen is structured so that a user is enabled to modify data such as terminal information in a particular screen, modifications within one screen will cause the system to modify the data that is displayed in other screens associated with the terminal. This enables the user to change associated records by making a single change in a particular screen.

Figure 38:
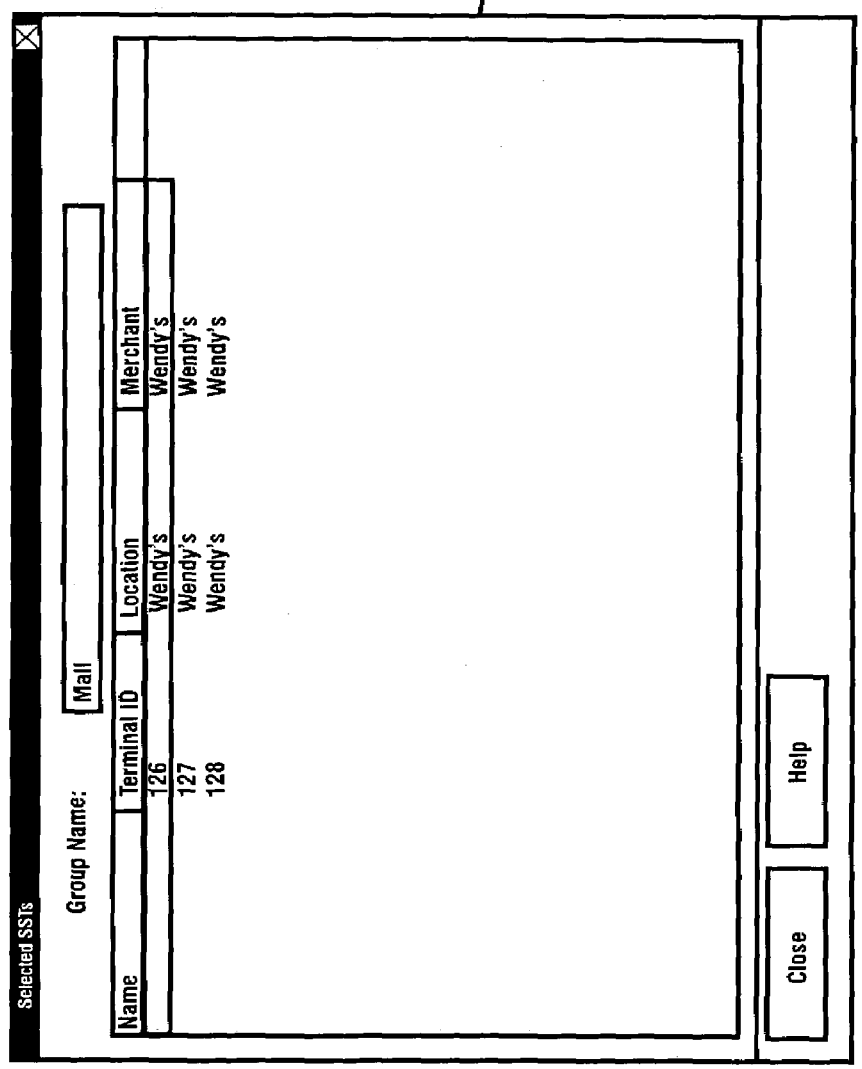

From the distribution group property screen 340, an operator is further enabled to view a listing of selected terminals which is presented in a screen 344. Screen 344 is shown in greater detail in FIG. 38. Screen 344 displays a listing of the particular information which corresponds to the terminals which make up a particular group. This enables the user to more readily review the ATMs or other transaction terminals which make up the set of terminals which display selected promotional campaigns.

There are at least two types of campaigns which may be presented to users at ATMs in the exemplary embodiment. One type of campaign may involve presentations which are intended to be targeted to a particular user based on information that is stored in connection with the marketing server concerning the particular user. Such targeted campaigns may include a sequence of presentations presented in a particular order to the user on successive visits to an ATM connected to the system. Such presentations are output to the user through operation of the 1:1 agent as previously discussed. Another type of campaign is one that involves presentations to all users of the ATM or categories of users who conduct transactions at the ATM. These campaigns include presentations that are not resolved as specifically appropriate for the current user of the machine. In the exemplary embodiment, to carry out either type of campaign the presentations associated with the campaign must be loaded into a local data store associated with a computer that runs in or adjacent to the ATM. In many embodiments the local data store used to store the software programs which run the ATM is also suitable for storing presentation materials. Increased storage capabilities may be achieved by applying data compression techniques to presentation materials such as LZW compression. In alternative embodiments other local data stores and storage techniques may be used.

The loading of presentations which comprise campaigns is done by an operator operating the exemplary form of the iq® ESD system by selecting icon 272 in the main screen 266. This causes the system to display a campaign creation screen 346. The campaign creation screen is shown in greater detail in FIG. 39. Screen 346 shows the campaign name, description, the group associated with the campaign, the current status, and the authorized operator or other entity identification associated with the campaign. By selection of appropriate icons in the screen 346, the user is enabled to add, edit or delete campaigns.

If in reviewing the current campaigns in screen 346 shown in FIG. 39, an operator wishes to discard a current campaign, such as to replace it with a new one, the operator is enabled to select an icon to send a campaign to a "waste basket." From the screen 346 the user is enabled to access a waste basket screen 347. Screen 347 shows the campaigns which have been discarded to the waste basket. If an operator wishes to resurrect the campaign from the waste basket, either in its original form or for modification, they may do so by selecting the appropriate icons in screen 347. As a result, the exemplary embodiment of the present invention provides for preserving campaigns which have been discarded. This may prove valuable not only for reinstating campaigns which are desirable, but also for evaluating performance of campaigns. The content of prior campaigns can be reviewed and compared to current campaigns for purposes of evaluating differences and customer acceptance.

Assuming that an operator makes a selection to add a campaign from screen 346, the system causes a screen 348 to be displayed. Screen 348 which is shown in greater detail in FIG. 40 prompts the user to provide a name for the campaign as well as a description. The user is also provided with distribution lists of the ATM groups to which the campaign may be distributed. The existing distribution list corresponding to the distribution list data from screen 336 is displayed. The operator is also provided with the option of creating a new distribution list in screen 348.

In addition to designating the particular campaign and group to which it is distributed, the operator also defines the particular marketing package that they are going to distribute. This is accomplished by the user following the logic for data entry presented by the system. For example, from screen 346 or 348 the user may access a screen 350. Screen 350 is a create marketing package screen, which is shown in greater detail in FIG. 41. Screen 350 enables a user to select icons 352, 354, 356, 358, 360 and 362. These icons enable a user to select the particular components which will be included in the presentation materials that are delivered to the ATMs that will have the capability to carry out the campaign. Selection of the icons from screen 350 also enables the operator to set up the local state and screen configurations for selected terminals. This capability enables the inclusion of states and screens in the logic flow which enables an ESD agent and/or a 1:1 agent to deliver or output the presentation materials.

Figure 42:
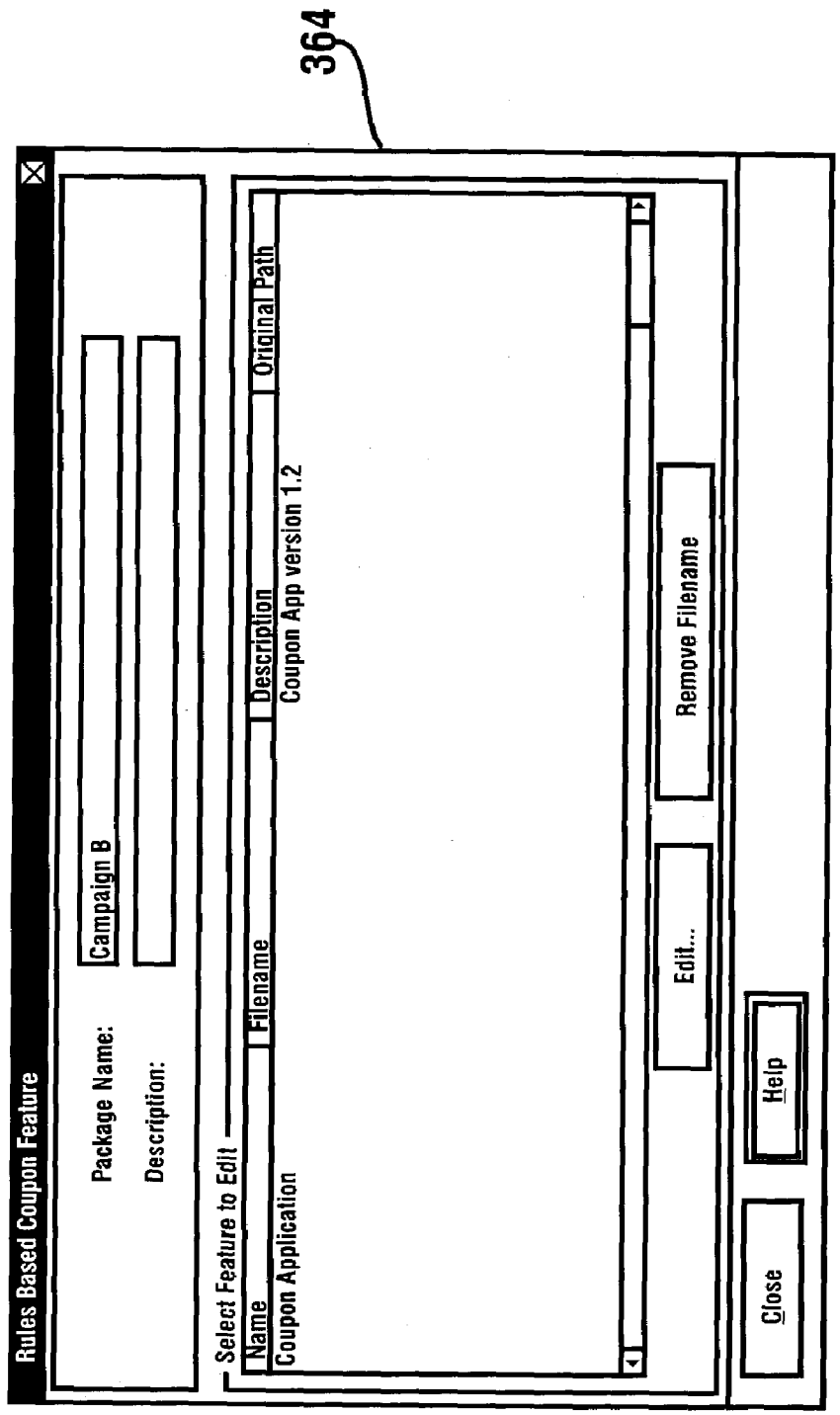
Figure 43:
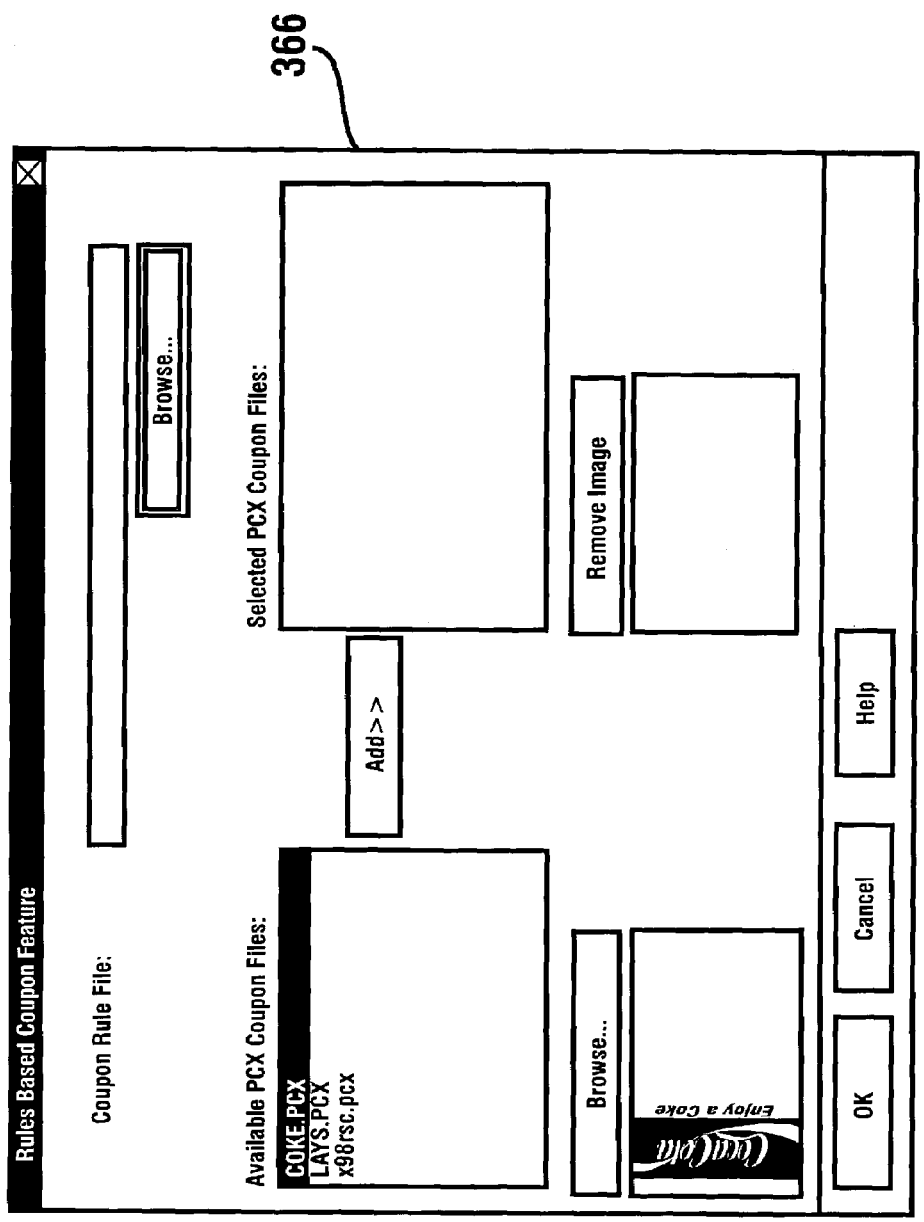

For example, from screen 350, selection of the icon 352 causes a screen 364 to be presented. Screen 364 which is shown in greater detail in FIG. 42 lists the coupon applications that are available to be sent to the ATMs to provide coupons to a user. Selection of icon 354 in screen 350 causes a screen 366 to be displayed. Screen 366, which is shown in greater detail in FIG. 43, shows the available coupons. By selecting icons in screen 366, the user is enabled to add the particular coupons to the campaign being developed. A further useful aspect of the configuration of this exemplary embodiment is that the user is enabled to view the particular coupon layout as they are selecting it to add to the presentation materials which comprise the campaign.

Figure 44:
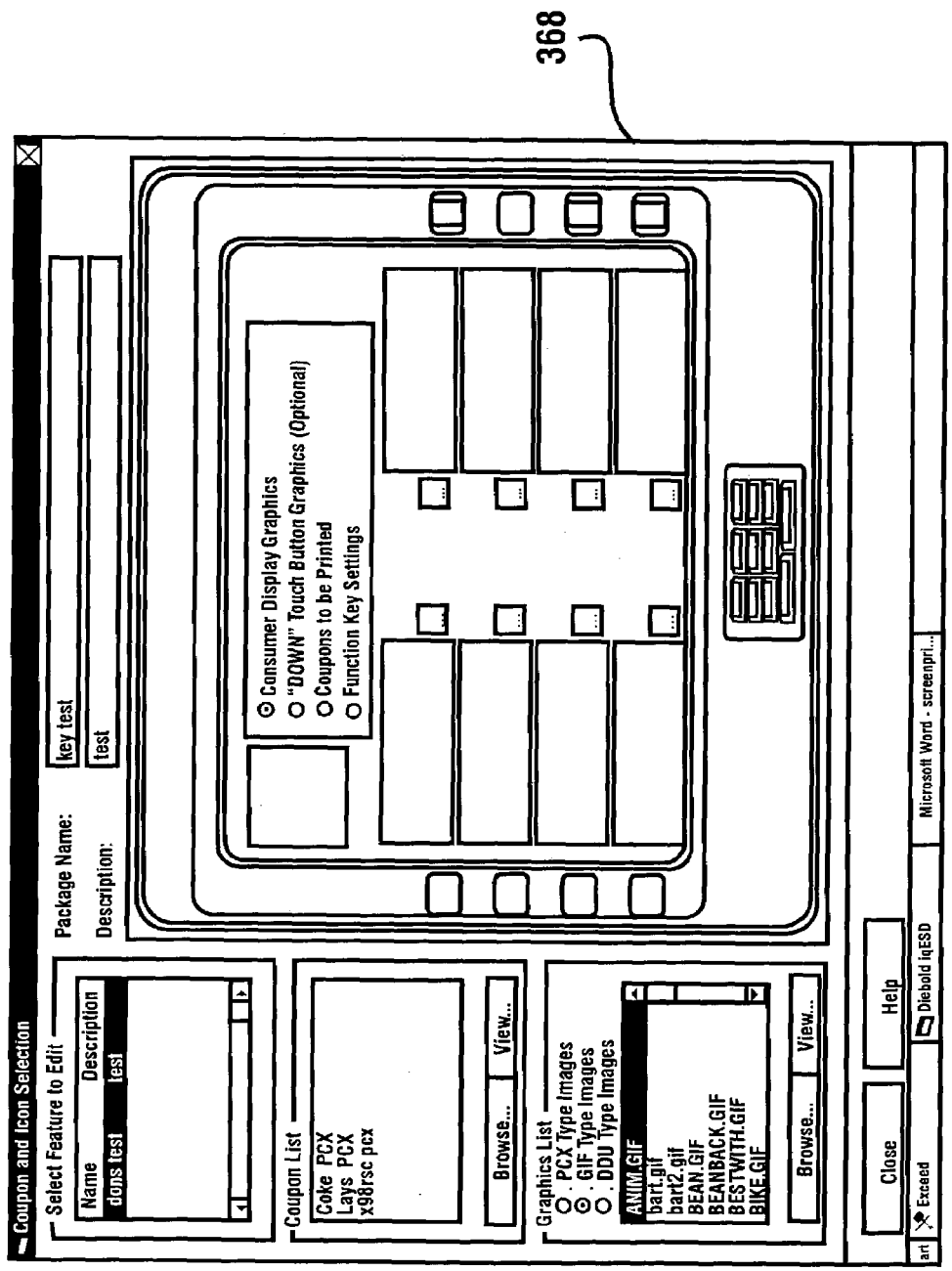

As can be appreciated from screen 366, the user is enabled to exit and display a further screen 368, which is shown in detail in FIG. 44. Screen 348 includes a graphical representation simulating the user interface of a particular type of ATM through which presentations will be output. This representation enables an operator to graphically set up the screen characteristics for the icons and graphics to be presented in a coupon presentation. The operator is enabled to set additional display features, including the different types of coupons a user is enabled to print. In addition, the operator is enabled to select which input buttons will be operative when the particular screen associated with the presentation is output. From screen 368 the operator is enabled to select from a variety of images and graphics which may be presented to a user as part of the campaign.

Figure 45:
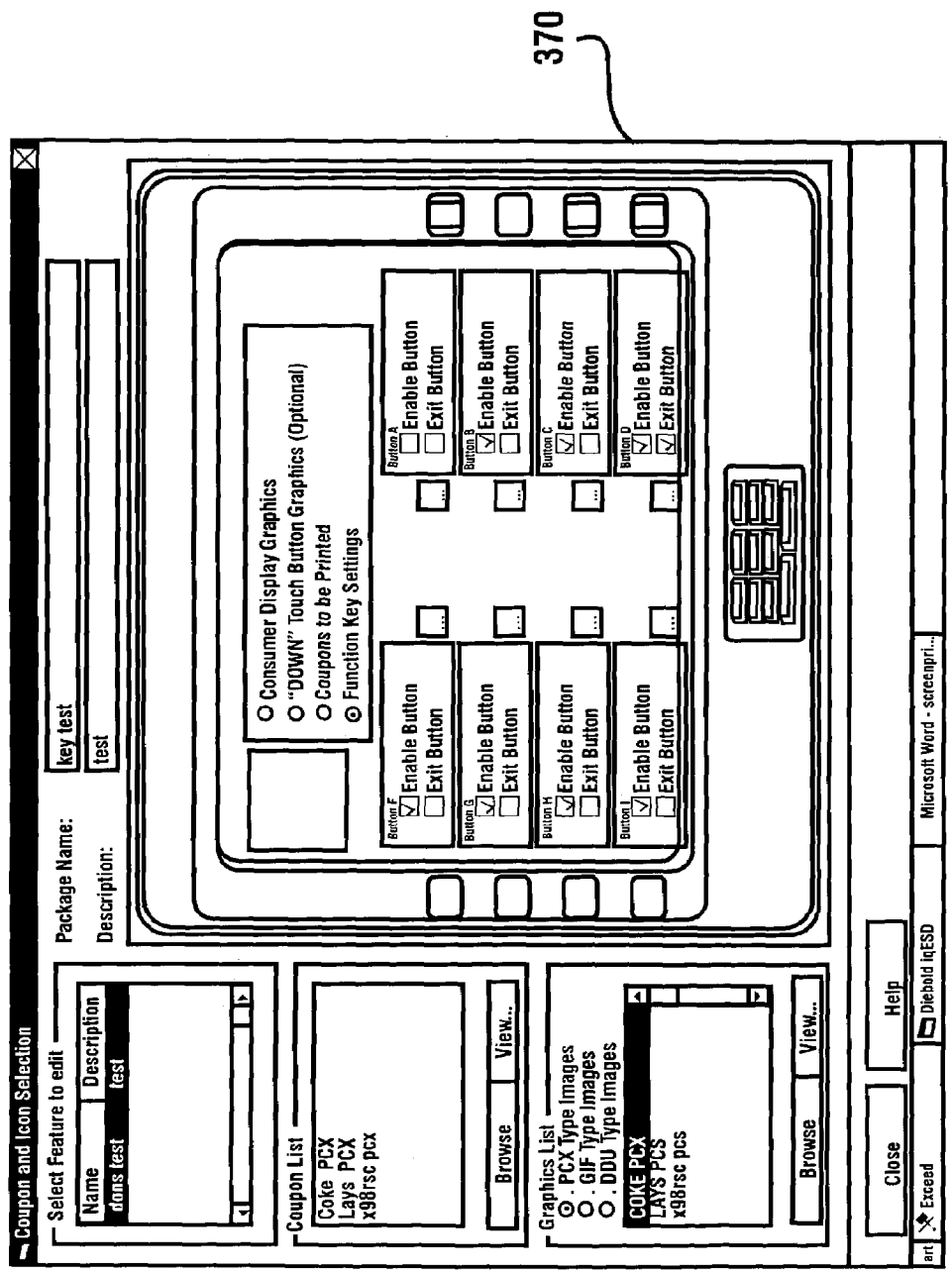
Figure 46:
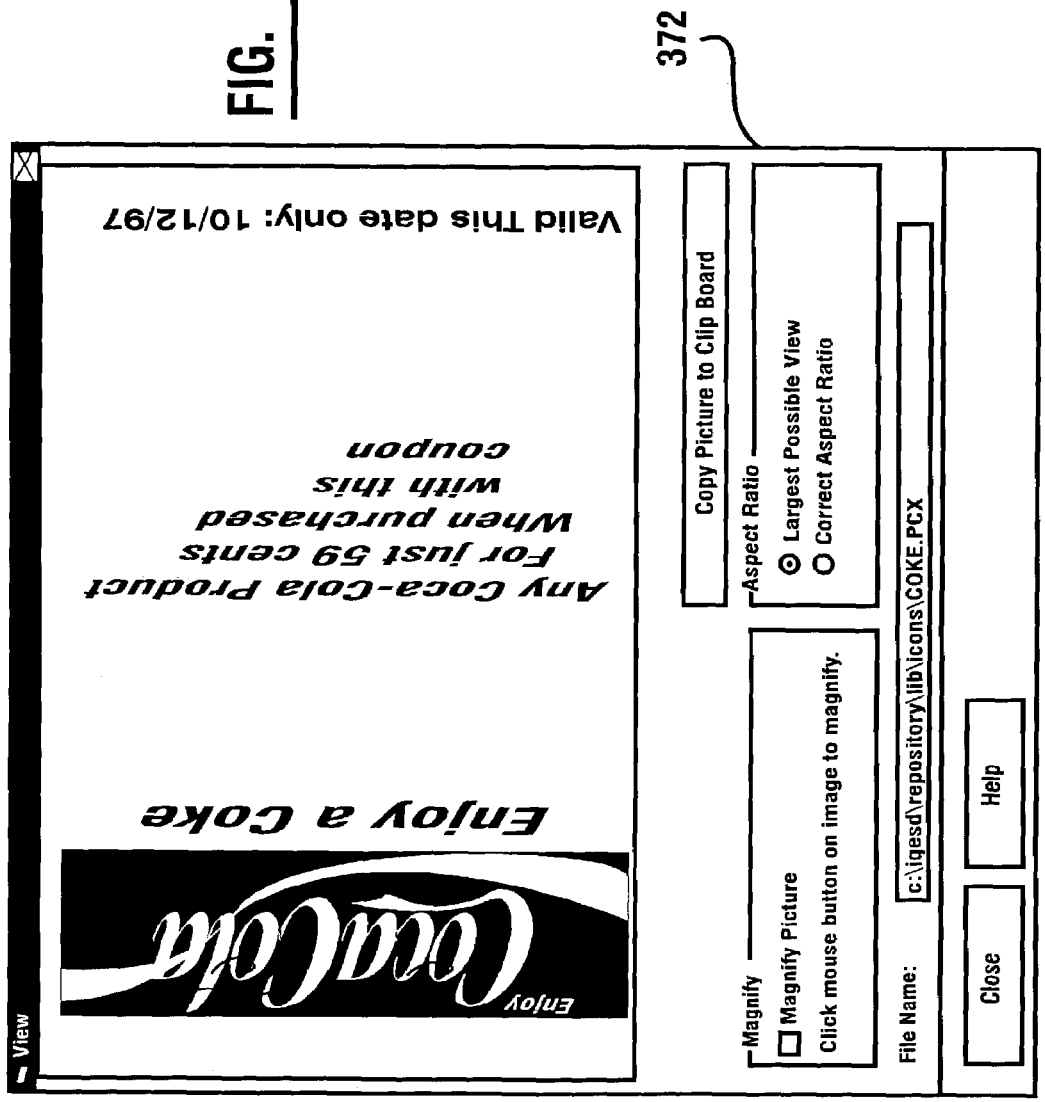

As an operator makes selections in screen 368, the system of the exemplary embodiment is operative to enable the operator to set parameters for the displays. For example, as shown in FIG. 45, a screen 370 is presented which is a modified form of screen 368. In screen 370 a user is enabled to determine the operation of the function buttons that are adjacent to the ATM screen on the particular type of user interface on ATMs that will present the campaign. This includes, for example, enabling the operator to select which buttons will be operative to perform a function as well as which buttons the customer may operate to move from the particular screen to a next screen. From screen 368, the operator is enabled by selecting items in the coupon list, to view a graphics showing the coupons that will be presented. An example of a displayed discount coupon for a beverage is shown in screen 372 shown in FIG. 46. This enables the operator to view the coupons, graphics, icons and other materials that will be used as part of the campaign.

Figure 41:
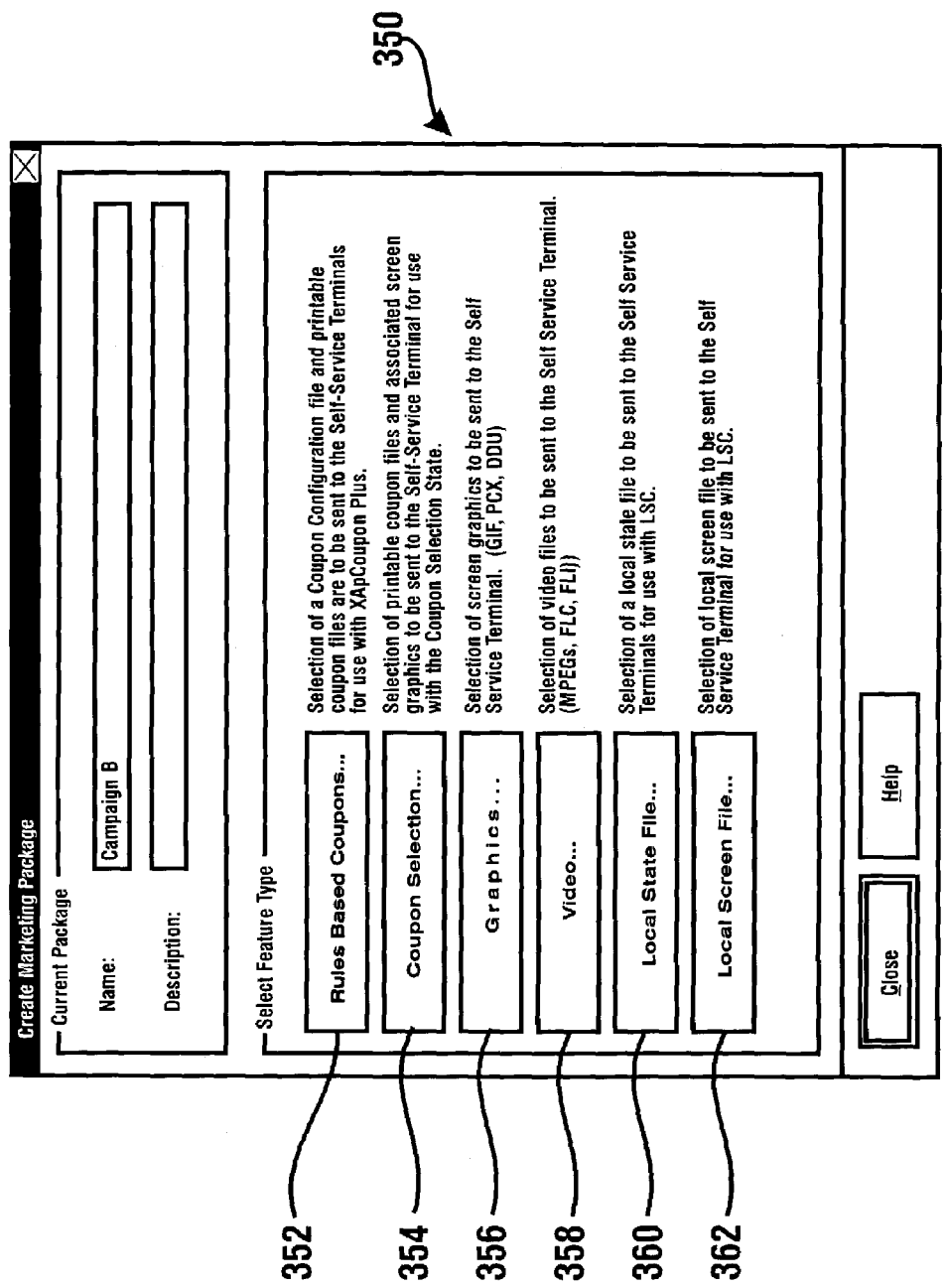
Figure 47:
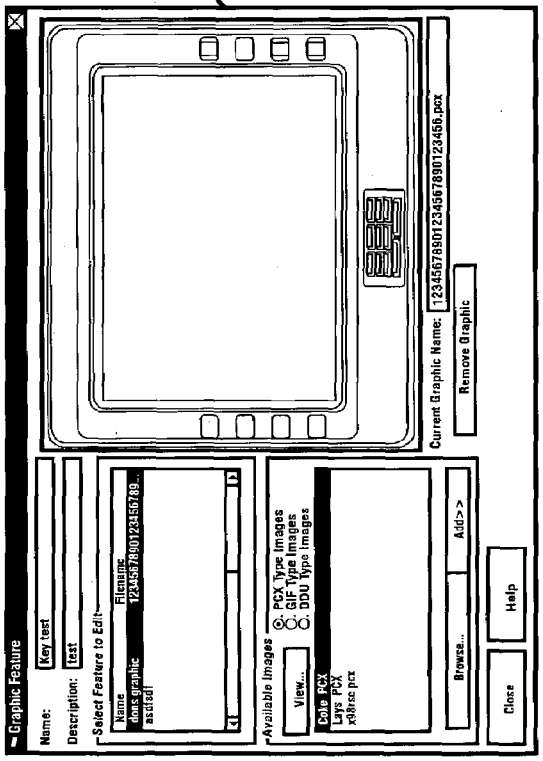

By selecting icon 356 from screen 350 shown in FIG. 41, an operator is enabled to display a screen 374 shown in greater detail in FIG. 47. Screen 374 enables the operator to display selected graphic presentations as part of the campaign. In addition, from screen 374, the exemplary system enables the operator to view graphics which are available in the computer or in connected computers being used to provide presentations which will be part of the campaign. Viewing the available graphics facilitates making the decision on whether to add them to the campaign. By selecting screen graphics in screen 374, the operator determines which graphics will be included in the presentation materials downloaded to the self-service terminals.

Figure 48:
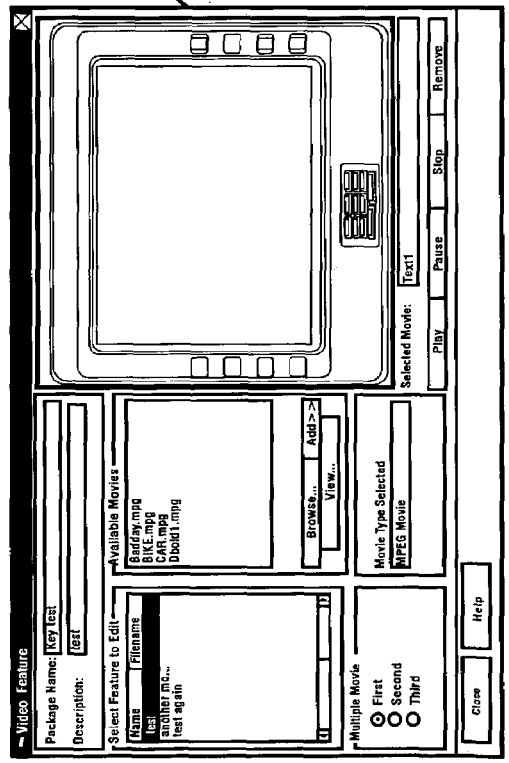
Figure 49:
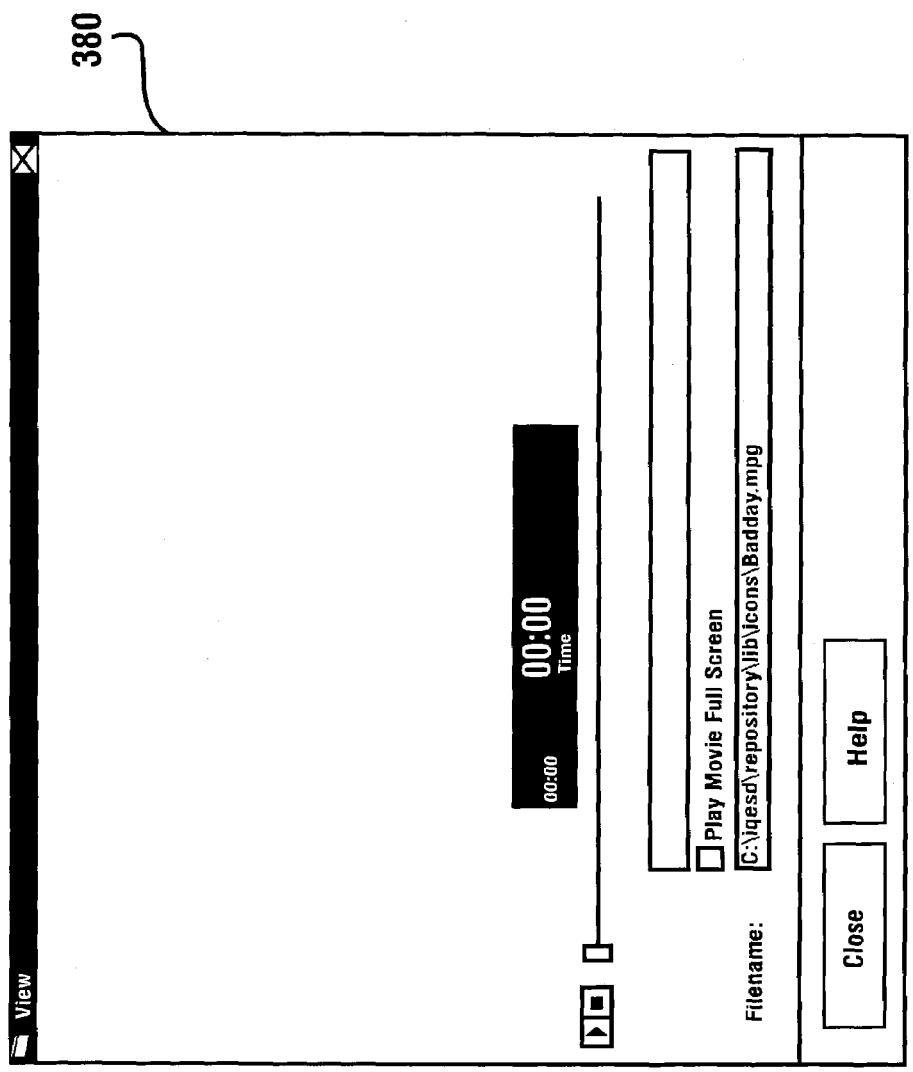

Selection of icon 358 in screen 350 causes the system of the exemplary embodiment to display a screen 376. Screen 376 which is shown in greater detail in FIG. 48 enables the operator of the system to select presentations which include video files and to include these presentations as part of the campaign. The operator from screen 376 is enabled to review available video files and to select them for purposes of inclusion in the campaign. The operator's decision to include a video file in response to the options in screen 76 will result in that particular file being downloaded to the ATMs as part of the presentation materials through operation of the computer. When making selections from the screen 376, including by selecting the "play" icon, an operator is enabled to display the video that they are considering adding to their campaign. This is done in the exemplary embodiment through a screen 380 which is shown in FIG. 49. Screen 380 includes a timer which enables the operator to evaluate the video for proper length. In addition, by manipulating the icons shown in FIG. 376 the operator is enabled to effectively edit the presentations so as to tailor them to the particular campaign desired.

Figure 50:
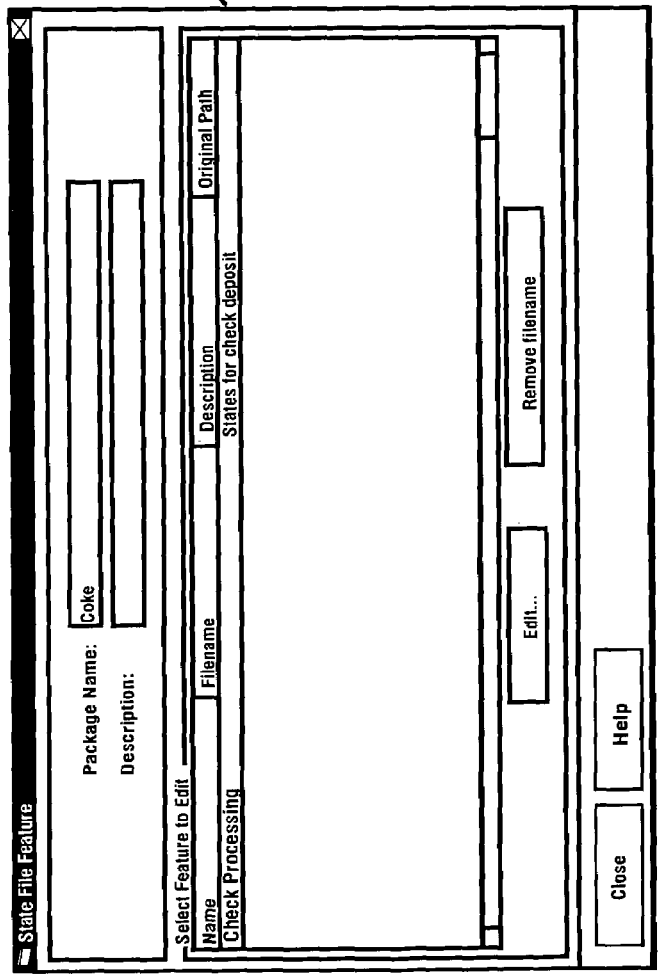
Figure 51:
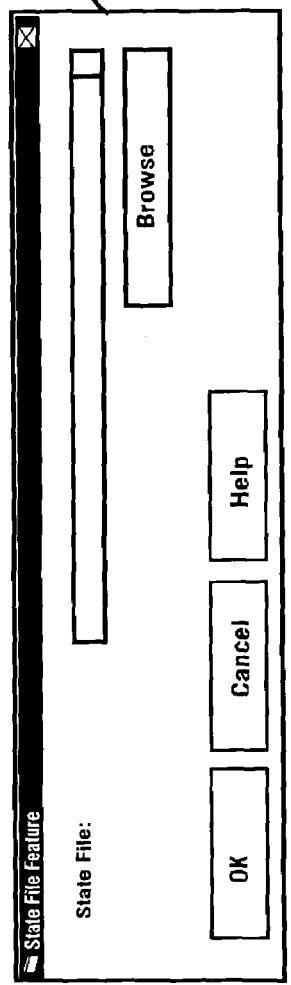

By selecting icon 360 in screen 350 shown in FIG. 41, an operator is enabled to display a screen 382 which enables the user to configure a local state on the ATM to enable presenting the particular campaign. Screen 382 is shown in detail in FIG. 50. Screen 382 shows the states which are available to be configured into the logic flow so that the presentations associated with the campaign can be appropriately presented. Screen 382 shows, for example, the local states associated with a particular function carried out by the ATM. This state information is indicative of the particular operations being performed by the ATM during which there may be opportunities to present promotional presentations associated with a campaign. State information may also include special states of the type previously discussed which are used in connection with selecting or presenting presentations. The user selects one of these groups of states from screen 382, which causes a state file feature screen 384, which is shown in FIG. 51, to be displayed. The state file feature screen enables a user to select the particular local states that are to be added to enable the ATM to present the marketing presentation materials in the manner desired by the operator.

Figure 52:
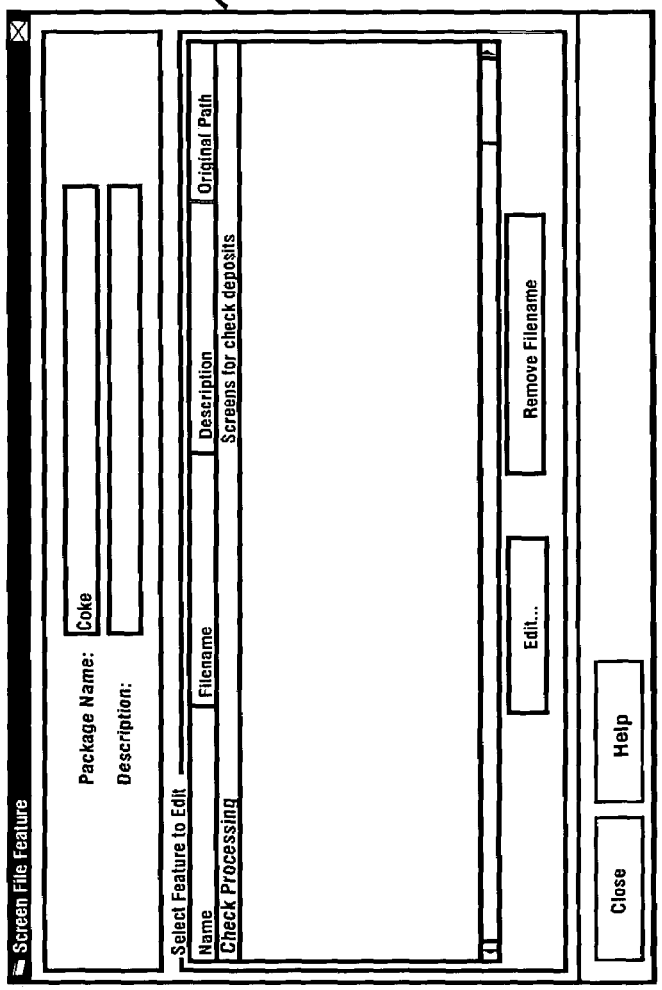
Figure 53:
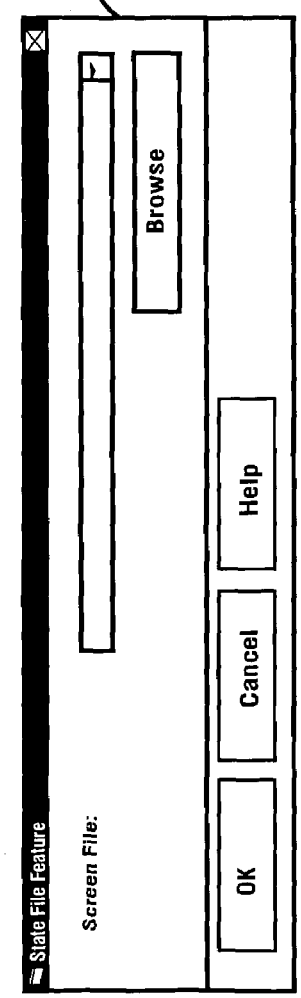

By selecting icon 362 in screen 350 shown in FIG. 41, a user is enabled to select local screens to be presented at the particular ATM. Selection of icon 362 causes a screen 386 to be presented in the exemplary embodiment. Screen 386 is shown in greater detail in FIG. 52. Screen 386 enables the operator to select the local screen files which will be modified or otherwise included on the ATM to enable the ATM to deliver the presentation materials associated with the campaign. By selecting particular screen files from screen 386, the system causes a screen 388 shown in FIG. 53 to be displayed. Screen 388 enables the operator to select a particular local screen file to be included in the ATMs on which the campaign is to be presented. This activity may include for example configuring the terminal so that a particular presentation is output in place of a "please wait" screen while the terminal executes the steps associated with a particular state.

It should be understood that while in the described embodiment, local state and screen files may be downloaded to or configured in the ATMs to accommodate particular marketing campaigns, in alternative embodiments an agent or other software may operate to provide presentations without the provision of special local states and screens. This may be done, for example, as previously described by the agent opening and closing graphic windows overlying or underlying the standard screens. In addition, presentations may be output using other approaches such as the use of framing, screen within a screen, presentation of contrasting colors for overlaid screens, or other appropriate approaches for the particular campaign to enable the presentation materials to be presented to a user while not interfering with the financial transaction authorization functions of the ATM. Other types of outputs such as audio outputs may also be included in presentations in some embodiments. Such audio presentations may or may not be accompanied by corresponding graphical outputs. Numerous types of presentations may be provided through use of the present invention depending on the output and input capabilities of the terminals at which presentations are made.

Figure 55:
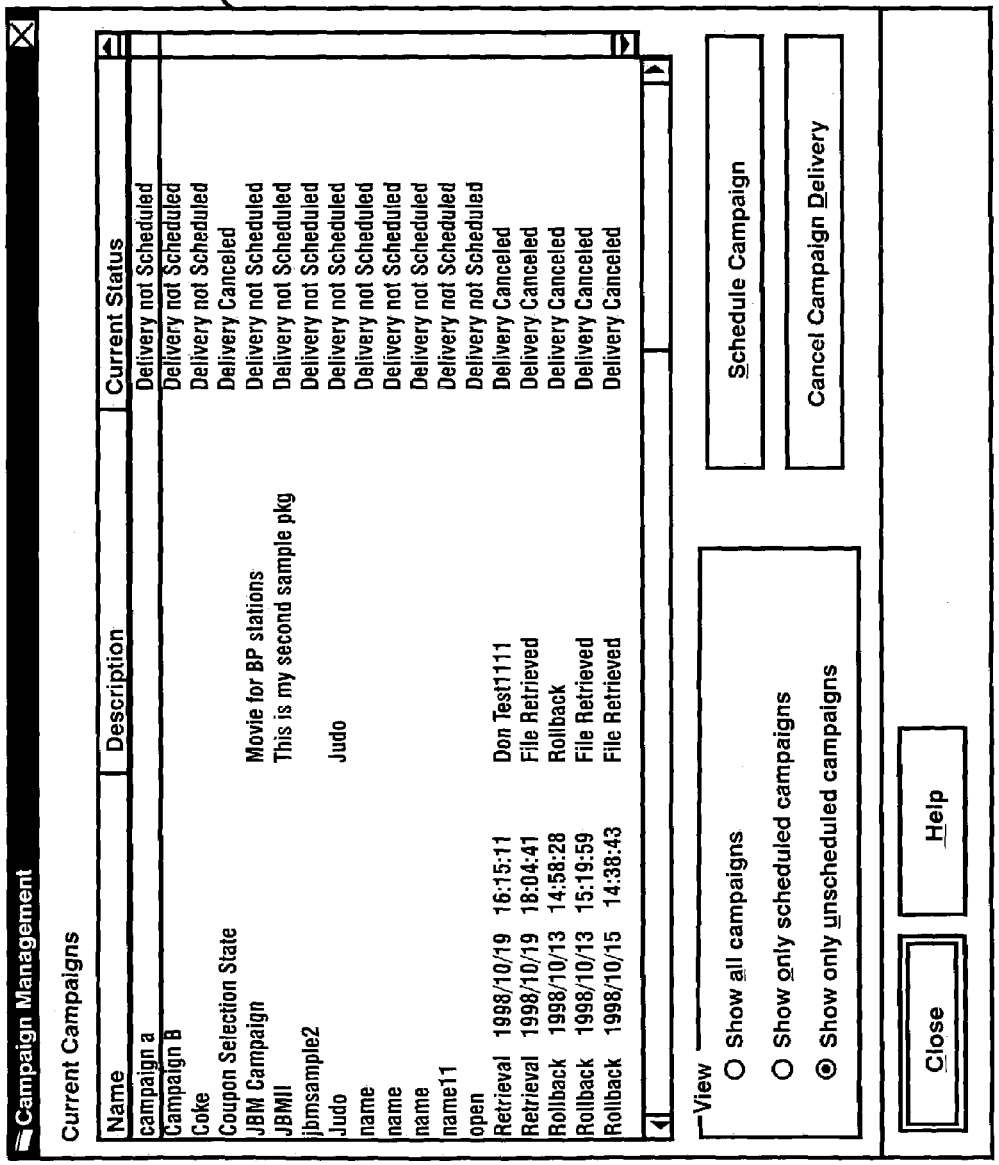

From the main screen 266 a user is enabled to schedule availability of campaigns by selecting an icon 274. Selection of icon 274 causes a screen 390 to be displayed. Screen 390 is shown in greater detail in FIG. 55. Screen 390 displays the campaigns, their descriptions and their current status. The current status includes information as to whether the presentation materials, which must be loaded on to the ATM associated with the campaign, have been delivered to the ATMs as well as whether the presentation has been activated so that the campaigns are actually being presented. Current status may include information reflecting that a campaign exists, but that its delivery and activation have not been scheduled. Likewise, a status may indicate that delivery of a particular campaign has been canceled. By selecting icons in screen 390 an operator of the system is enabled to schedule delivery of a selected campaign or to cancel such delivery.

Figure 56:
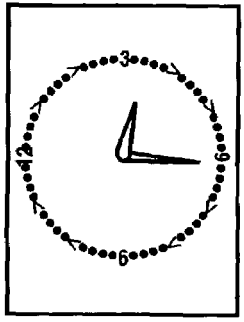

If an operator selects the appropriate icon to schedule a campaign from screen 390, the system causes a screen 392 to be displayed to a user. Screen 392 which is shown in greater detail in FIG. 56 enables a user to specify the time and date that the presentation materials are to be delivered to the ESD agents or other loading software associated with the ATMs on which the campaign is to be run. As will be appreciated, a campaign cannot be presented to users until the presentation materials are delivered. Often the operator will wish to schedule the delivery of presentation materials during off hours, particularly in those situations where a loading of such materials into memory will necessitate taking the ATM out of service for a period of time.

As also shown in Screen 392, the user is enabled to set the time when the campaign is to be activated. The operator is enabled to set this time based on the time locally where the server is located, or alternatively if the ATM (SST) is located in a different time zone, to schedule activation in accordance with a local time where the ATM is located. This may be useful, for example, where campaigns must start and end on a particular day and it would be undesirable to have a campaign activated early or late because the ATM is located in a different time zone from the market message server.

When the operator schedules delivery of a campaign, the operator is enabled to view information concerning the delivery and activation of the campaign through a screen 394. Screen 394 which is shown in greater detail in FIG. 57, shows the campaign name as well as where the campaign will be delivered. This includes an indication of the group listing and the number of ATMs in the group. Screen 394 also indicates the current time at the server. The screen also indicates the time when the presentation materials are to be delivered as well as the time when the activation of the campaign will occur. For the operator's convenience the system also calculates the timed delivery and timed activation of the campaign. By the operator selecting the view SST list icon in screen 394, the operator is provided with a screen 396. Screen 396 shown in detail in FIG. 58, provides a listing of all the ATMs where the campaign will be available to be presented.

Figure 64:
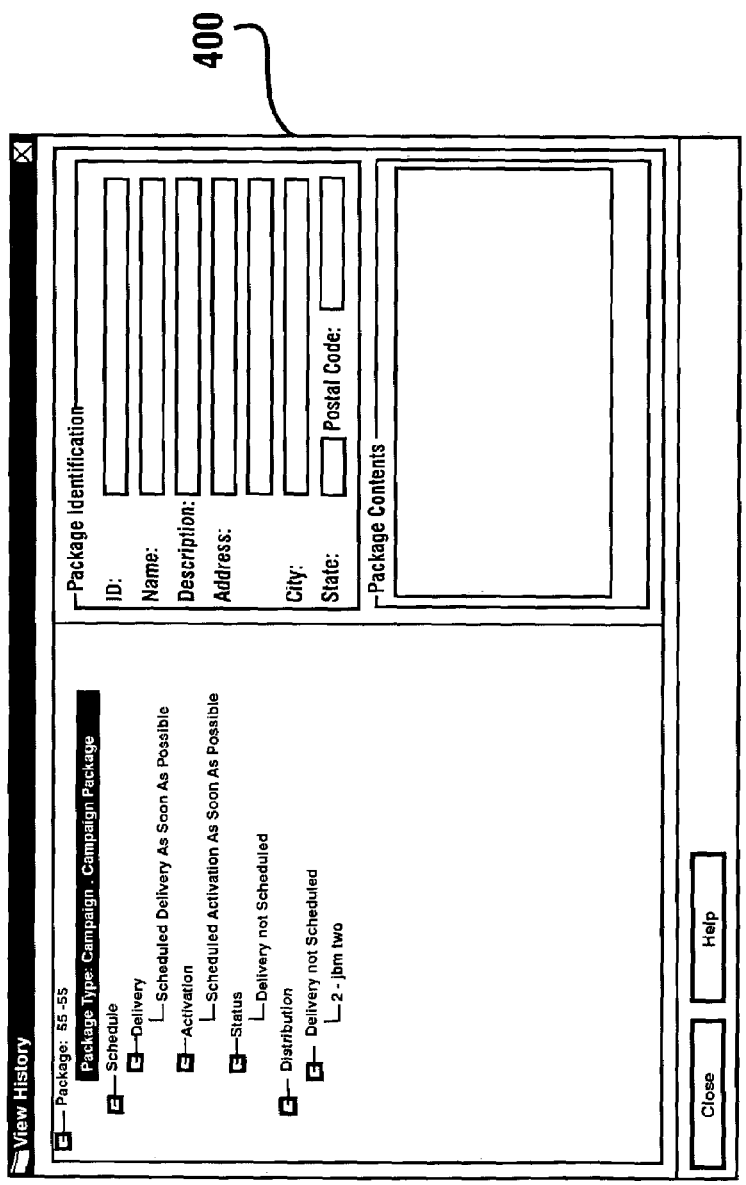

The exemplary embodiment of the system enables an operator to review history information concerning campaigns. This may be done from the main screen 266 shown in FIG. 33 by selecting icon 280. In response the system causes a history screen 398 to be displayed. History screen 398 which is shown in greater detail in FIG. 63, provides the operator with a history of the campaigns. From the history screen, the operator is enabled to cancel campaigns or to send campaigns to the waste basket from which they may be later recovered as previously described. By selecting a view icon in screen 398, the system is operative to present a screen 400 which provides an operator with information concerning a selected campaign, which is selected by highlighting a particular campaign from the screen 398. Screen 400 is shown in detail in FIG. 64. Screen 400 provides a user with particular information concerning a given campaign.

Figure 33:
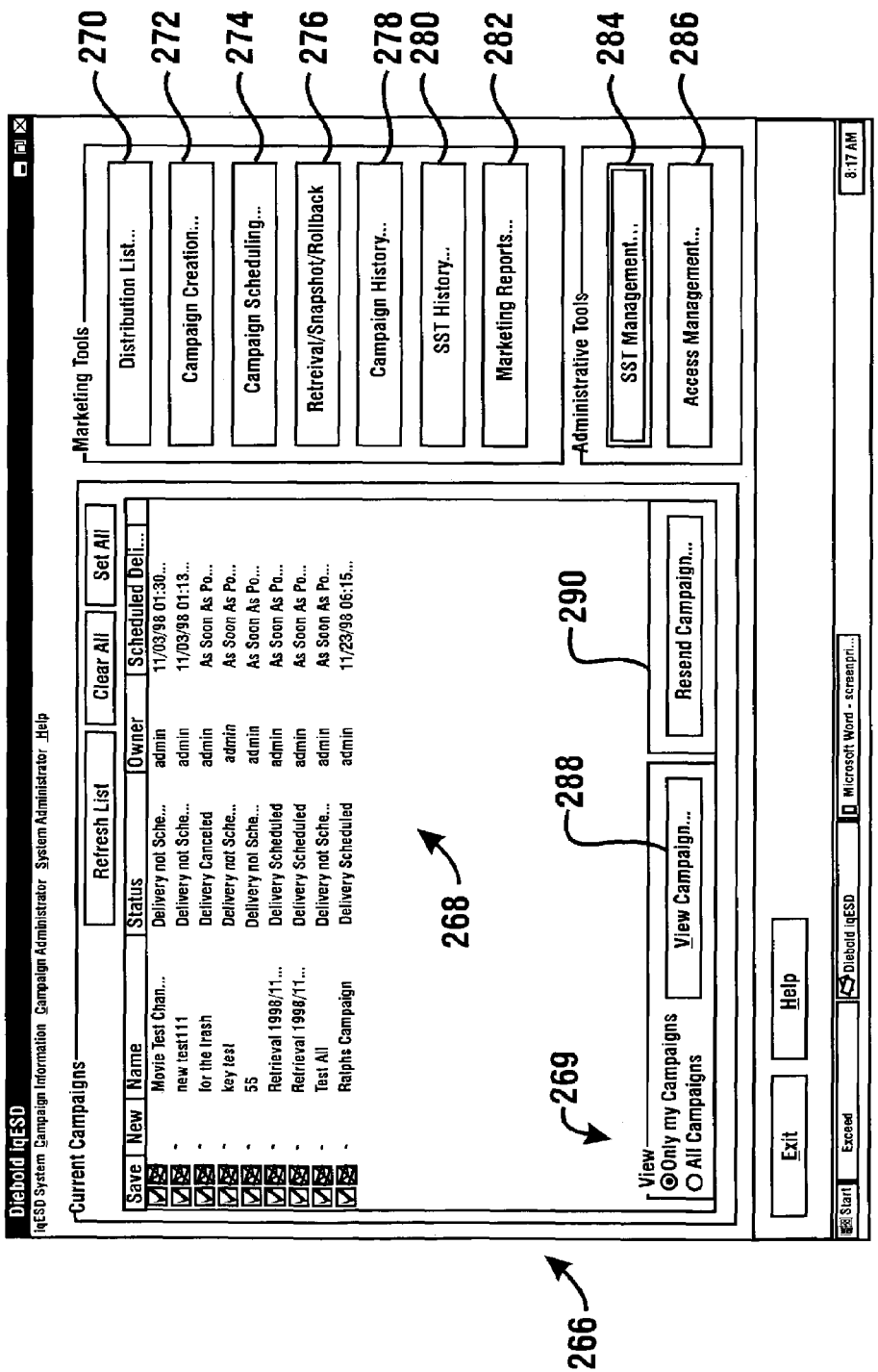
FIGS. 33 through 86 are exemplary screen displays representative of the operator interface presented in connection with developing, distributing, presenting and analyzing marketing campaigns and messages at ATMs, as well as the logic associated therewith.
Figure 66:
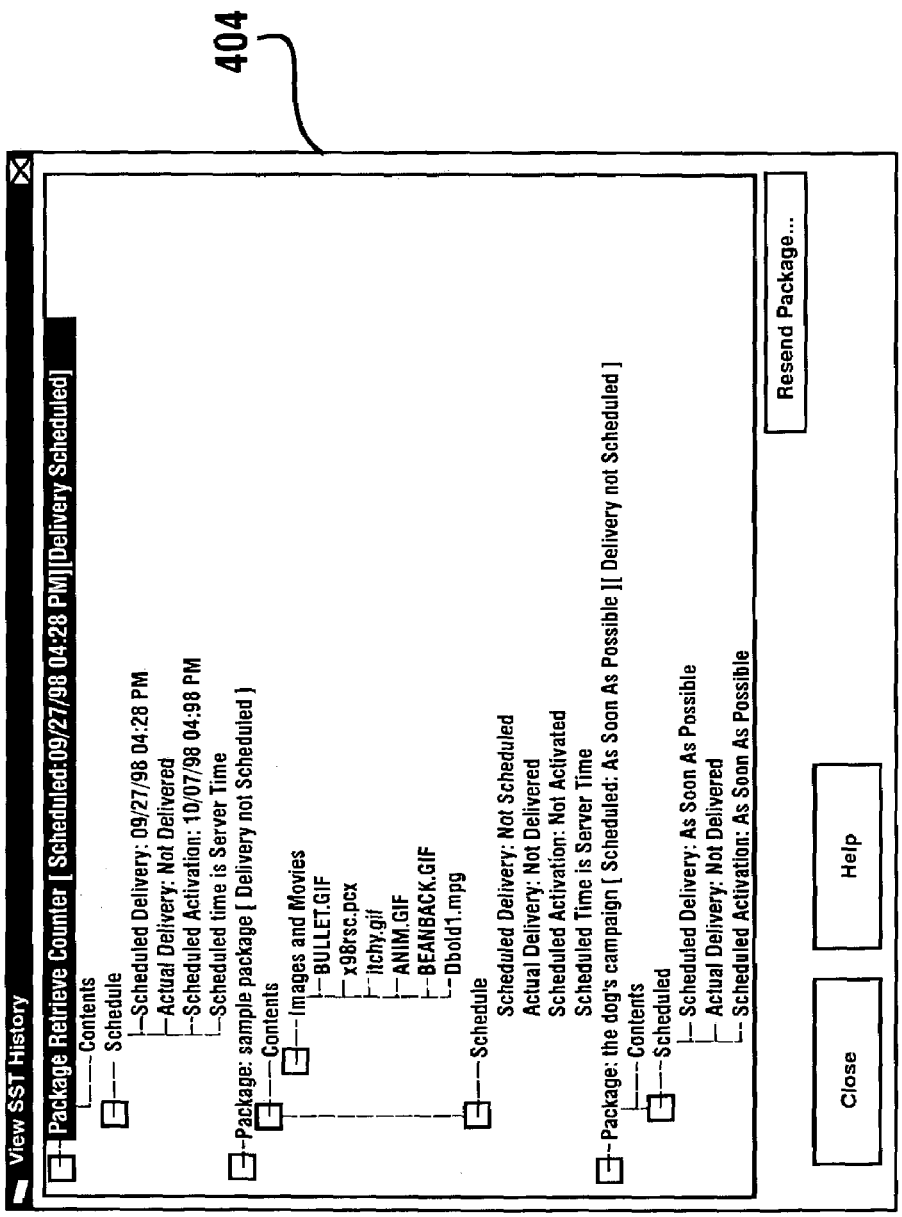

From the main screen 266 shown in FIG. 33, an operator is enabled to review the campaigns for which presentation materials have been stored at any particular ATM. This is accomplished by selecting icon 280 which causes a screen 402 to be displayed. Screen 402 shown in FIG. 65, provides a listing of the particular terminals. Screen 402 also provides the operator with information concerning when the last "snapshot," "rollback" and file retrieval was conducted for the particular terminal. By selecting icons from screen 402 the operator is enabled to view the distribution history of campaigns as well as to review other files which show results from the particular terminal. If a user elects to view the history of campaigns at the particular ATM, a screen 404 is presented. Screen 404 is shown in greater detail in FIG. 66. Screen 404 provides a graphical representation of the particular campaigns that have been delivered and activated on that particular ATM over time.

Figure 83:
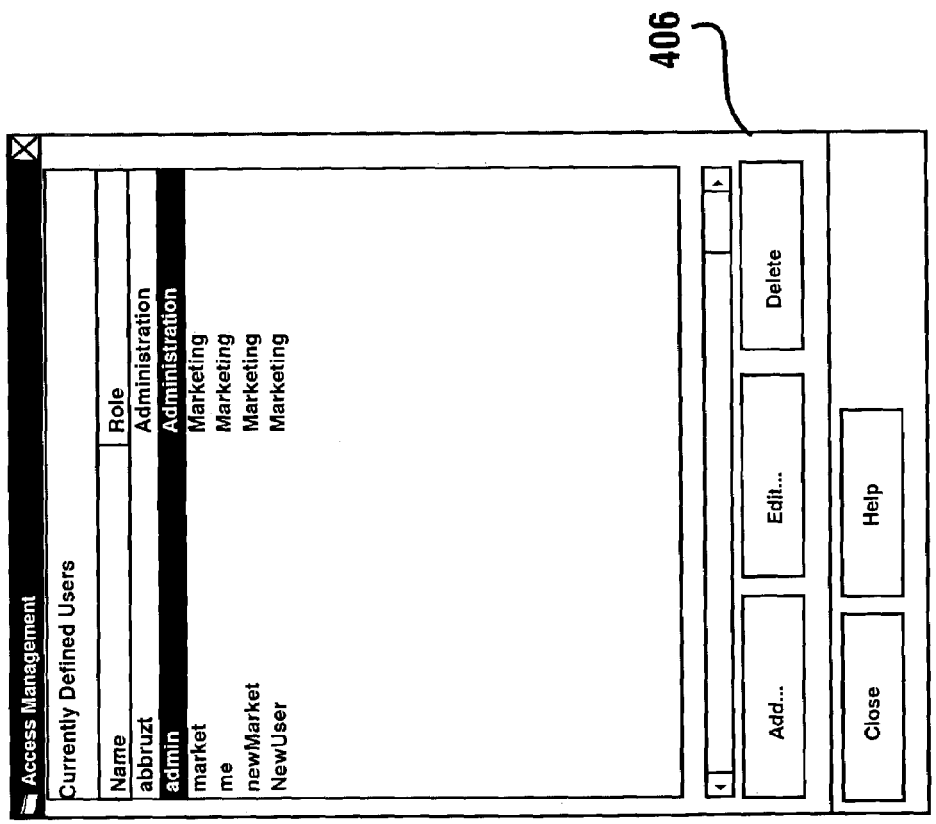
Figure 84:
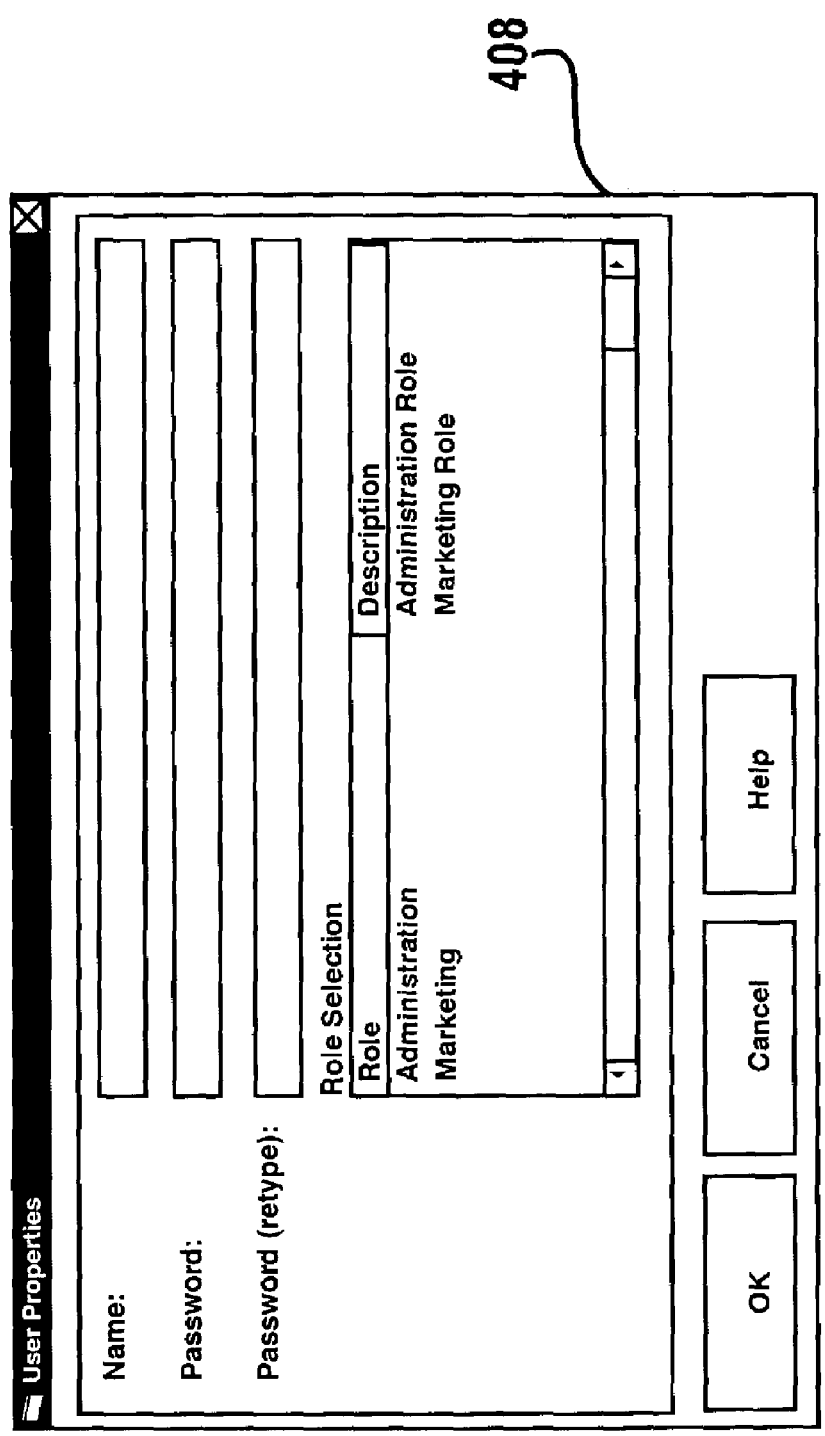

The operator of the system is enabled to establish rules for access by authorized operators of the software used to set up the marketing campaigns. This is accomplished from screen 266 shown in FIG. 33 by selection of icon 286. Selection of icon 286 causes a screen 406 to be displayed. Screen 406 which is shown in greater detail in FIG. 83 enables an authorized operator to review a listing of persons authorized to access the system. From screen 406 the operator is enabled to add and delete users from the system. The addition of authorized operators is accomplished in response to selection of an appropriate icon from screen 406 which causes a screen 408 to be displayed. Screen 408, which is shown in greater detail in FIG. 84, enables the administrator of the system to add new users as well as their passwords, and to define the limits of the activities that they are permitted to conduct using the system.

As previously discussed, in an exemplary embodiment an ESD agent resident on an ATM terminal may be configured to capture data related to the marketing campaigns and to return this data to the market message server for analysis. In embodiments of the invention, the ESD agent may be operative to accumulate data concerning customer reactions to marketing presentations such as the number and types of presentations made, and the number and types of coupons printed, and to periodically report this data in messages to the market message server. Alternatively, the ESD agent may be operative to report each activity and/or response which is received from a customer so that the market message server is relatively continuously updated concerning the effectiveness of marketing campaigns. The ESD agent may report activities other than those handled by the 1:1 agent or alternatively may be configured to report data related to all marketing activities.

Figure 67:
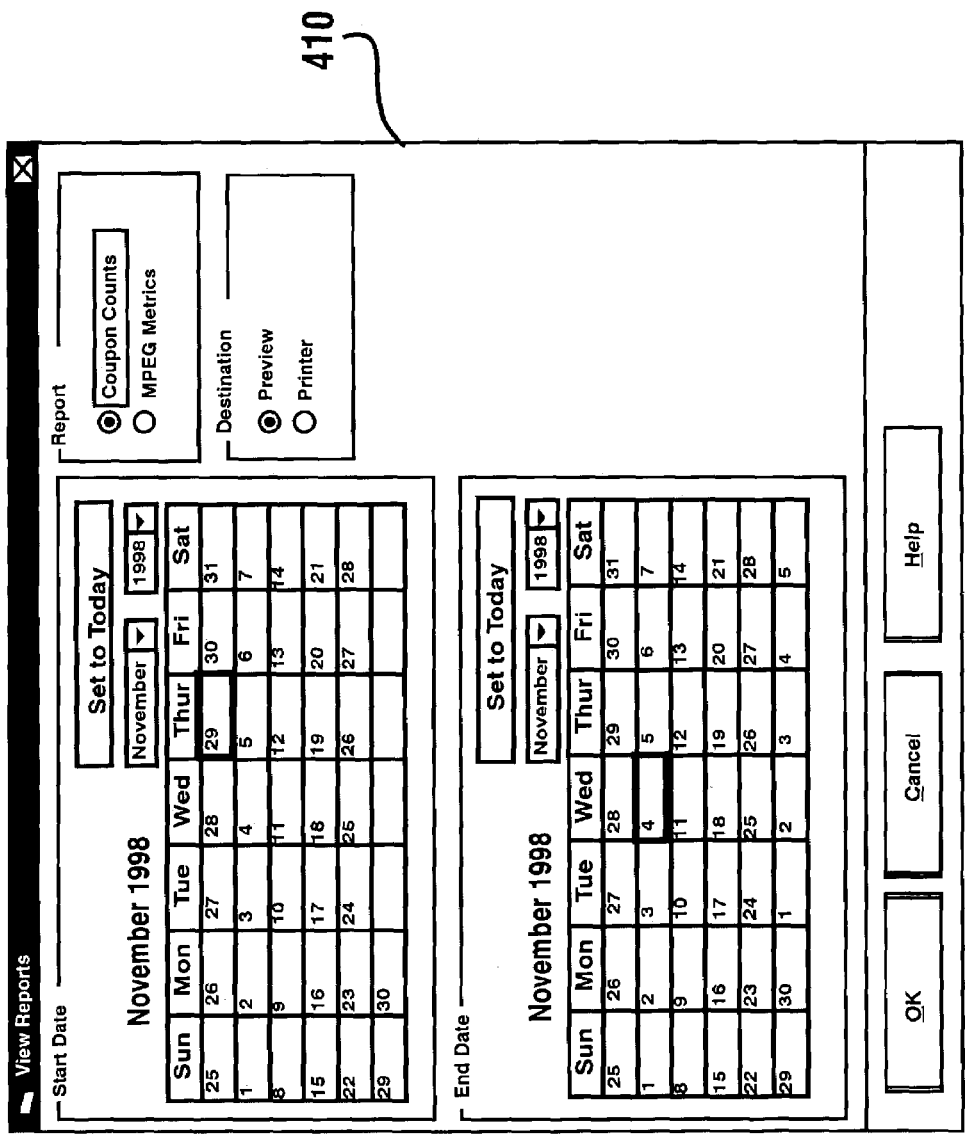

In the exemplary embodiment, from the main screen 266 shown in FIG. 33, the operator is enabled to obtain reports for time periods concerning the system. This is done by selecting on an icon 282 shown in FIG. 33. Selecting this icon in the exemplary embodiment causes a report screen 410 to be displayed. The report screen 410 is shown in greater detail in FIG. 67. The report screen enables a user to select a time period of interest as well as to select totals of interest to the operator. These may include, for example, information on the number and types of coupons that have been dispensed by the ATMs. Alternatively the report may include information on the number of presentations of videos or other promotional items that have been made to operators of ATMs within a selected time period. From screen 410 the operator may be presented with additional screens which enable further analysis of various parameters which are indicative of marketing presentations and efforts that have been made by the system. This information may be analyzed, printed, exported to other systems or otherwise used for purposes of analysis of the system operation.

Figure 59:
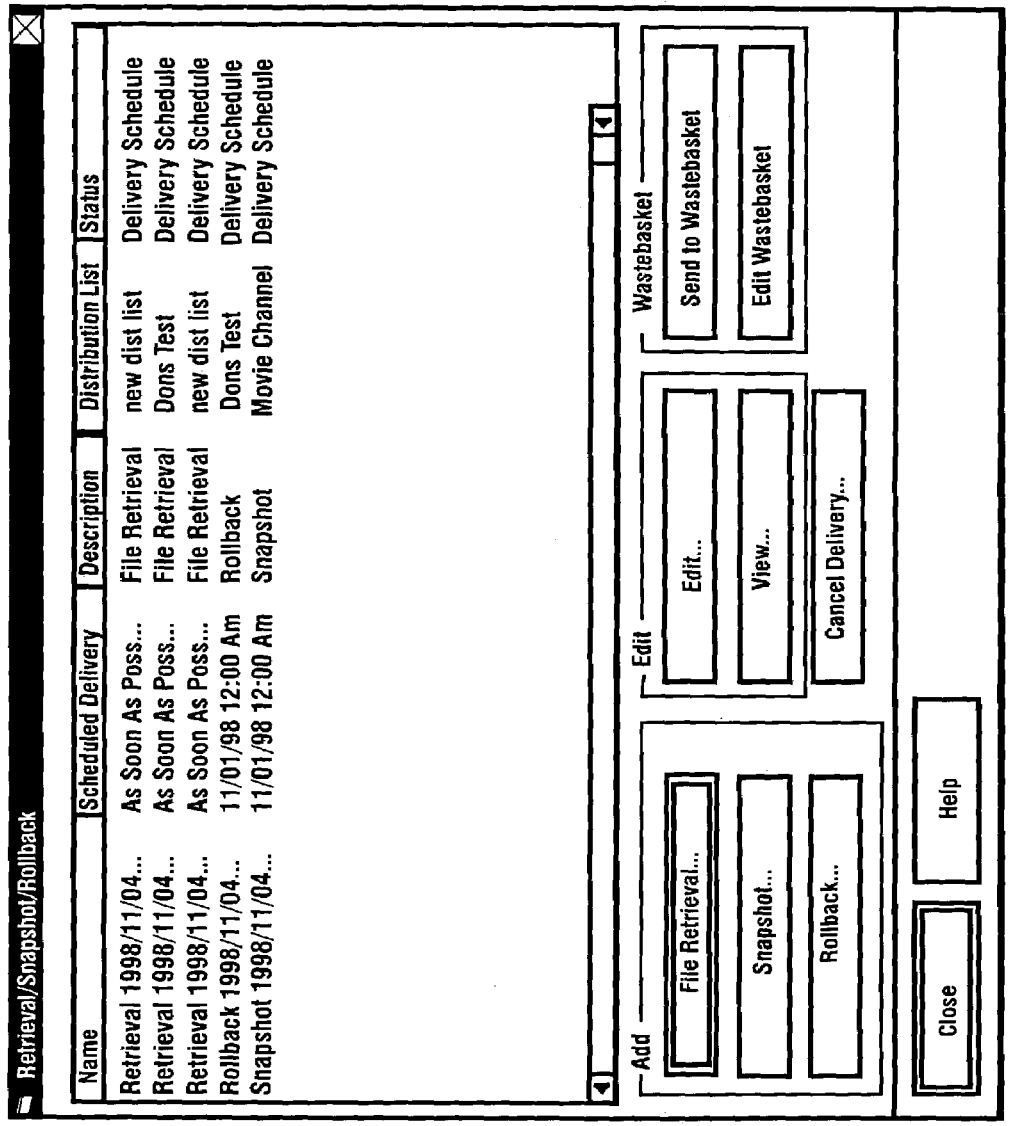

A further feature of the exemplary embodiment is the ability of the user to review the status of ongoing campaigns. This is accomplished from the main screen 266 by the operator selecting an icon 276. Selection of icon 276 causes a snapshot/rollback/file retrieval screen 412 to be presented. Screen 412, which is shown in detail in FIG. 59, shows a listing of retrieval, rollback and snapshot events which are scheduled by the system. The selection of an appropriate icon from screen 412 causes screens associated with snapshot, rollback and retrieval events to be displayed.

Figure 60:
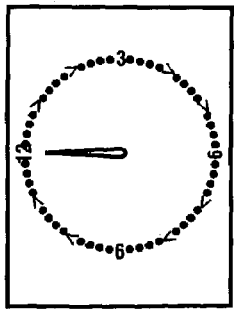

An example of a snapshot screen is screen 414 shown in FIG. 60. Screen 414 shows the snapshot parameters. Snapshot sends a message to an ATM to save its marketing configuration parameters to a special directory. This enables the operator to view all the information concerning the presentation materials that are resident on that terminal.

Figure 61:
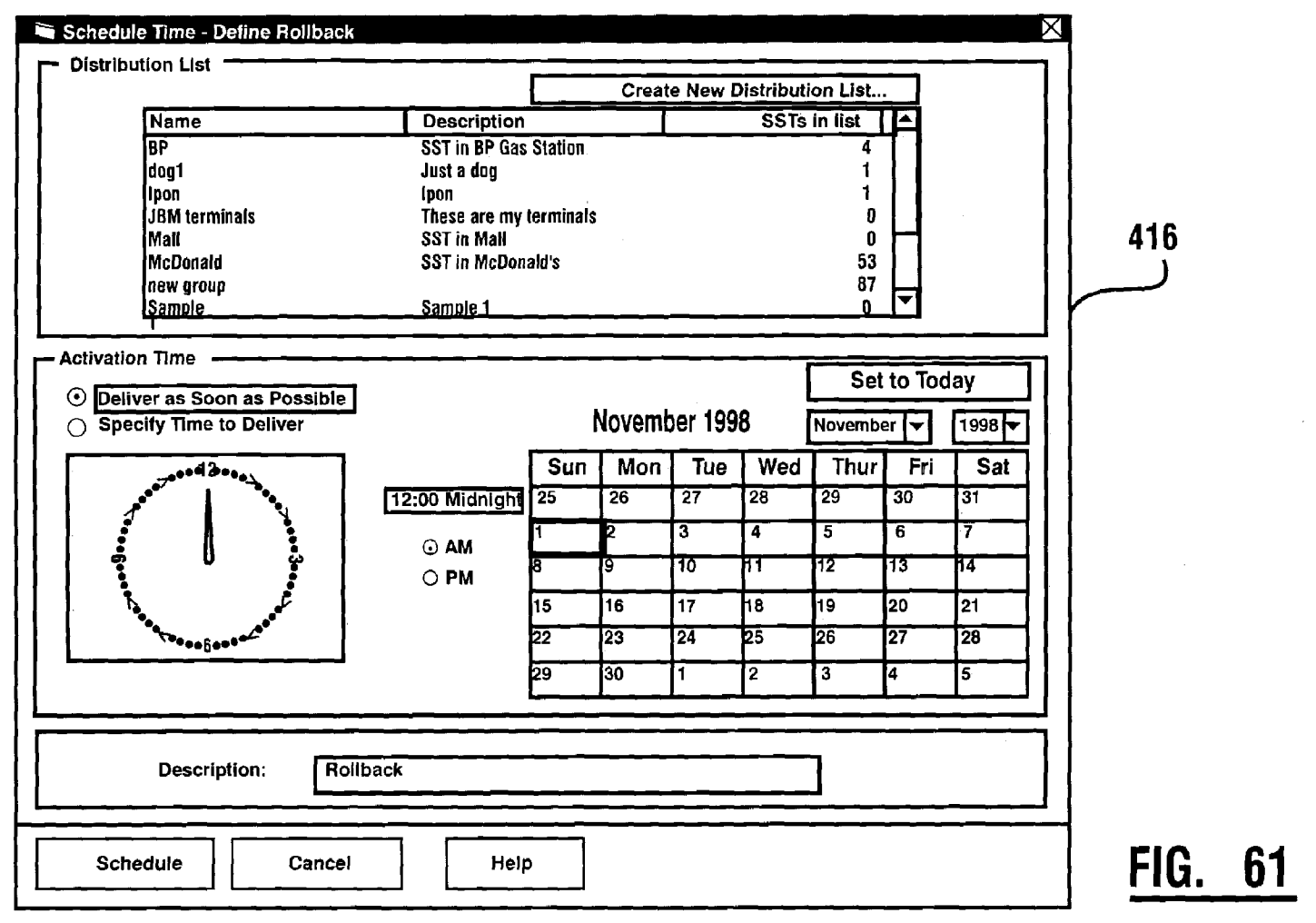

A screen 416 shown in FIG. 61 displays parameters to the operator associated with a rollback event. A rollback event sends a message to an ATM to discontinue a current campaign. This may be done selectively on a single terminal or may be accomplished for a group of terminals as desired. A rollback can be scheduled or cancelled by the system operator.

Figure 62:
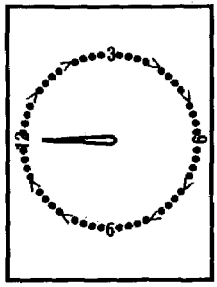

Selection of a file retrieval event from screen 412 causes the system to generate a file retrieval screen 417 shown in detail in FIG. 62. The file retrieval screen includes the listing of data which the operator may select to retrieve from the ESD agents in the ATMs in each selected distribution list. The system may operate depending on its configuration to recover this data from the ATMs at a selected time. This is done in some embodiments by the market message server accessing the selected terminals through a dial up or other intermittent connection to recover data therefrom. Alternatively, in systems where the ATMs report the marketing results in real time, such as through a generally continuous TCP/IP connection, retrieval information may be calculated by reviewing the captured information stored in a database associated with the market message server.

Exemplary embodiments of the present invention also include the capability for operators of the system to develop the marketing campaigns that are specifically targeted to a user currently operating an ATM terminal. This is accomplished through software which runs on the marketing server or other connected computer in the system. The software which provides this capability is referred to by the assignee of the present invention as iq® CRM.

The software which enables setting up campaigns targeted to specific users causes the generation of screens which provide a graphical user interface to operators setting up the system. This graphical user interface may utilize logic and present screens similar to those previously discussed in connection with the iq® ESD software. The features already described which are useful for restricting access to appropriate operators, collecting and loading presentation materials and scheduling times and terminals by which campaigns may be delivered may be included. Of course alternative or additional capabilities may be provided. Alternatively, software may be provided which includes the capabilities for setting up both general and targeted campaigns, loading of presentations and necessary logic to terminals, controlling campaigns and analyzing results.

Figure 85:
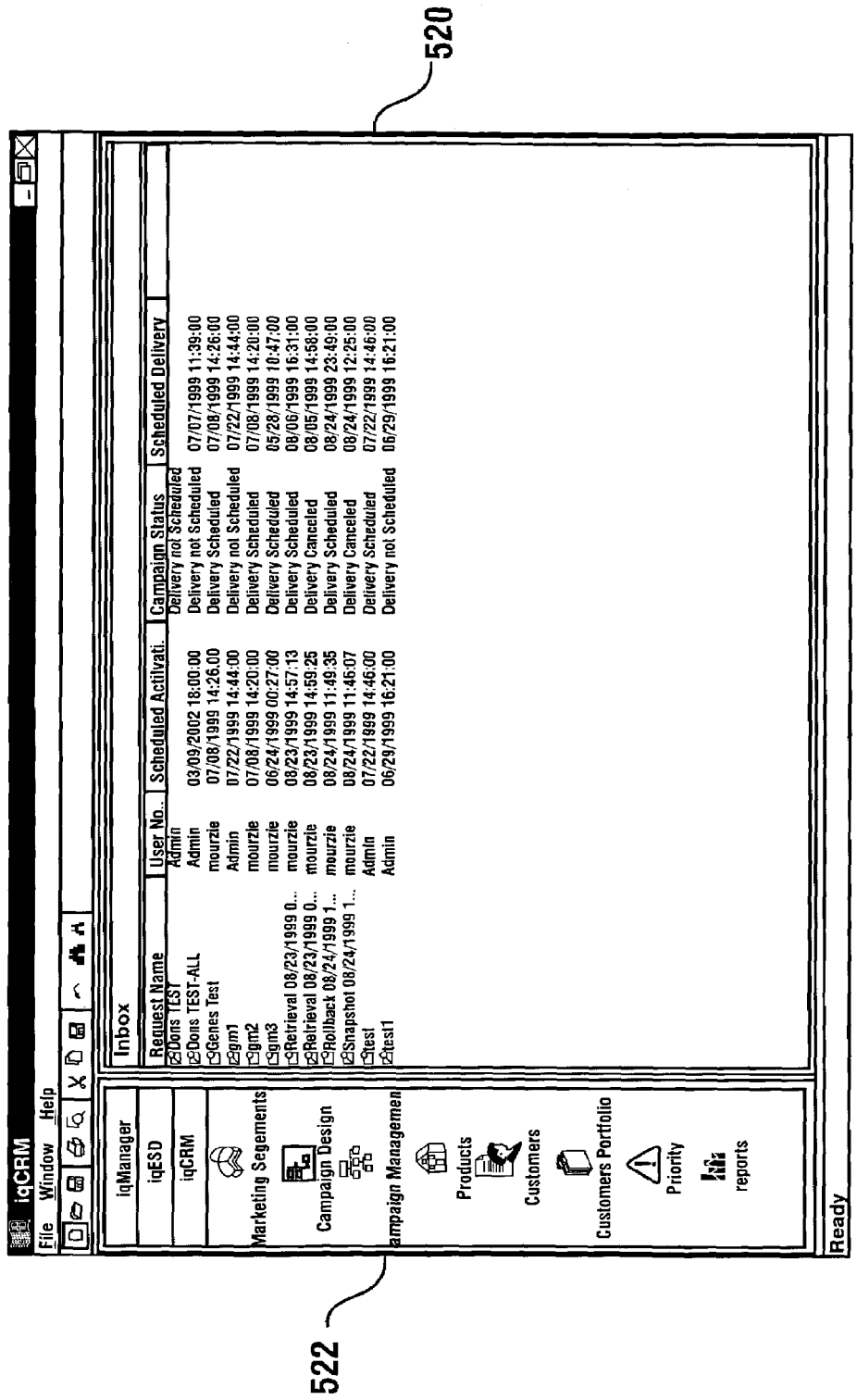

FIG. 85 shows an exemplary embodiment of an output screen 520. Screen 520 is generated responsive to operation of the software used for marketing to a targeted user. Screen 520 is similar to screens previously discussed in that it includes listings of campaigns which can be presented by the system. Screen 520 also lists the status of each particular campaign and a time that the campaign is scheduled for delivery.

Screen 520 also includes a number of graphic icons 522. Icons 522 enable an operator of the system to review and/or populate data which is used to direct marketing messages to specific users of the ATMs or other transaction terminals used in the system. In the exemplary embodiment the operator is enabled to select an icon which provides the operator with information on the definition of various market segments into which customers may be categorized. These market segments with which particular customers may be associated are used to target the particular campaigns to particular customers.

Other icons presented in screen 520 enable the operator to review and compile information about particular customers who are to receive presentations from the system. The customer data may include the customer name and PAN or other identifying data. The customer data may also include other information about the customer as well as data which can be used to correlate the customer with other information. The operator is also enabled to select an icon associated with a "portfolio" on a given customer. This portfolio data may include data that is useful in determining a particular market segment or segments in which a particular customer may be categorized. It may also include information about presentations made to the customer, offers previously accepted or declined by the customer or other information which is usable by the system in deciding whether to present particular presentations to the customer.

Figure 87:
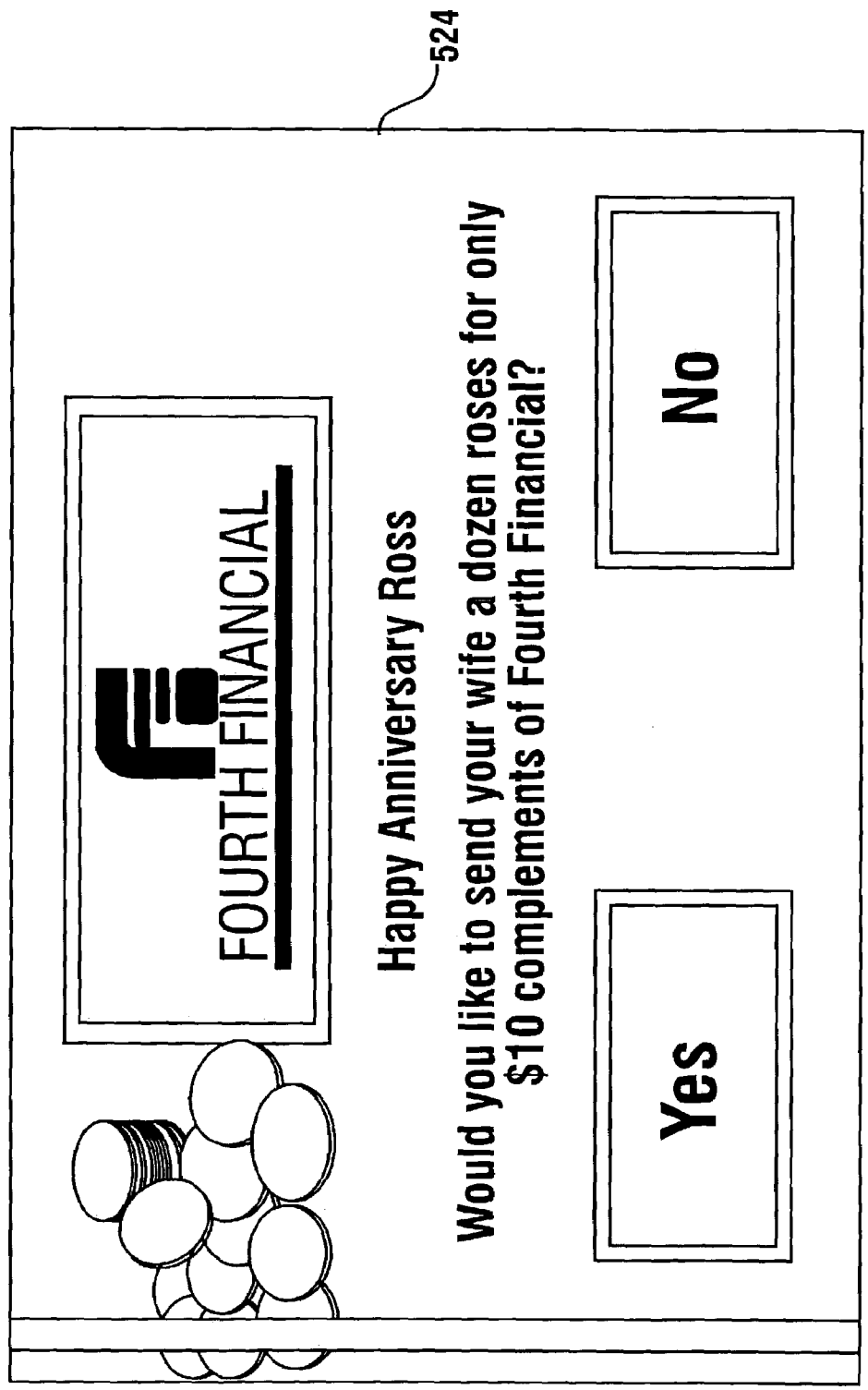
FIG. 87 is an example of a screen presented at an ATM in response to a presentation directed to the particular user and particular circumstances which may be achieved through operation of exemplary embodiments of the system.

The types of customer data which are included may be relatively limited or extensive depending on the system. For example in some embodiments data concerning customers may include information about birth dates, anniversary dates, family relationships and other information which may be useful in serving the customer. Screen 524 shown in FIG. 87 shows an example of the capabilities of targeted marketing to a particular user. In this example the information concerning the customer includes a date associated with the customer's wedding anniversary. A few days before the customer's wedding anniversary and through the date thereof the computer may operate to cause a presentation like that shown in FIG. 87 to be presented whenever the user operates an ATM connected to the system. In this way the user is less likely to forget their anniversary. The user is also presented with the opportunity to purchase a product which in this case includes a bouquet to be sent to the user's spouse.

In this example the system also includes sufficient information to direct the purchase appropriately if the customer elects to accept the offer. The customer is provided with the convenience of charging the cost of the product to their particular account. This is achieved in the exemplary embodiment because the marketing system has the number associated with the user's account to which a charge may be assessed. An affirmative response by the user causes the system to send an appropriate message to a service provider to complete the customer purchase. These may include providing the message concerning the purchase to a human service provider through an administrative workstation. The human service provider can then complete the purchase for the customer. Alternatively acceptance of the product offer may result in an appropriate electronic message being sent to a third party service provider such as a florist who can fulfill the purchase. This may be accomplished by linking the marketing server to other systems in other networks such as through the Internet. In this way the customer's order can be rapidly completed. In some exemplary embodiments the customer's acceptance of the offer is also recorded and the information used in deciding whether to make additional presentations to the customer in the future. Of course screen 524 represents only one example of the capabilities of systems of the present invention.

The information stored in the system concerning particular customers may also include data representative of a selected marketing presentation to be output to the customer the next time the customer operates an ATM connected to the system. This may done through operation of the marketing message server in advance of the customer's next transaction. In this way the next time the customer is identified at a terminal connected to the system the particular presentation data is more readily resolved. This reduces delays that might otherwise be associated with resolving this information through logic steps that are executed at the time the customer appears.

Other capabilities of the exemplary system include the ability of an operator to review and add products to the system which can be marketed through connected terminals. This information may include for example information about products and services and the presentations associated therewith. Product information may also include the logic steps associated with the system taking actions in response to the customer's inputs in response to presentations. The product information may also include designs of graphics or other presentations associated with promotions for the particular products. The capability to review, import, edit and modify such presentations may also be included in the system as previously discussed.

Figure 86:
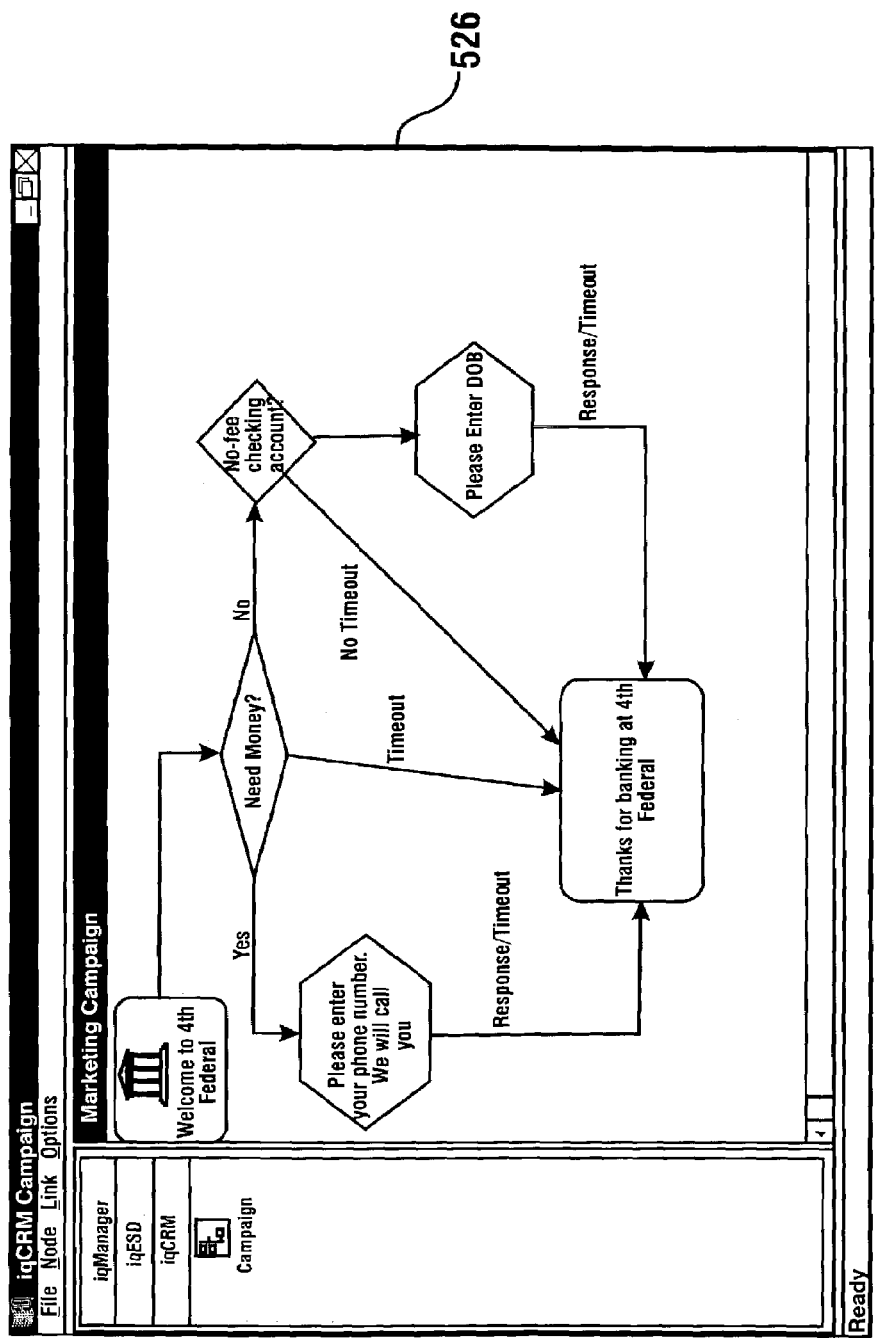

Operators of the exemplary system are also enabled to design the campaigns which are directed to particular users. In the exemplary embodiment this is done through a visual programming technique which is represented by a screen 526 in FIG. 86. Screen 526 includes graphical representations of the displays, questions and prompts which are included in a presentation which is made to a customer. The programming also includes the particular time-out connection so that the marketing session may terminate if the customer does not respond. This exemplary visual programming technique facilitates compiling the data and formulating the logic which makes up the presentation data included in marketing response messages delivered by the server. As previously discussed campaigns may consist of a single presentation as represented in screen 526. Alternatively campaigns may consist of a group of presentations which may be presented to a customer at random or in a particular ordered sequence as the customer makes successive visits to ATMs connected to the system. As can be appreciated a variety of types of presentations may be configured using the exemplary system.

The exemplary embodiment of the system also enables the operator to provide targeted marketing messages on a priority basis to one or more selected customers. Such priority messages may be provided by market segments or may be directed to an individual user. This is done through selection of a "priority" icon represented in screen 520. By configuring instructions associated with the priority icon an operator is enabled to give a message to particular designated users the next time the user operates an ATM connected to the system. These particular priority messages interrupt a sequence of messages in a campaign that may be in the process of being presented to the user. Generally after the priority message or messages are given the current campaign to the user may continue upon the next ATM visit from the point of interruption, or alternative campaigns may be commenced depending on the configuration of the system.

An example of a priority message which may be desirable to give to a customer may be the wedding anniversary presentation represented in screen 524. Alternative types of priority promotions may include a message that a user's certificate of deposit is about to expire and a renewal is required. Alternative priority types of presentations may involve other products or situations that may be of particular importance to a particular user or a particular group of users. This feature of the exemplary embodiment of the system enables the operator to insert these priority presentations and to have them presented without disrupting the overall marketing operation of the system.

As also represented in connection with screen 520 the exemplary system enables an operator to generate a plurality of reports. These reports may include reports including various statistics which can be generated from the data available to the system. A report may include for example success rates associated with particular types of presentations. Reports may also include numbers and types of responses presented by particular users or groups of users. The reports may also include information about market segment analysis and responses to particular presentations or campaigns by customers within particular market segments or having particular circumstances. Reports may also analyze customer activities at particular machines or within particular geographical regions. An analysis may also be done on a time dependent basis to determine the response to particular campaigns or presentations at various times of day. Numerous types of reports can be generated by the system and an operator may configure the system to generate such reports either on a periodic or on demand basis. As will be appreciated the exemplary embodiment also has the capability to export data including report data to connected systems which enable advertisers, persons who have payment obligations or a right to receive payment based on results, or other persons interested in the results, to analyze activities of the system. Of course other reporting capabilities which may be achieved through use of the invention will be apparent to those skilled in the art from the foregoing description.

It should be understood that the described embodiments of the operator interfaces, data structures and logic for distributing presentation materials, developing campaigns and analyzing results is exemplary. Other embodiments may utilize additional or different data, logic flows and graphical presentations while achieving the functions of the present invention.

Thus the ATM customer marketing system of the exemplary embodiment of the present invention achieves the above-stated objectives, eliminates difficulties encountered in the use of prior devices, methods and systems, and attains the desirable results described herein.

In the foregoing description certain terms have been used for brevity, clarity and understanding, however, no unnecessary limitations are to be implied therefrom because such terms are used for descriptive purposes and are intended to be broadly construed. Moreover, the descriptions and illustrations herein are by way of examples and the invention is not limited to the details shown and described.

In the following claims any feature described as a means for performing a function shall be construed as encompassing any means known to those skilled in the art as capable of performing the recited function, and shall not be deemed limited to the particular means shown in the foregoing description or mere equivalents thereof.

Having described the features, discoveries and principles of the invention, the manner in which it is constructed and operated and the advantages and useful results attained, the new and useful structures, devices, elements, arrangements, parts, combinations, systems, equipment, operations, methods, processes and relationships are set forth in the appended claims.

We claim:

1. A method comprising:
    a) receiving first ATM user identifying data corresponding to a first ATM user conducting a first financial transaction at a first ATM, with a marketing computer remote from the first ATM, and wherein the first financial transaction is conducted through communication between the first ATM and a first remote computer other than the marketing computer;
    b) responsive to receipt of the first ATM user identifying data, sending with the marketing computer to the first ATM, first presentation identifying data corresponding to at least one first marketing presentation to output to the first ATM user during the first financial transaction.

2. The method according to claim 1 and further comprising:
    (c) receiving with the marketing computer, acknowledgment data from the first ATM indicative that the at least one first marketing presentation has been presented to the first ATM user;
    (d) responsive to receipt of the acknowledgment data, determining through operation of the marketing computer at least one next presentation to be presented to the first ATM user in a subsequent ATM transaction session, wherein the at least one next presentation is determined prior to commencement of the subsequent ATM transaction session.

3. The method according to claim 2 and further comprising:
    (e) receiving the first ATM user identifying data from a second ATM different from the first ATM, when the first ATM user conducts a second financial transaction at the second ATM subsequent to the first financial transaction;

(f) responsive to receipt of the first ATM user identifying data in step (e), sending through operation of the marketing computer to the second ATM, next presentation identifying data corresponding to the at least one next presentation to present to the first ATM user.

4. The method according to claim 2 and further comprising prior to step (a);

establishing a first sequence of marketing presentations, and storing data corresponding to the first sequence in a data store in operative connection with the marketing computer, wherein the at least one first marketing presentation and the at least one next presentation are included in the first sequence.

5. The method according to claim 4 and prior to step (b) further comprising:

(g) associating the first user with the first sequence through operation of the marketing computer.

6. The method according to claim 5 wherein step (g) comprises associating the first ATM user with a first market segment prior to step (a), and associating the first market segment with the first sequence through operation of the marketing computer.

7. The method according to claim 5 wherein step (g) comprises associating the first ATM user with the first sequence through operation of the marketing computer prior to step (a).

8. The method according to claim 5 wherein step (g) comprises associating the first ATM user with the first sequence subsequent to step (a) through operation of the marketing computer.

9. The method according to claim 8 wherein in step (a) the first user identifying data comprises an account number, and in step (g) the marketing computer is operative to assign the first ATM user to the first sequence responsive to a financial institution associated with the account number.

10. The method according to claim 5 and further comprising:

prior to a subsequent ATM transaction, assigning a priority presentation to the first ATM user through operation of the marketing computer, wherein the priority presentation is presented to the first ATM user in advance of the previously determined next presentation.

11. The method according to claim 10 wherein the priority presentation comprises a birthday message.

12. The method according to claim 10 wherein the priority presentation comprises an anniversary message.

13. The method according to claim 10 wherein the priority presentation comprises an account message.

14. The method according to claim 10 wherein the priority message includes an offer to purchase and charge the purchase to the first ATM user's account.

15. The method according to claim 1 and further comprising:

(c) receiving with the marketing computer, data corresponding to at least one customer input provided at the first ATM in response to the at least one first marketing message;

(d) responsive to the at least one customer input, determining through operation of the marketing computer at least one next presentation to be presented to the first ATM user in a subsequent ATM transaction session, wherein the at least one next presentation is determined prior to commencement of the subsequent ATM transaction session.

16. The method according to claim 15 wherein step (d) comprises the marketing computer communicating with a data warehouse computer.

17. The method according to claim 1 wherein in step (b) the marketing computer is operative to determine the at least one first marketing presentation responsive to the first ATM user identifying data.

18. The method according to claim 1 wherein in step (b) the marketing computer is operative to determine the at least one first marketing presentation responsive to a location of the first ATM.

19. The method according to claim 1 wherein in step (b) the marketing computer is operative to determine the at least one first marketing presentation responsive to a merchandising establishment in which the first ATM is located.

20. The method according to claim 1 wherein in step (b) the marketing computer is operative to determine the at least one first marketing presentation responsive to a time of the first financial transaction.

21. The method according to claim 1 and further comprising:

selecting a plurality of marketing presentations through operation of the marketing computer;

selectively transmitting data corresponding to the plurality of marketing presentations to a plurality of ATMs through operation of the marketing computer, wherein data corresponding to the plurality of marketing presentations is stored in a data store in each of the plurality of ATMs;

wherein in step (b) the first presentation identifying data is sent to the first ATM responsive to the at least one marketing presentation having previously been sent for storage in the data store in the first ATM.

22. Computer readable media bearing instructions operative to cause a computer to carry out the method steps recited in claim 1.

23. The method according to claim 1 and further comprising:

(c) receiving second ATM user identifying data corresponding to a second ATM user conducting a second financial transaction at a second ATM with the marketing computer, and wherein the second financial transaction is conducted through communication of the second ATM and a second remote computer other than the first remote computer and the marketing computer;

(d) responsive to receipt of the second ATM user identifying data, sending with the marketing computer to the second ATM, second presentation identifying data corresponding to at least one second marketing presentation to output to the second ATM user during the second financial transaction.

* * * * *